United States Patent [19]

Van Huben et al.

[11] Patent Number: 5,950,201

[45] Date of Patent: Sep. 7, 1999

[54] COMPUTERIZED DESIGN AUTOMATION METHOD USING A SINGLE LOGICAL PFVL PARADIGM

[75] Inventors: Gary Alan Van Huben; Joseph Lawrence Mueller, both of Poughkeepsie, N.Y.

[73] Assignee: International Business Machines Corporation, Armonk, N.Y.

[21] Appl. No.: 08/759,692

[22] Filed: Dec. 6, 1996

[51] Int. Cl.[6] .................................................. G06F 15/173
[52] U.S. Cl. .................................... 707/10; 707/4; 707/8; 707/102; 707/203; 364/468.02; 395/200.31
[58] Field of Search .................................. 707/10, 102, 8, 707/203, 4; 364/468.02; 395/200.31

[56] References Cited

U.S. PATENT DOCUMENTS

| | | | |
|---|---|---|---|
| 5,191,534 | 3/1993 | Orr et al. | 364/468.12 |
| 5,201,047 | 4/1993 | Maki et al. | 707/4 |
| 5,216,612 | 6/1993 | Cornett et al. | 364/468.02 |
| 5,317,729 | 5/1994 | Mukherjee et al. | 707/3 |
| 5,321,605 | 6/1994 | Chapman et al. | 705/7 |
| 5,333,312 | 7/1994 | Wang | 707/10 |
| 5,333,315 | 7/1994 | Saether et al. | 707/1 |
| 5,333,316 | 7/1994 | Champagne et al. | 707/8 |
| 5,418,949 | 5/1995 | Suzuki | 707/205 |
| 5,463,555 | 10/1995 | Ward et al. | 364/468.02 |
| 5,530,857 | 6/1996 | Gimza | 707/10 |
| 5,586,039 | 12/1996 | Hirsch et al. | 364/468.01 |

OTHER PUBLICATIONS

Norrie et al. "Flexible Enterprise through Coordination Repositories", Institute for Information Systems, The 11th ISPE/IE/IFAC International Conference on CAD/CAM Robotics and Factories on the Future '95, pp. 135–140, 1995.

Tony–Cliffod–Winters, "The Repository–Understanding IBM", The relational Journal, Issue No. 12, pp. 5–10, Jan. 1991.

Oliver Tegel, "Integrating Human Knowledge Into The Product Development Process" published in Proceedings of ASME Database Symposium Eng–Data Mgmt, Integrating the Engineering Enterprise ASME Database Symposium 1994, ASCE NY USA, pp. 93–100.

"Beyond EDA" published in Electronic Business, vol. 19, No. 6, Jun. 1993 pp. 42–46, 48.

*Primary Examiner*—Paul V. Kulik
*Assistant Examiner*—Jean R. Homere
*Attorney, Agent, or Firm*—Lynn L. Augspurger

[57] ABSTRACT

A design control system suitable for use in connection with the design of integrated circuits and other elements of manufacture having many parts which need to be developed in a concurrent engineering environment with inputs provided by users and or systems which may be located anywhere in the world providing a set of control information for coordinating movement of the design information through development and to release while providing dynamic tracking of the status of elements of the bills of materials in an integrated and coordinated activity control system utilizing a repository which can be implemented in the form of a database (relational, object oriented, etc.) or using a flat file system. Once a model is created and/or identified by control information design libraries hold the actual pieces of the design under control of the system without limit to the number of libraries, and providing for tracking and hierarchical designs which are allowed to traverse through multiple libraries. Data Managers become part of the design team, and libraries are programmable to meet the needs of the design group they service.

26 Claims, 26 Drawing Sheets

| | FILE RETURN FILTER OWNER STATUS | | | | | HELP |
|---|---|---|---|---|---|---|
| 235— | NAME | | | | | |
| 236— | LIBRARY | | | | ▷ | |
| 237— | TYPE | | | | ▷ | |
| 238— | VERSION | | | | ▷ | |
| 239— | LEVEL | | | | ▷ | |

| | MODEL STATUS: VALID | | | MODEL OWNER: FORD | | |
|---|---|---|---|---|---|---|
| 240— | NAME | TYPE | LIB | VERS | LEVEL | STATUS |
| | 0001 A ALU | SCHEM | CP_LIB | BASE | ENGIN | VALID |
| | 0002 I ALU | VHDL | CP_LIB | BASE | ENGIN | VALID |
| | 0003 O ALU | SYNTHES | CP_LIB | BASE | ENGIN | VALID |
| | 0004 I ADDER | LAYOUT | TECH | HIPWR | QUAL | INVAL |
| | 0005 A MULT_DIV | LAYOUT | TECH | LOPWR | QUAL | VALID |
| | 0006 I MULT1 | GATE | TECH | LOPWR | QUAL | VALID |
| | 0007 I DIV1 | GATE | TECH | LOPWR | QUAL | VALID |
| | 0008 | | | | | |
| | 0009 | | | | | |

FIG.2

INITIATE LIBRARY PROMOTE

22201 — NAME
22202 — VERSION
22203 — TYPE

SOURCE      DESTINATION

22204 — LIBRARY      — 22206
22205 — LEVEL      — 22207
     — 22208
DEST ENTRY LEVEL

22209 —
- ☐ VIA LIST
- ▨ FOREGROUND CHECKING
- ▨ VIA COPY

- ☐ RESET UPDT LOCK
- ☐ HIGH PRIORITY
- ☐ OVERRIDE PARMS

— AVAILABLE TO CONTROLLED FILES ONLY —

22210 —
- ☐ BOM PROMOTE
- ☐ ANCHOR ONLY

- ☐ RETAIN SOURCE

Figure 20

| | | | |
|---|---|---|---|
| XXX/XX/00 | WL1 | NONE | NONE |
| XXX/XX/WL1 | VL1 | YY | REPOS1 |
| XXX/XX/VL1 | VL2 | NY | REPOS1 |
| ASIC/XX/CD1 | CD3 | YY | REPOS1 |
| ASIC/XX/CD2 | CD3 | YY | REPOS1 |
| ASIC/XX/CD3 | VL1 | NY | REPOS1 |
| ASIC/XX/WL2 | WL3 | YY | REPOS1 |
| ASIC/XX/WL3 | VL2 | NY | REPOS1 |
| ASIC/V1/VL2 | AR3 | NY | REPOS2 |
| ASIC/V1/AR3 | AR2 | NN | REPOS2 |
| ASIC/V1/AR2 | AR1 | NN | REPOS2 |
| ASIC/V1/AR1 | *** | NN | REPOS2 |
| ASIC/V1/ARP3 | ARP2 | YN | REPOS2 |
| ASIC/V1/ARP2 | AR2 | YN | REPOS2 |
| ASIC/V1/ARP1 | AR1 | YN | REPOS2 |
| FIRM/XX/FD1 | FD2 | YY | REPOS1 |
| FIRM/XX/FD2 | VL1 | NY | REPOS1 |
| FIRM/V1/VL2 | FR2 | NY | REPOS3 |
| FIRM/V1/FR2 | FR1 | NN | REPOS3 |
| FIRM/V1/FRP1 | FR1 | YN | REPOS3 |
| FIRM/V1/FR1 | *** | NN | REPOS3 |

Labels: 152, 153, 154, 155, 156

COMPUTERIZED DESIGN AUTOMATION METHOD USING A SINGLE LOGICAL PFVL PARADIGM

COPYRIGHT NOTICE AND AUTHORIZATION

This patent document contains material which is subject to copyright protection.

(C) Copyright International Business Machines Corporation 1995, 1996 (Unpublished). All rights reserved. Note to US Government Users—Documentation related to restricted rights—Use, duplication, or disclosure is subject to restrictions set forth in any applicable GSA ADP Schedule Contract with International Business Machines Corporation.

The owner, International Business Machines Corporation, has no objection to the facsimile reproduction by any one of the patent disclosure, as it appears in the Patent and Trademark Office patent files or records of any country, but otherwise reserves all rights whatsoever.

FIELD OF THE INVENTION

This invention is related to a Data Management Control System and Methods for Computerized Design Automation (CDA) Applications, and particularly to methods useful for concurrent engineering in connection with the design, development and manufacturing of complex electronic machines such as computer systems and their complex electronic parts.

GLOSSARY OF TERMS

While dictionary meanings are also implied by certain terms used here, the following glossary of some terms may be useful.

AFS Andrew File System—File Management System developed by Transarc Inc. and used on Unix/AIX Networks.

API Application Program(ming) Interface.

ASC Accredited Standards Committee (ANSI)

BOM Bill of Materials

CIM Computer Integrated Manufacturing

CR Control Repository

CRC Cyclic Redundancy Check

CLSI Compiler VHDL Analyzer developed by Compass Design Systems

DCS Design Control System. Our Design Control System incorporates Data Management System Processes, including interactive data management systems which supply processes which may be applicable in general data management systems, such as a process manager, a promotion manager, a lock manager, a release manager, and aggregation manager and the other processes we describe herein as part of a Computer Integrated Design Control System and, where the context applies, Data Management System, is a Data Management System functioning within an overall integrated design control system.

DILP Designer Initiated Library Process

DM Data Manager or Data Management

DMCU Data Management Control Utilities

DMS Data Management System

DR Data Repository

EC Engineering Change

EDA Electronic Design Automation

GUI Graphical User Interface

PDM Product Data Management

PIM Product Information Management

PN Part Number

RAS Random Access Storage sim static inline memory tape-out Delivery of a coherent set of design data to manufacturing. Also known as Release Internal Tape (RIT) within IBM.

TDM the Cadence Team Design Manager (most currently Version 4.4)

VHDL Very High-level Design Language—A high level language comprised of standards supported by IEEE and the EDA industry. The language is widely used in the electronics and computer industry and by the military as an alternative to Verilog and ADA, other high level computer coding languages.

BACKGROUND OF THE INVENTION

As Data Management systems grow more complex, they have more users interacting with them, and issues such as performance, data integrity, workload management, batch processing, efficiency and continuous availability need to be solved. Many systems on the market today can only handle small numbers of users simultaneously, offer little or no expansion capabilities and frequently require manual intervention to process data through the system. In addition, the mechanisms for maintaining data integrity, ownership, and file management are either limited in capability or are unable to prevent loss of data and/or collisions under certain conditions. With the growing presence of distributed computing, and the increased need for sharing large amounts of data across an enterprise, a solution is required to address these problems for a computer integrated design control system for concurrent engineering and other applications.

In the article entitled "Beyond EDA (electronic design automation)", an example of one kind of computerized design automation (CDA), published in Electronic Business Vol.19, No.6 June 1993 P42–46, 48, it was noted that while billions of dollars have been spent over the past (then and still last) five years for electronic design automation systems (EDA) and software to help companies cut their design cycle, a huge gulf remains between design and manufacturing. To eliminate the gulf and thus truly comply with the commandments, companies are extending the concept of concurrent engineering to enterprise wide computing. The concept, which calls for integrating all the disciplines from design to manufacturing is becoming the business model of the 1990s. Achieving an enterprise wide vision requires tying together existing systems and programs and managing the data that flows among them. Software that makes that linkage possible is largely in the class known by two names: product data management (PDM) or product information management (PIM). Mr. Robinson, the author, described the experiences of several companies with PIM and PDM, in particular Sherpa and Cadence.

The design of complex parts, such as integrated circuits, computers, or other complex machines in a complete manufacturing operation like IBM's requires computer capability, with computers capable of processing multiple tasks, and allowing concurrent data access by multiple users. The IBM System 390 operating system known as Multiple Virtual Storage (MVS) allows such things as relational database management methods, such as the TIME system described by U.S. Pat. No. 5,333,316, to be used to reduce design time.

The TIME system is used within IBM for the purposes described in the patent during circuit design. However, these prior efforts treated design as directed to an entity and did not achieve the efficiencies provided by the system detailed in our description of our invention, which also can run under MVS, but also under other operating systems. Our detailed description of our invention will illustrate that we have furthered the objects of the invention of U.S. Pat. No. 5,333,316 by increasing the flexibility of a number of circuit designers who may concurrently work on designing the same integrated circuit chip and reducing the interference between chip designers. With the prior system, a user (a person, processor or program capable of using data in a relational database) was given a private copy of the master table. Alteration of a row in the user table was not automatically updated in the master table, because a lock mechanism prevented the row update, but that was an great improvement at the time, because no longer did multiple users have to wait for copying of a table, each time data from a user needed to be updated. This row locking and treatment of data has become widespread in the relational database field, and it has been enabled for use with multiple instances of a platform even on Unix machines today. We should note that also in the MVS art, there have been proposed various library systems, e.g. those represented by U.S. Pat. Nos. 5,333,312 and 5,333,315 and others which relate to IBM's Image Object Distribution Manager in the ImagePlus product line of IBM, and IBM's Office Vision are examples of systems enabling control of a source document while allowing access by multiple users. Implementation of these patented ideas enable synchronous and asynchronous copying of a document into a folder in a target library. These methods provide for check out of a document and its placement in a target library while locking the document in the source library to prevent changes while the checked out document is out. But these steps are only some of the many things that are needed to bring a product to a release state. Bringing a product to a release state is an object of the current developments relating to design control in a manufacturing setting.

Concurrent engineering is required among many engineers working in parallel and at different locations worldwide. Furthermore, as noted by Oliver Tegel in "Integrating human knowledge into the product development process" as published in the Proceedings of the ASME Database Symposium, Engineering Data Management: Integrating the Engineering Enterprise ASME Database Symposium 1994. ASCE, New York, N.Y., USA. p 93–100, specialists who are not working directly together are often needed for solving the demanding tasks that arise during the development of today's advanced products. During product development, assistance is required from other departments such as manufacturing, operations scheduling, etc. Even the vendors and customers should be integrated into the product development process to guarantee the product developed will be accepted in the market.

There is a need for integrators/coordinators/model builders and the designers to work together to create a next release. Information from different people in different forms must be collected aiming at a final good design. A problem occurring during product development is, how to know which people to contact for what kind of information, but that is only one. During all of the process concurrent engineering, particularly for the needs of complex very large scaled integrated system design, needs to keep everything in order and on track, while allowing people to work on many different aspects of the project at the same time with differing authorizations of control from anywhere at anytime.

For the purpose of the following discussion, need to say that we call our system a "Computer Integrated Design Control System and Method" because it encompasses the ability to integrate CIM, EDA, PDM and PIM and because it has the modularity making it possible to fulfill these needs in a concurrent engineering environment particularly useful to the design of complex very large scaled integrated systems as employed in a computer system itself. The making of these systems is a worldwide task requiring the work of many engineers, whether they be employed by the manufacturer or by a vendor, working in parallel on many complete parts or circuits which are sub-parts of these parts. So as part of our development, we reviewed the situation and found that no-one that we have found is able to approach the creation of "Computer Integrated Design Control System" like ours or employ the methods needed for our environment. Our methods are modular and fulfill specific functions, and yet make it possible to integrate them within a complete "Computer Integrated Design Control System".

A patent literature review, especially one done with retrospective hindsight after understanding our own system and method of using our "Computer Integrated Design Control System" will show, among certainly others, aspects of DMS systems which somewhat approach some aspect of our own design, but are lacking in important respects. For instance, after review of our detailed description, one will come to appreciate that in modern data processing systems the need often arises (as we provide) to aggregate disparate data objects into a cohesive collection. These data objects may reside at various levels of completion, spanning multiple versions and/or repositories in a hierarchical, multi-tiered data management system. Additionally, these data aggregations may need to be hierarchical themselves, in order to enable the creation of large groupings of data with varying levels of granularity for the data included therein. In such a data management system, the end-users of the data aggregates are not necessarily the "owners" of all or any of the data objects comprising the data aggregate, but they have a need to manage the particular collection. Management of a data aggregation may include creating the aggregation, adding or deleting data objects, moving the aggregation through a hierarchical, multi-tiered data management system and tracking the status of the data aggregation in real-time while maintaining the coherence of the data aggregation. Creation of a data aggregation or the addition of a data object to an existing data aggregate may need to be accomplished within the data management system or via data objects imported into the data management system through application program interfaces for the data management system.

With such a focus, when one reviews the art, one will certainly find, currently, data management systems which provide means for grouping components of a data system to facilitate the retrieval thereof. However, these data management systems are insufficient and lacking because they fail to address the above-referenced need for grouping disparate data items, just to mention one aspect of our own developments.

Another example, U.S. Pat. No. 5,201,047 to Maki et al. (issued Apr. 6, 1993) teaches an attribute based classification and retrieval system wherein it is unnecessary to implement an artificial code for indexing classifications. The patent teaches a method for defining unique, user-determined attributes for storing data which are capable of being readily augmented without necessitating the modification of the underlying query used for retrieval thereof. However, the Maki et al. patent requires that the data items being grouped share at least one common attribute to enable the grouping, and therefore fails to address the problems of managing data aggregates formed from disparate and unrelated data objects.

Other data management systems address the creation of data aggregates coupled to particular processes implemented in the data system. For example, U.S. Pat. No. 5,321,605 to Chapman et al. (issued Jun. 14, 1994) teaches the creation of a Bill of Resources table which represents the resources consumed in the performance of a given process. Attribute tables for the given resources are utilized to determine whether an additional processes which will consume some or all of the resources of a given process can be initiated. The patent to Chapman et al., requires that each process to be initiated have a particular Bill of Resources aggregate associated therewith. This tightly coupled construct does not permit the creation of data aggregates not related to a particular process implemented in the data management system. Furthermore, since a process must be contemplated in order to create a Bill of Resources table, Chapman et al. do not permit the creation of aggregates without foreknowledge of the process that requires the resource. Thus, in a manner similar to that described for Maki et al., Chapman et al. require that a relationship between the elements exist prior to the formation of the Bill of Resources grouping.

Also, unrelated DMS systems are known which are used for hardware implementations which enable related data in a computer memory, storage or I/O subsystem to be physically grouped in proximity to other such data so as to improve hardware performance, application performance, and/or to solve memory management issues are known. For example, U.S. Pat. No. 5,418,949 to Suzuki (issued May 23, 1995) teaches a file storage management system for a database which achieves a high level of clustering on a given page and teaches loading related data from a secondary storage unit at high speed. The patent uses map files including a metamap file for defining page to page relations of data. These hardware implementations are not related to the present invention, as they involve the management of the physical contents of a data object rather than the management of aggregations of data objects as we perform the methods of our present invention. It is contemplated, however, that such known hardware techniques may be implemented in a system comprising the aggregation management features disclosed herein, thereby further augmenting the overall system efficiency.

During our development process we have viewed the development of others. Even the best of the EDA (electronic design automation) design houses don't have an integrated approach like we have developed.

For the purposes of this background, we will discuss some of the various approaches already used specifically viewing them in light of our own separate developments which we will further elaborate in our detailed description of our invention which follows later in this specification.

In the field of EDA, there are today two preeminent vendors of development software, Cadence Design Systems, Inc. and ViewLogic, Inc. Of course there are others, but these two companies may have a greater range of capability than the others. Also, there are in house systems, such as IBM's ProFrame which we think is unsuitable for use. It will not function well as a stand-alone DM point tool for integration into a foreign framework. But even the largest microelectronic systems are customers of the two named vendors which we will compare. Today, a DCS, it will be seen, without our invention, would require fitting together pieces of disparate systems which don't interact, and even such a combination would not achieve our desirable results.

For the purposes of comparison, after our own description of our environment, our "Computer Integrated Design Control System", we will discuss the features of the Cadence Team Design Manager Version 4.4 and ViewLogic's ViewData in Sections which compare with and refer to the Sections of our own preferred "Computer Integrated Design Control System" as set forth at the beginning of our detailed description of our invention. This comparison will show the shortcomings of these prior systems, as well as some changes which could be made to these prior systems to allow them to improve performance in our concurrent engineering environment by taking advantage of aspects of our own development as alternative embodiments of our invention.

Historically many attempts have been made to collect or group objects together in order to solve typical data management problems. These problems may include identifying all of the files used to create a model, or grouping files together to facilitate transport through a medium. The intent is usually to ensure the group remains together for a specified period of time.

The most common method in use today is to create a listing of files commonly referred to as a Bill of Materials. Many commercial products permit creation of such a BOM, but these BOM are static list BOM. For example, is one of the members of the BOM disappears or gets changed, the user is unaware that the original data set used to create the BOM is no longer valid.

We have created a new process which we call an Aggregation Manager which can be used in Bill of Materials applications but which overcomes prior disadvantages and also one which can be used in our Computer Integrated Design Control System.

SUMMARY OF THE INVENTION

In accordance with our invention we provide a method for computerized design automation, comprising, accessing a file and database management system for managing a plurality of projects as a design control system, organizing data repository for each project for data records and a control repository comprising a common access interface and one or more databases, said control repository communicating with users of said design control system for fulfilling requests of a user and the data repositories of said data management control system through a plurality of managers, each manager performing a unique function. And within this environment we provide application support whereby users combine selected ones of said managers for supporting an computerized design automation application environment suitable for multiple users of a user community located at workstations anywhere in the world accessible via a network, an intranet, extranet or via the internet.

Thus it will be seen that our invention relates to storing, moving, retrieving and managing data in a system comprised of one or more shared public libraries interacting with one or more private libraries arranged in a client server environment. Elements of the system may exist on a homogenous computer platform, or the elements may be scattered across multiple platforms in a heterogeneous environment. The Design Control System incorporates processes for hardware design, software development, manufacturing, inventory tracking, or any related field which necessitates execution of repetitive tasks against multiple iterations of data in a quality controlled environment and our invention enables sharing of libraries in this environment for concurrent engineering.

We provide with these appications various systems, methods and processes for data management particularly suited for use with a data management system having shared libraries for concurrent engineering from locations anywhere in the world, along with an management systems allowing promotion of multiple design BOMs through various levels of development, while handing multiple problems, multiple releases and multiple parts control for computer integrated design control within our data management system for releases, and file and database management.

Our invention provides a design control system usable in a concurrent engineering process which can cooperate in a distributed environment worldwide to enable a design to be processed with many concurrent engineering people and processes. The system we employ uses a a data management control program tangibly embodying a program of instructions executable by a supporting machine environment for performing method steps by an aggregation manager of a data management system having a library organization which receives a request of a user initiated from said displaced client screen and fulfills the request by providing result via our data management system's aggregation manager.

Our invention provides an improved way to make or import a model, and provides a dynamic way to track the model during its course through its design phase. We provide a way to track the BOM.

In order to make a common model, we display for creation of a model one or more control screen sections as part of a control panel input screen allowing creation of a model by interactive user activity, by importing a file listing, by searching of a library of files in said data management system and importing a located file, or by use of an application program interface with a collection of model management utilities utilities. Our sections of said control screen panel include:

(a) a display screen section displaying a first field representing the name of an anchor name field of a model which is identical to the name of a data object which is serving as a named anchor;

(b) a display screen section displaying a second field representing a library where said named anchor resides;

(c) a display screen section displaying a third field representing the type of data object identified by said anchor name;

(d) a display screen section displaying a fourth field representing user entries for the version of said named anchor;

(e) a display screen section displaying a fifth field representing user entries for the level of said named anchor for use by a user or a third party tool for creating, modifying or deleting an aggregate collection of data objects, encompassing those used for items that are identified, tabulated, tracked, validated and invalidated, and promoted, as are bills of materials, by said data management system; and (f) a display screen section displaying a sixth field representing user entries for the status of said named anchor.

Our model thus consists of one anchor and one or more associated components, each of which is a data object in said data management system. This means that our components can belong to any level and version of any library in said data management system and said components are not restricted to the same library, level and version as the anchor, and our components can and do comprise multiple data types, including data generated by tools of said data management system and third party tools. Thus we further provide that each component is labeled as an input or an output of its associated anchor. Thus we provide that each one component may be an anchor to another different model, and when such a component is an anchor to another different model, said different model consists of said said such component acting as one anchor and further consisting of one or more associated components each of which is a data object in said data management system. In accordance with our invention our components components can belong to any level and version of any library in said data management system and our components are not restricted to the same library, level and version as the anchor, and our components can comprise multiple data types, including data generated by tools of said data management system and third party tools.

Each of our components has field identifiers like those of our anchor and each component is also labeled as an input or an output of its associated anchor. Each one component may be an anchor to still another different model, with each component being labeled as an input or output in relation to its anchor file. All components of a model are either static and thus does not move through said data management system but is tracked by the system or dynamic and moves through said data management system with its associated model as part of an action of promoting a model when a model is promoted, a dynamic member being labeled as an input or an output with respect to its associated anchor, while both anchors and components may be labeled as static.

With these facilities, concurrent engineering is enhanced, and after creation of a model, thereafter, our system provides continuously tracking the created model while allowing a user to modify it by adding components, deleting components, changing the status or deleting said created model, and allowing promotion of a model in our data processing system through the libraries of our data processing system.

This, along with many other changes have been made as detailed in the description of our invention which follows.

BRIEF DESCRIPTION OF THE DRAWINGS

The subject matter which is regarded as the invention is particularly pointed out and distinctly claimed in the concluding portion of the specification. The invention, however, both as to organization and method of practice, together with further objects and advantages thereof, may best be understood by reference to the following description taken in connection with the accompanying drawings in which:

FIG. 2 illustrates our preferred embodiment's data entry.

FIG. 20 illustrates the Library Structure File.

DETAILED DESCRIPTION OF THE INVENTION

Overview (Section 1.0)

In order to introduce our Design Control System we will describe it as it can be applied to development of complex circuit design and development projects such as microprocessor design projects. The implementation of our Design Control System can be implemented in a variety of ways using many computing platforms as is suitable for a concurrent engineering project. While we will describe our preferred embodiment, it should be recognized that with this teaching all or part of our exact implementation of user interfaces, methods, features, properties, characteristics and attributes may vary depending on the platform chosen and the surrounding design system. All of these variances will nevertheless employ those routines which implement our processes and which meet our requirements.

Platform (Section 1.1)

The Design Control System (DCS) in our preferred embodiment, even though it can be implemented with other platforms, runs on a network of RS/6000's (workstation class "personal" computers) with an AIX operating system arranged in a Client-Server fashion. Each client and server in our preferred embodiment, is able to implement cross platform code via interpretation, and thus can implement programs written in cross platform languages like Java and VRML. In such situations, Java can interact with VRML by describing extension modes, acting as scripts, and describing the actions and interactions of VRML objects.

Figure 1:
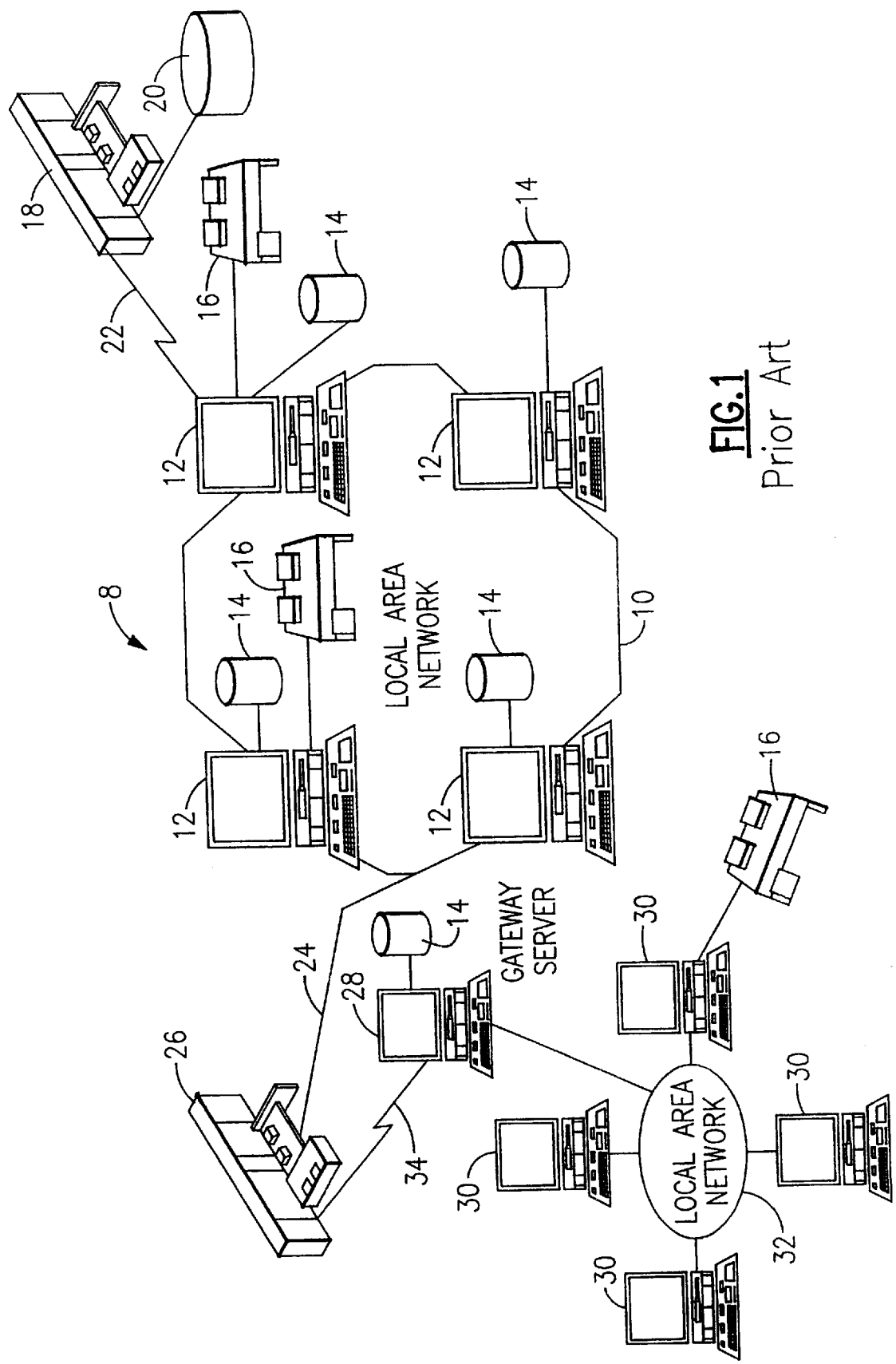
FIG. 1 illustrates a prior art system in which our present system can operate by changes made to the database and design control system, in accordance with our detailed description.

While more powerful situations are contemplated, the system can be installed in a prior art system, like that described in U.S. Pat. No. 5,333,312. Thus, as we show in FIG. 1, the prior art system of the earlier patent, can be employed in this application, by providing the system with new programs. However, such a system, as illustrated by FIG. 1 will be a data processing system 8, which may include a plurality of networks, such as Local Area Networks (LAN), 10 and 32, each of which preferably includes a plurality of individual computers 12 and 30 (which may be RS/6000 workstations or powerful PCs such as the IBM Aptiva's. As common in such data processing systems, each computer may be coupled to a storage device 14 and/or a printer/output device 16. One or more such storage devices 14 may be utilized, to store applications or resource objects which may be periodically accessed by a user within the data processing system 8. As we have said the system is provides with a repository, illustrated by main frame/server computer 18, which may be coupled to the Local Area Network 10 by means of communications links 22, and also to storage devices 20 which serve as remote storage for the LAN 10. Similarly, the LAN 10 may be coupled via communications links 24 supporting TCP/IP through a subsystem control unit/communications controller 26 and communications link 34 to a gateway server 28. Gateway server 28 is preferably an individual computer which serves to link the LAN 32 to LAN 10. The main system can be located anywhere in the world, and remotely from the various servers and clients coupled to it over communications links. The main system can accommodate hundreds of users making requests to the centralized repository (a large server 18, such as one of IBM's S/390 platforms or IBM's RISC System/6000 Scalable POWERparallel Systems (SP) platform for design control information. (AIX, S/390, RS/6000, RISC System/6000 and Scalable POWERparallel Systems are trademarks of International Business Machines Corporation, Armonk, N.Y.)

Since this repository 18 (a large server and its associated storage) is critical to the entire design team, it has the ability to remain available if a single server fails. In addition, the data is secured via a backup or archiving mechanism performed on a regular basis. Our DCS has important performance characteristics. It can handle a distributed computing environment with data being transmitted over LANs and telephone lines linking distant locations in real time. Users at one site experience no noticeable delays accessing data physically located at another site. Due to the complexity of the design, maximum throughput is attained by transferring only the control data necessary to carry out the specific task. For large projects design control information can be physically segregated by library, version and level to minimize the bottleneck caused by too many users accessing the same physical server. In the case of the design data, the physical data is tracked via pointers whenever possible, so as to minimize the amount of file movement between servers. Although, the "official" control information is centralized in one place, the DCS permits certain data to be cached locally on the users machine to improve performance by reducing traffic to the Design Control Repository. For example, much of the control information for private libraries can be cached locally in order to maximize performance for private library accesses. For public libraries, the DCS allows the user to take "snapshots" of a library in which the image of the library is refreshed locally. The user continues to work with his local image of the library until he deems it necessary to refresh the image. The amount of control data that is actually cached is dependant on the environment and the actual implementation. Many of the performance issues are discussed further in the Sections to which they pertain.

Libraries and Design Control Repository (Section 1.2)

The Design Control System has two important components. The Design Control Repository contains the control information for all components of the design. This includes such things as the names of all the pieces, the type of data, the level, the version, the owner, and any results which are deemed quality control records. These results indicate the "degree of goodness" of the design component and they are used by the DCS to make decisions regarding the type of actions which can be performed on a piece of data. This repository can be and is preferably implemented in the form of a database (relational, object oriented, etc.) on using a flat-file system. The actual implementation is usually based on the environment.

As we have said, and as illustrated by the machine to person interface depicted by FIG. 2, our program of instructions executable by a supporting machine environment for performing method steps by an aggregation manager of a data management system having a library organization which receives a request of a user initiated from said displayed client screen as illustrated by FIG. 2 and fulfills the request by a providing a result which provides a dynamic way to track a model during its course through its design phase via our data management system's aggregation manager.

In order to make a common model, we display for creation of a model one or more control screen sections which provide our control information components 235, 236, 237, 238, and 239 as part of a control panel input screen allowing creation of a model by interactive user activity, by importing a file listing providing the data of screen sections 235, 236, 237, 238, and 239, by searching of a library of files in said data management system and importing a located file containing the data of screen sections 235, 236, 237, 238, and 239, or by use of an application program interface with a collection of model management utilities which provides the data of screen sections 235, 236, 237, 238, and 239. These data fields of our control screen which when created by a user comprise data entered in the form boxes (a form is a screen section entry field for representing a model) illustrated in FIG. 2, and when retrieved or otherwise obtained by the system by importing a file listing providing the data of screen sections, by searching of a library of files in said data management system and importing a located file containing the data of screen sections, or by use of an application program interface with a collection of model management utilities all provide the data of a control screen panel sections which include:

(a) a display screen section displaying a first field representing the name (235) of an anchor name field of a model which is identical to the name of a data object which is serving as a named anchor;

(b) a display screen section displaying a second field representing a library (236) where said named anchor resides;

(c) a display screen section displaying a third field representing the type (237) of data object identified by said anchor name;

(d) a display screen section displaying a fourth field representing user entries for the version (238) of said named anchor;

(e) a display screen section displaying a fifth field representing user entries for the level (239) of said named anchor for use by a user or a third party tool for creating, modifying or deleting an aggregate collection of data objects, encompassing those used for items that are identified, tabulated, tracked, validated and invalidated, and promoted, as are bills of materials, by said data management system.

Furthermore, while, as in the other cases for entry section fields, the same screen does not have to, but can, display an additional field which displays status information. Thus, as illustrated by FIG. 2, the system provides a display screen section displaying a sixth field representing user entries for the status of said named anchor. Now each field can be display separately and various combinations can be made, but all fields are provided by and used by our system. At any time, the entire model schema can be displayed, as it is in the field 240, which displays several models names, as well as their anchor, type, library, version, level and status (which is dynamically tracked by our system).

Our model thus consists of one anchor (with a name 235) and one or more associated components, each of which is a data object in said data management system. This means that our components can belong to any level and version of any library in said data management system and said components are not restricted to the same library, level and version as the anchor, and our components can and do comprise multiple data types, including data generated by tools of said data management system and third party tools.

Now once a model is created or otherwise identified, it becomes part of our system. Indeed the second component is our Design Libraries. They hold the actual pieces of design under the control of the system. There is no limit to the number of libraries under the management of the Design Control Repository, and hierarchical designs are allowed to traverse through multiple libraries. The libraries are managed by Data Managers (Librarians) who are members of the design team. All major facets of the libraries are programmable so they can be tailored to the needs of the design group they service. Certain design groups require more data control than others, so the flexibility exists to widely vary the degree of data control. Libraries are categorized as Public or Private. Both can be shared, but the main difference is that a private library is managed by the actual designer. It's used to hold his daily updates and often will have no formal control. The DCS achieves this by defaulting all control information to a simple non-restrictive form. For example, any designer can create private libraries on their own. They automatically become the owner and have the right to make additional designers "backup" owners. As the owner they can edit, save, modify, or delete any data in their library. The DCS automatically establishes all the proper AFS and AIX permissions. Owners of private libraries control who can access their data with the system accommodating the use of default "access groups" (such as AFS groups) so the designer doesn't have to enter the userids of all his team members each time he creates a new library. Since Private Libraries are considered working areas, data control checks are minimized in order to maximize performance. For example, when a new data element is created, the DCS does not check the Control Repository to make sure the owner has the proper authorities, locks, etc.. Instead, a designer is permitted to work in a completely unrestricted fashion in his own work space. All controls are placed on public libraries. The only control checking required is to ensure there are no data conflicts within the Private Library. It is acceptable for two Private Libraries to contain the same design data, so no checks across libraries are done. Public Libraries are the official project data repositories. All data delivered to external customers comes from Public Libraries. Public Libraries are overseen by Data Managers who configure the libraries with varying degrees of control. Typically the libraries are organized with a level structure whereby the lowest levels have the least amount control. Control gets more stringent as the levels increase, and the highest level denotes data released to manufacturing. Almost every attribute concerning data integrity is programmable by the Data Manager. Through a Data Manager Utility, they configure the structure (the number of levels and versions, including the connections between them), the various authorities, the required criteria to enter each level, and the types of Library Controlled Processes required at each level. The system can handle numerous public libraries, and each public library can service unlimited users. In accordance with our preferred embodiment of our DCS architecture we provide an Automated Library Machine (ALM). More than merely a repository for data, the ALM is a userid capable of accepting, executing and dispatching tasks without any human intervention. This enables the designers to make requests of the ALM to promote data or run library processes without the need for a Data Manager to process it.

In order to improve throughput, the ALM can dispatch parallel tasks if the operating system (i.e. AFS) supports it and the situation allows it.

This concepts improves efficiency, and increases security, since the ALM is the only user that requires writable permissions to the data repositories. The physical location of the data residing in Public Libraries is determined by the Data Manager. The DCS along with the Data Manager (and his alternates) are the only means of writing data into or removing data from these physical locations. As a means of safety, the Data Manager does have the ability to access and overwrite data in these physical locations without using the DCS (i.e. thru the OS). This is necessary in the unlikely event the control information gets out of sync with the physical data, and the Data Manager has to manually complete a transaction. Physical locations are defined through the Data Manager Utility for setting up Public Libraries. More details on this are available in the Data Manager User Interface Section 15.

Data Types (Section 1.3)

Data may be identified by a filename (anchor name 235) and a filetype (236). The DCS automatically segregates all data by "type". Types are very useful to associate a piece of data with a tool or process. For example, UNIX/AIX uses extensions to qualify data such as using a ".ps" extension to denote a postscript file. The Cadence Design Management System uses Cell Views to segregate the various types of data within a particular Cell (design component). This segregation is a fundamental building block to Design Control Systems since certain types of data require more design control than other types. Our DCS allows each individual type to be controlled on a level and version basis within a library. The DCS is capable of tracking any data type from any point tool, even third party vendors.

Levels (Section 1.4)

Each Public Library consists of n levels which are established by the Data Manager. The naming of the levels (239) are arbitrary, but each denotes a degree of quality of the design. Data moves into and out of levels via a "promotion" mechanism. There are two types of levels in the DCS, Engineering (or working) and Release Levels.

Figure 3:
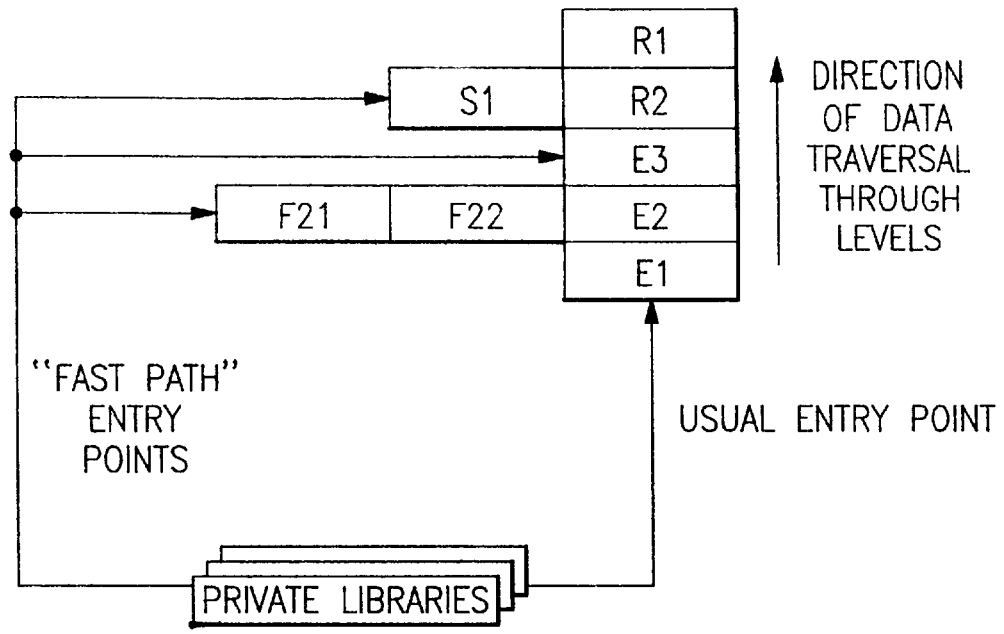
FIG. 3 illustrates our preferred Design Control System Level Structure.

FIG. 3 shows a typical level structure with 3 Engineering Levels denoted E1, E2 and E3, two main Release Levels denoted R1 and R2, a Sideways Release Level S1, and a Fast Path Stream consisting of F21 and F22. Data can be promoted into E1, F21, E3 and S1 from outside of the library, but it can only enter R2 from E3. E1, E2 and E3 are arranged in a serial fashion. The normal promotion path is for data to enter E1 (the least controlled level) and migrate up through E2, E3 and finally into R2 (the most tightly controlled level). The external paths into F21 and E3 are known as "fast paths" and exist to accommodate emergency updates to pieces of design residing at the higher levels. There are two different types of fast path arrangements:

Fast Path Entry means there is no fast path level associated with the Engineering level, just a "doorway" through which data can enter. Level E3 is an example of this where the user simply promotes data from the private library into E3. The DCS will run any preprocesses defined at E3, but any criteria that would normally be necessary to traverse through E1 and E2 is bypassed.

Fast Path Levels are staging areas where data is promoted into, and promoted through, in order to reach the target Engineering Level. There can be any number of Fast Path levels for any given Engineering Level. If there's more than 1, it's known as a Fast Path Stream since the data must migrate through all the Fast Path Levels before reaching the Engineering Level. F21 and F22 constitute a stream, which could've contained more than 2 levels. We have provided at least one level to provide an area where all the processing normally run at the E1 and E2 levels can be run to ensure that the fast path data meets all the same criteria.

Release Levels are handled in a different manner. R1 is the oldest release level and it's frozen, which means its contents can't be updated any longer. It contains a static snapshot of a design delivered to an external customer. R2 is now the active Release Level which is the destination of any data promoted from E3. The Data Manager programs the connection of E1 to E2 to E3 to Rn. The DCS automatically freezes the previous Release Level and connects E3 to the new Release Level whenever the Data Manager creates a new one. Unlike main Release Levels, Sideways Release Levels are always active and there can be n Sideways Levels for each Release Level. The purpose of the Sideways Levels is to hold post tape-out updates such as microcode patches to hardware under test. Since the Release Level corresponding to that level of hardware is probably frozen, and a new iteration of design is propagating through the Engineering Levels, the only path into a Sideways level is directly from a Private Library. The Data Manager has the ability to reconfigure the Engineering Levels at any time based on these rules:

The connections between levels can be changed at any time. (i.e. E→E2→E3 can be changed to E1→E3→E2.)

A level can be removed as long as no data resides in that level.

A level can be added at any time.

The Data Manager can create a new Release Level at any time. Existing frozen Release Levels can be removed as long as no data resides in that level. A frozen level can become an active level again if no data resides in the current active Release Level. The DCS performs a "thaw", a step which removes the current Release Level (R2) and connects the previous level (R1) to E3. As shown in FIG. 3, the DCS supports the normal promotion path to E1 as well as "fast paths" into E2 and E3. The following minimum checks are performed at all entry points:

The owner attempting to send data to a Public Library must possess the update lock. If no lock exists, the sender obtains the lock by default. If another user has the lock and the sender is a surrogate, he can obtain the lock (the system immediately notifies the original owner). If the sender is not a surrogate, the action is halted, until ownership is properly transferred.

If the level to which the data is being promoted to has any entry criteria, it is checked to ensure the data passes the criteria.

Versions (Section 1.5)

Figure 4:
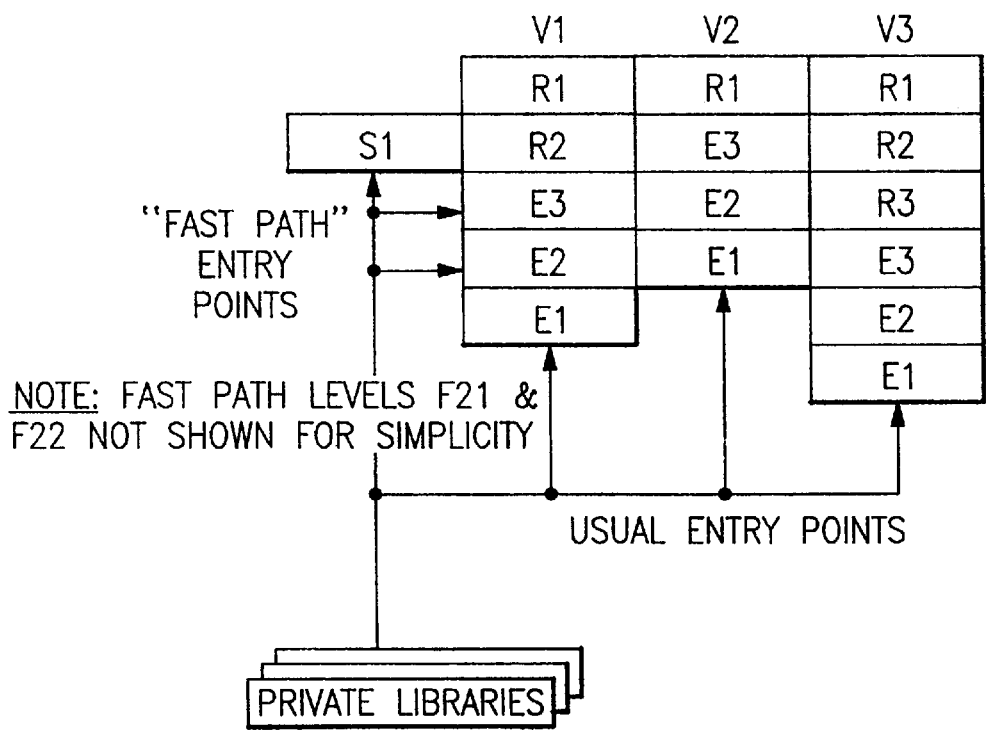
FIG. 4 illustrates our preferred Design Control System Level Structure with Versions.

Each public library consists of n versions which are defined by the Data Manager. The concept of versions exist to support parallel design efforts. All versions have the same Engineering (Working) Levels, but have different Release Levels depending on the frequency of tape-outs for that version. Data in separate versions is permitted to traverse the levels at independent rates. For example, if a piece of design has 2 versions, 1 version may exist at E1 while the other version exists at E3. FIG. 4 is an extension of FIG. 3 in which library structure has been expanded to show 3 versions, V1, V2 and V3. In theory there's no limit to the number of versions just as there's no limit to the number of levels. Versions can be independent or dependent. Independent versions are isolated and must ultimately contain the entire set of design components. Dependent versions are based on previous versions (which the Data Manager specifies when creating a new version). By supporting the concept of dependent versions, only the incremental data necessary for a new design variation needs to be libraried in the new version. The Library Search mechanism will be able to construct a complete design Bill of Materials by picking up data from both versions.

Library Search (Section 1.6)

Our preferred embodiment of the DCS provides support for "Library Searches". This allows data, which is used in multiple iterations of the design, to exist in only one place. In other words, if a design component is changed, only that component needs to be re-libraried at a lower level. A full model can still be constructed by starting the search at the lowest level where the component is known to exist. The library search mechanism will pick up the latest pieces at the lowest level, then search through the next highest level to pick up more pieces, and so on until it reaches the highest level where all components reside. In addition to searching through levels, the mechanism also searches through versions. The user provides a starting library level, version and either a single type or a list of types. If the version is based on a previous version, and all the necessary design components can't be located in the starting version, the mechanism searches the previous version based on the following two rules:

1. If the search begins at an Engineering Level in one version, it resumes at the same Engineering Level (not the lowest level) in the previous version.
2. If the search begins at a Release Level (including a Sideways Level) in one version, it resumes at the latest Release Level in the previous version. This may be older or more recent in time than the released data in the current version.

Figure 5A:
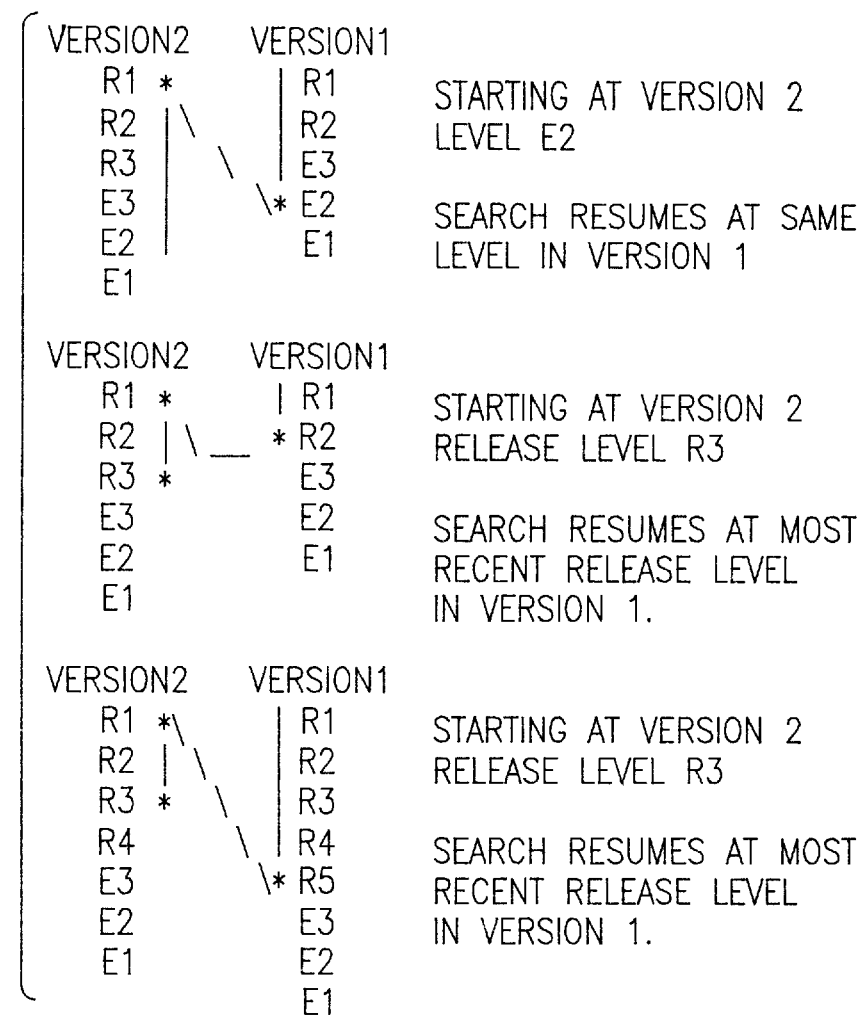
FIG. 5 (illustrated in parts FIG. 5a and 5b) illustrates our preferred Design Control System Library Search Examples.
Figure 5B:
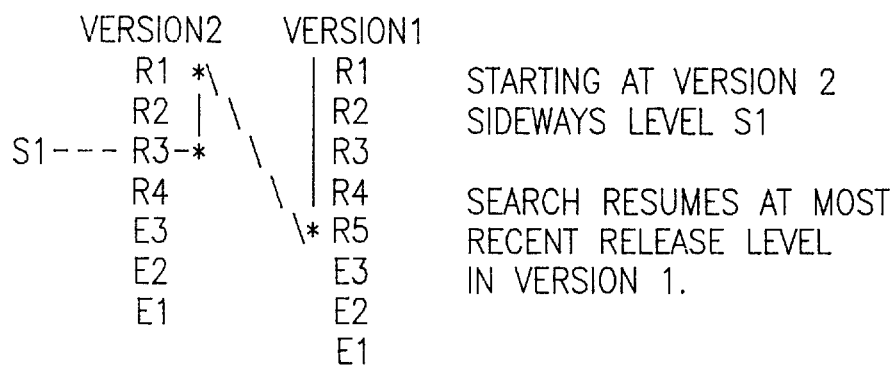

FIG. 5 shows examples of the Library Search Mechanism. The library search utility is available to designers, Data Managers and third party tools. The interface is both command-line and menu driven to accommodate any environment. In addition to the required parameters of type, level and version, the user has the option of specifying the name of a data object. These additional options exist:

Noacc

This allows the utility to use a temporary cached copy of the search order information for performance reasons. Since this information may be obsolete, the absence of the option results in the actual Design Control Repository being accessed and the search performed from within it.

File

Write the results into an external file.

Various Sorts

They control the way the output is sorted and displayed.

Nosearch

Only list data found at the starting level.

First/All

Indicates whether to include all existences of a particular design component or only the first one in the search order.

Select

Presents a selection list of all candidates so the user can choose those of interest.

Noversion

Prevents the search from tracing back across version boundaries.

Levels

Displays the search order based on the existing level structure.

Versions

Displays the search order based on the existing version structure.

Locks (Section 1.7)

In order to properly control shared data, the DCS supports several types of locking mechanisms. Two of the locks exist to control groupings of files that may comprise a model build. These are known as move and overlay locks. The user can set one of these locks using a utility which allows him to control the scope of the lock based on certain fields. The user can enter specific data or a wildcard, indicating "ALL", for Name of Design Components Type of Design Components Level of Design Components Version of Design Components Library Name By specifying only a library name and four wildcards, the user is requesting that all data in the library be locked. By filling in all five entries, a specific design component will be locked. Various degree of locking exist in between those extremes.

If the information corresponds to a Bill of Materials (BOM) and the user wants to set the lock on the entire BOM, a BOM Flag will exist allowing him to specify this action. Regardless of how these fields are filled in, all locks will be set individually so they may be removed individually. A lock does not have to be removed the same way it was set. The user will also specify the type of lock, Move, Overlay, or Update (Ownership). The following definitions exist:

Move Locks mean the data can't be overlaid by the same data at lower levels, nor can it be promoted to a higher level. This provides a method for completely freezing an Engineering Level while a model build or large scale checking run is in progress.

Overlay Locks are a subset of move locks. The data can't be overlaid by the same data from lower levels, but it can be promoted to higher levels.

Update (Ownership) Locks are the means by which a designer takes ownership of a piece of data. Update locks are designed to prevent multiple designers from updating the same design component in an uncontrolled way, thus resulting in data corruption or lost information. There are two types of Update locks, permanent and temporary.

Figure 6:
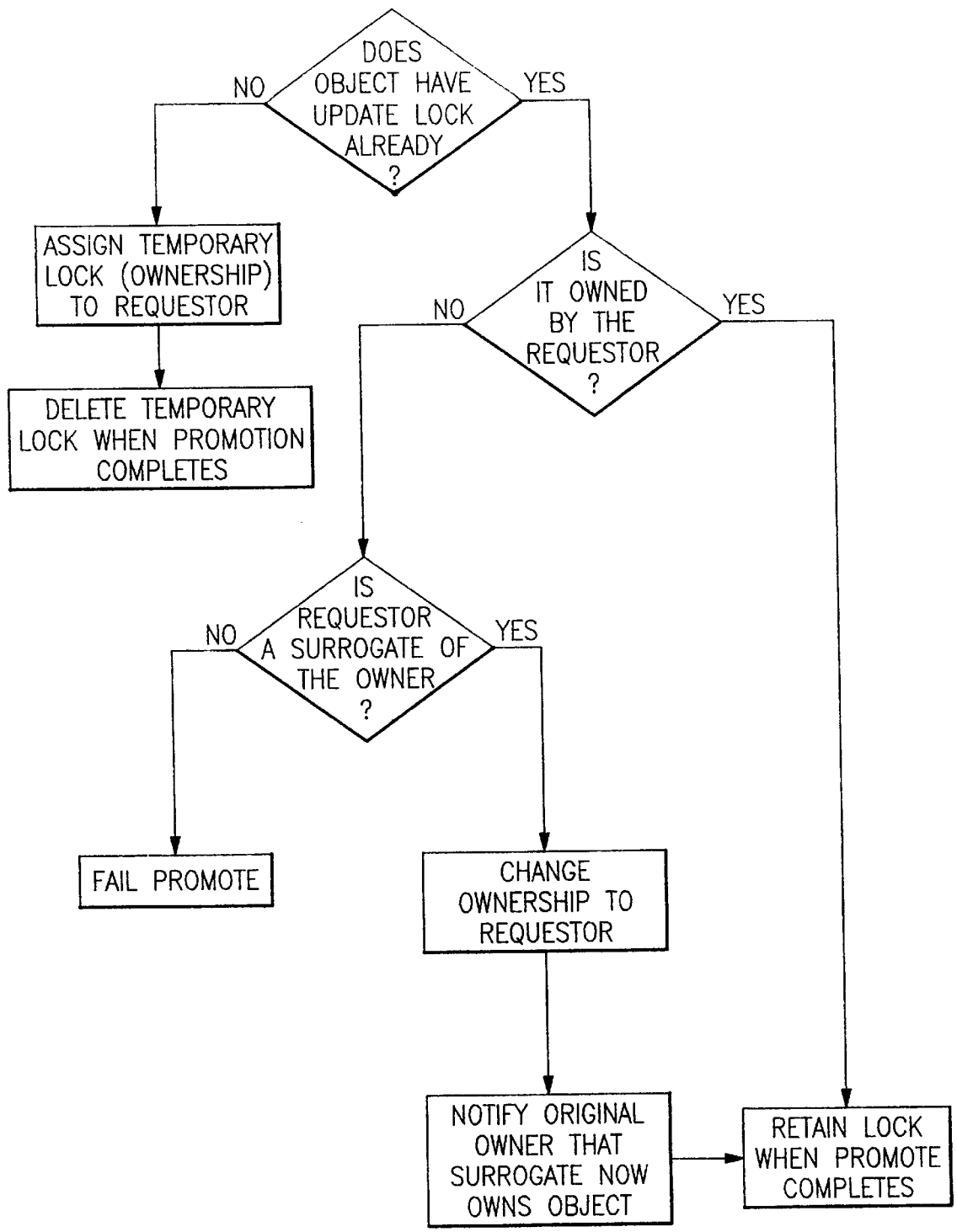
FIG. 6 illustrates our preferred Mechanism for Update Locks.

A permanent Update lock exists when the designer specifically requests to own a piece of data. This is done through a utility, and the DCS keeps track of this ownership. Other designers may copy and modify the data in their private libraries, but any attempt to promote that data into the public library will fail, unless the designer is a designated surrogate of the owner. The only way these locks are removed are by the owner resigning the lock or a surrogate assuming the ownership of the data, and the corresponding lock. A temporary Update lock exists to facilitate sharing a piece of data among multiple designers. The user can either request a temporary Update lock in advance (i.e. when he begins editing the data), or he can wait until he initiates the promote into the public library. The DCS will first check to see if anyone has a permanent Update lock, and if so, it will only allow the promotion to continue if the user is a designated surrogate. If nobody has a permanent Update lock, then the DCS will issue a temporary Update lock for the time the data remains "en route" to the final promote destination. Once it arrives safely, the temporary Update lock is removed and the data can be claimed for ownership by someone else. Surrogates are "alternate" owners of data. For example, a project may be arranged such that each piece of design is owned by a primary designer, but also has a backup owner (designer) to take over the design during vacations, emergencies, etc.. In this case, the owner can tell the DCS that the backup designer should be a surrogate, thus giving him the right to take ownership of a design component. The surrogate can either use the locking utility to specifically take ownership prior to making any updates, or he can wait until he initiates a promotion. The DCS will check to see if the design component is currently owned, and if so, check to see if the user is a defined surrogate. If both are true, it will give the user the chance to "take ownership" and allow the promote to continue. The original owner would be notified that his surrogate has taken ownership. FIG. 6 illustrates the lock mechanisms for Update locks.

Bill of Materials Tracker (Section 1.8)

The DCS has a built-in Bill of Materials (BOM) Tracker to facilitate tracking many design components in large projects. The main objective of the BOM Tracker is to group certain design components to make it easier to promote them through the library and track their synchronization. This is crucial for data sets that contain some source and some derived files from that source. The following features exist in the BOM Tracker:

It supports automatic data grouping, based on the design component name, with the notion of required and optional data types. One example might be a grouping which consists of a graphical symbol denoting the I/O of a design component, the corresponding piece of entity VHDL and the architectural VHDL. Any changes made to the symbol should be reflected in the entity, so the entity would be required. A change may also be made to the architecture, but it's not always necessary, so the architectural VHDL would be optional. When a promote is initiated to a public library, or between levels of a public library, the DCS checks to see whether a data grouping is defined for the data type being promoted. If so, then all required data types are checked to ensure they exist. In addition, any optional data types are checked for existence and they are also picked up. The entire grouping is promoted to the target level. If a required data type does not exist, the promotion fails. Automatic data groups are programmed into the DCS by the Data Manager. Since they are BOMs, all rules of BOM tracking, invalidation and promotion exist for the members of the grouping.

BOMs are used for two main reasons. First they are used to group many smaller pieces of data into larger more manageable chunks to facilitate movement through the library and increase data integrity by reducing the risk of data getting out of sync. The other main reason is to track the components of a model (i.e. simulation, timing, noise analysis, etc.). The DCS offers a very flexible user interface for creating BOMs in order to satisfy the various scenarios. The user can manually create BOMs by selecting pieces of design interactively, filling in search criteria and initiating a library search, or importing a simple text list. In addition, an API exists for point tools to create a BOM listing and pass it into the DCS.

The power of the BOM Tracker is augmented with our automatic invalidation routine. Once a BOM is created, the DCS constantly monitors for a change to the BOM. If any member is overlaid or deleted, a notification is sent to the owner of the BOM indicating that the BOM is no longer valid. The owner can continue to work with his model, but he is aware that he's no longer using valid data. Even though a BOM is invalid, it can still be moved through the library. This accommodates the occasion where a piece of a model had a relatively insignificant change. If the model builder deems it unnecessary to re-build the model, this feature allows him to continue his work and even move the BOM through the library.

Status on BOMs is and should be accessible in two ways. The first is by automatic notification (e.g. e-mail) to the owner as soon as a BOM is invalidated. The second is by means of displaying the BOM either interactively or in report form. This listing shows the overall status of the BOM, and all members of the BOM with their individual status.

The BOM Tracker also supports the concept of a "support" object. This can be a design component, a piece of information, documentation, etc., that can be associated and promoted with a BOM but never causes BOM invalidation.

BOMs are hierarchical in nature and a BOM can be nested within a larger BOM. Whenever a piece of data is overlaid or deleted, the DCS looks to see if that piece belonged to a BOM. If so, it immediately checks to see if the BOM belongs to other BOMs. It recursively checks all BOMs it encounters until it's at the top of the hierarchy. All BOMs found will be invalidated (if they are currently valid) and the owners notified.

BOMs support move and overlay locks. The user can set a move or overlay lock on a BOM, and the DCS will set individual locks on all the members. If a member is a BOM, all of its members will receive individual locks. These locks can be removed by using the main lock utility and specifying the top-level BOM or filling in the desired fields to individually reset locks.

The DCS supports the concept of a BOM promote, which means the user can request that all the contents of the BOM be promoted simultaneously. This increases data integrity by helping to ensure a matching set of design data traverse through the library in sync.

BOMs can contain members who reside at different levels, different versions and even different libraries. The DCS will only promote those members which exist in the current library, and reside in an Engineering Level below the target level. If a member exists in a different version and is also below the target level, it will also be promoted.

There is separate authorizations for creating and promoting BOMs. This is set up by the Data Manager, so they can have complete flexibility in controlling who can create and move BOMs.

Promotion Criteria and Promotion Mechanism (Section 1.9)

Figure 7A:
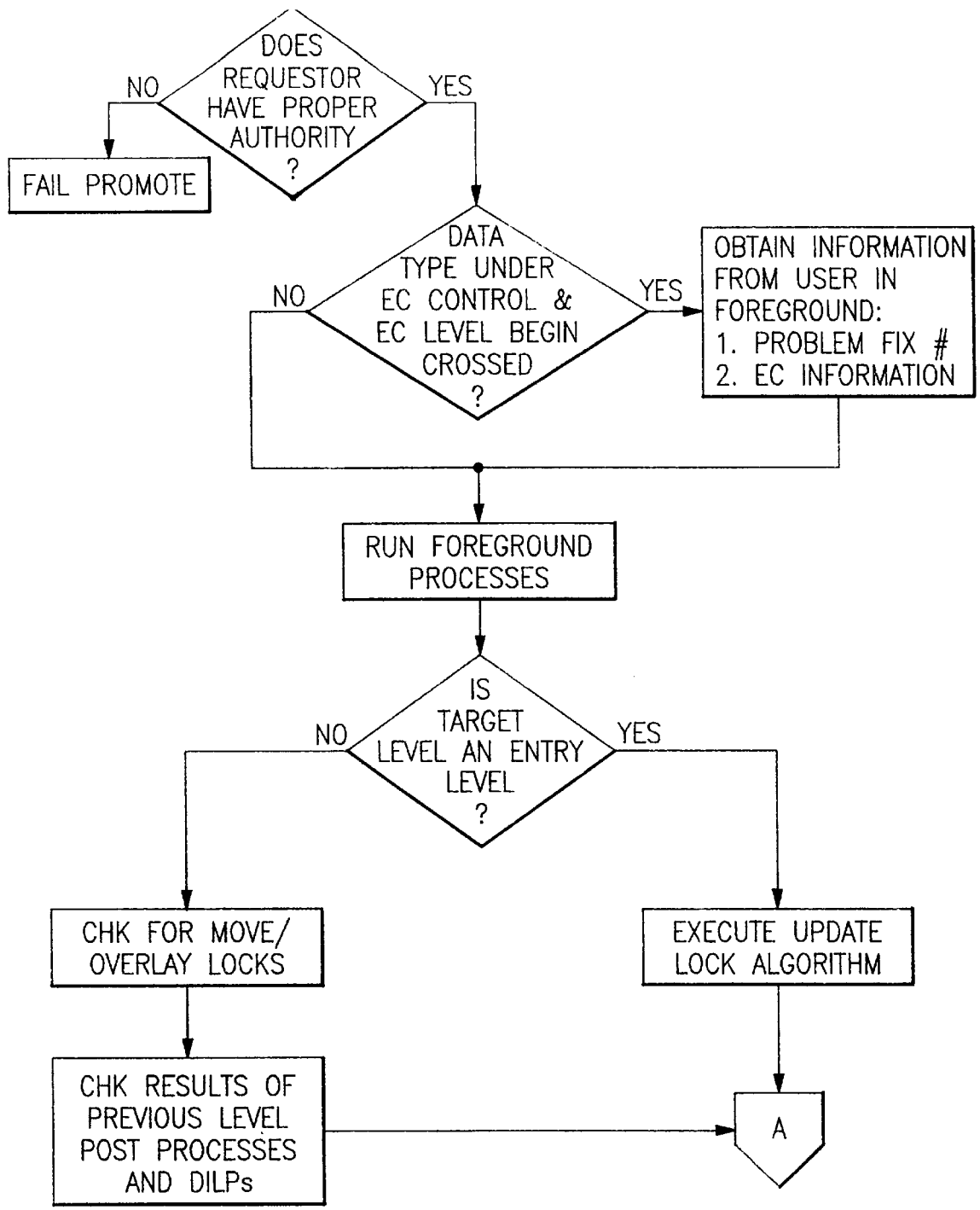
FIG. 7 (illustrated in parts FIG. 7a and 7b) illustrates our preferred Promotion Mechanism.
Figure 7B:
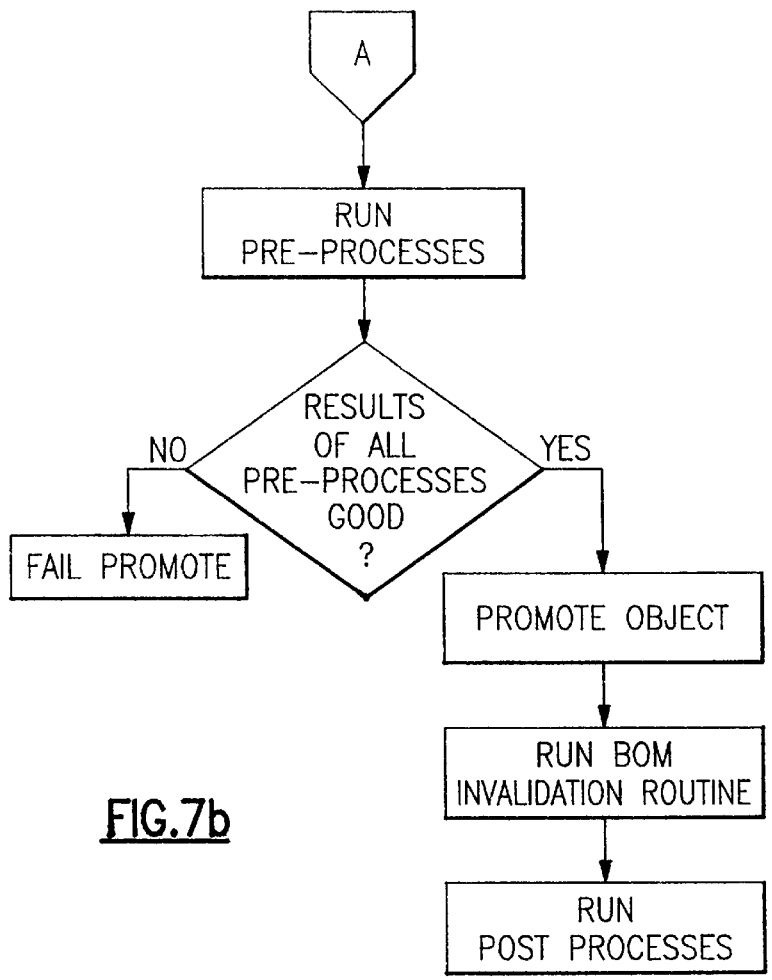

An important aspect of the DCS is that it provides a method for the design to traverse to different levels of goodness. As the design stabilizes at the higher levels, the number of pieces which need to be moved and tracked can be very large. The DCS uses the concept of promotion criteria and robust mechanisms to first determine what data can be promoted, then carry out the task in an expedient manner. The DCS supports two variations, "move" and "copy", promotes. In a "move" promote, data appears to the user like it only exists at the target level once the promote completes. The user is unable to access the copy that existed at the previous level. For example, if a design component is at level E2 and the user promotes it to E3, when the promote is finished and the user refreshes his image of the library, he sees the data at E3 only. In a "copy" promote, the data still appears at the previous level. The user can access it at either location. As new iterations of the same design component are promoted into a level, the old component is not truly overlaid. It is moved off to the side so it can be restored in an emergency. Promotion criteria usually exists in the form of library process or pseudo-process results, but in general it can be any condition that must be met by the the object(s) being promoted. It is defined by the Data Manager and can exist for any design component at any level and version. Certain design components don't undergo any formal checking or evaluation in the design process, so they may never have any promotion criteria. Other pieces may undergo the majority of checking so they may have lots of criteria. The objective of the DCS is to track actual results for each design component and use the promotion criteria to determine if the design can attain the next level of goodness. When a design component is overlaid or deleted, all corresponding results are deleted too. The DCS supports an emergency override mechanism which allows the Data Manager to promote data which does not meet the criteria. Invoking an emergency override cause a log entry to be written indicating criteria has been bypassed. The Data Manager determines which results are necessary for which types of design at each Engineering and Release Level. These results may get recorded through "library controlled" or "external" processing. At the time the promote is initiated (whether it be against individual design components or BOMs), the mechanism illustrated by FIG. 7a and FIG. 7b is invoked to determine what pieces should be promoted. There are three types of promote transactions.

1. Promotion of an Individual Design Component
2. Promotion of a Group of loosely-coupled Design Components
3. Promotion of a Group of tightly-coupled Design Components (i.e. BOMs)

Basically, the same mechanism is employed in all three cases, but cases 2 and 3 require additional optimization for high performance. In case 1, each step in the mechanism is executed once and the promotion either succeeds or fails. Case 2 is initiated by a user selecting a group of objects to be promoted. They may or may not have any relation to each other. In this case some optimization is done, but each object is basically treated as if it were initiated as an individual promote. For example, the authority check only needs to be done once since the same user is requesting the promotion for all the objects. However, since each object can have unique locks, criteria, processes defined, etc., most of the steps need to be repeated for each object. Case 3 is the most complicated because the DCS offers a great deal of flexibility. The actual implementation is dependent on the platform of the DCS and the type of control mechanism in place (file-based, object oriented database, relational database, etc.). If the user community wants to eliminate flexibility in return for increased performance, the DCS can enforce rules such as no library processing allowed for members of a BOM. In this scenario, the entire algorithm would be executed on the BOM itself to ensure the proper authority is in place, it meets the promotion criteria, and any processing that's defined is executed. However, each member could bypass some of the checks thus saving a significant amount of time. If the user community opts for flexibility, some optimization can still be performed. For example, if a BOM contains 10 members and the mechanism calls for five checks on each member, there doesn't need to be 50 requests for information. Depending on the platform, it may be optimal to either make one large request for each member (ten total requests) and obtain all five pieces of information in the request. In other cases it may be optimal to initiate a request for a piece of information, but solicit it on behalf of all ten members (five total requests). Since these BOMs can be extremely large, the various kinds of optimizations and trade-offs between flexibility and performance determine the exact implementation. As a convenience feature the DCS supports a multiple promote feature which allows the used to request a promote through multiple levels. For each level the promotion mechanism is followed as stated above. For example, when initiating a promote, the user can specify to move data from E1 to E3 with a single invocation. However, the DCS will internally break it into two separate promotes with the full mechanism being run for the E1 to E2 promote, then again for the E2 to E3 promote.

Library Controlled Processing (Section 1.10)

The concept of Library Controlled Processing allows tasks to be launched from a public library, against one or more design components, with the results being recorded against the components. This is an automated method to ensure that tasks, and checks deemed critical to the level of design are run and not overlooked. Since some of these tasks could be third party tools, the actual implementation can vary in sophistication. In its simplest form, Library Controlled Processing consists of the following constituent parts:

Foreground Processing:
This is the conduit by which the user enters any information required to run the tool. Menus may be presented or the user may interact in some other way.

Pre-Processing:
This refers to a library controlled process that is launched prior to the data being promoted to the target level. The process must finish and complete successfully, based on the promotion criteria of that process, if the promote is to continue. For example, if a pre-process is defined at level E2, then when the promote to E2 initiates, the process is launched and the promote "suspends" until the process completes. Once it finishes, the result is compared against the criteria to ensure it's satisfactory. The promote then resumes.

Post-Processing:
This refers to a library controlled process that is launched after the data arrives at the target level. The results of the process are used as promotion criteria to the next level.

Designer Initiated Library Processes (DILP):
This is very similar to a post process, but instead of the DCS launching the process, it's manually launched by the designer. DILPs usually exist to retry Post-Processes which failed. This eliminates the need for the user to re-promote the data just to initiate the processing. If a DILP is used to recover a failing Post-Process, and the DILP is successful, the good result will overwrite the bad result from the Post-Process. Just because DILPs are primarily used to recover failing Post- Processes, the DCS doesn't make this a restriction. The Data Manager can set up DILPs as stand-alone processes with no corresponding Post-Process. DILPs that exist to recover failed Post-Processes are optional in that they are not counted as required promotion criteria. Stand-alone DILPs can be optional or mandatory, with mandatory DILPs being required to run successfully in order for the data to promote to the next level. The DCS allows the Data Manager to designate which DILPs are mandatory and which are optional.

Level Independent Pseudo Processes:

These are special types of process which are more like process results than actual processes. They exist as a means to record information outside of the scope of results from Library Controlled Processes or External Data Processing. For example, suppose a Library Process exists to run a layout checking program which checks for wiring and ground rule violations. Ultimately the program will return some pass/fail result, such as a return code, which the DCS uses as the process result. The tool may also return other useful information which the designer wants to save, such as the number of wires or cells in the design. Pseudo processes provide a repository for this kind of data. Like DILPs, these can be used as mandatory criteria for promotion, or they can be optional and used solely for information. They can even serve as status indicators for design components progressing through a lengthy process at a particular level. The concept of level independence means the checking program could be run at the E2 level, but the pseudo process results can be stored at E3. In short, the DCS allows a pseudo process to be defined at any level, and it can be set by a process running at the same level, any other level or completely outside of the library. The DCS provides an API for setting level independent pseudo processes. The API can be used by designers, Data Managers or third party tools, and employs a "process search" similar to a library search. This means the API allows the user to specify the name of the process, the data type, level and version. The DCS will use this as a starting level and search for all matching pseudo processes defined at or above this level by following the same library search mechanism as in FIG. 5. A flag also exists to disable the search and set the result for the process specified at that level and version.

Any number of any type of process can be defined by the Data Manager for a given data type at a particular level and version. In addition, processes can be chained together in independent or dependent sequences. In a dependent sequence, each process must complete successfully before the next process in the chain can initiate. For example, when compiling VHDL, the entity must always be compiled prior to the architecture. Thus two compiles could exist as a dependent sequence where the entity is compiled, the result checked, and if successful, the architecture is compiled. In an independent chain, the first process initiates, and when it completes, the next process runs regardless of the outcome of the first process. Processes can also execute using input data other than the object used to initiate the promotion. Using the VHDL compile example, the actual object being promoted could be a simulation BOM which contains that entity and architecture VHDL. The DCS provides a robust system for the Data Manager to define the processes which should be run, and the type of data they should run on. Certain library controlled processes require special resources such as large machines, extra memory capacity, etc.. Therefore, the DCS allows the Data Manager to specify a particular machine or pool of batch machines where the tasks can execute. Either the task is transferred to the specific machine or a request is queued up in the batch submission system. In the event that a task must run on a completely different platform, the DCS provides hooks to launch a library controlled process from one platform which initiates a task on a different platform (i.e. a mainframe). The results are returned back to the original Automated Library Machine and processed. This Cross-Platform capability allows the DCS to encompass a broad and sophisticated methodology utilizing tools on many platforms. Regardless of how the process is launched, the results must ultimately get recorded within the DCS. To accomplish this, the DCS provides an Application Program Interface (API) through which third party tools can communicate. When the task completes, the API is used to convey the results and the pedigree information back to the DCS. The DCS provides both an interactive means and a report generator to view process results. FIG. 7a and FIG. 7b illustrate the method by which promotions and library controlled processing interact.

External Data Processing (Section 1.11)

External Data Control is very similar to the Designer Initiated Library Process in that the user launches a task against some design component(s). However, unlike DILPs which require that the design components be under the control of a Public Library, this type of processing is done on data in Private Libraries and designer's work spaces. External processing is the mechanism whereby the DCS captures the results of the process along with pedigree information concerning the input data, output data and any necessary software support or execution code. This pedigree information is stored along with the design component for which the designer initiated the process. When the designer promotes that component at a later time, the DCS checks the pedigree information to ensure nothing has changed. It then checks to see if the external processing matches any of the defined library processes which are required for the promote. If so, and the external processing results meet the criteria, the library process results are set (as if the library process just ran automatically) and the promote proceeds. If no matching process can be found, the external results continue to be saved with the design component as they process may match that at a later level. The concept of External Data Processing exists to increase productivity by allowing the designer to save, and later apply, results obtained during the normal course of design rules checking to the "official" results the DCS uses to determine the level of goodness. Overall data integrity can easily be breached if a proper mechanism for calculating pedigree information is not implemented. For this reason it's imperative for the DCS to ensure that all the proper input, output and software data are included in the pedigree information. External Data Processing occurs in two phases. In the first phase, the designer runs some tool or process and if the results are acceptable, he runs a utility to designate the data for external processing. The role of the utility is to create the Pedigree information which contains a listing of the input and output data, the results, and some type of date identification code for each member of the Pedigree and the Pedigree itself. A simple identification code is a cyclic redundancy check. The utility can be independent of or incorporated into the actual third party tool. The second phase consists of librarying the data and the results. The designer invokes a special form of a promote which first does the following:

1. Check the data identification code (i.e. CRC) of all members in the Pedigree

2. Check the data identification code of the Pedigree itself.

These 2 steps are designed to ensure the same data used to generate the result is indeed being libraried. The identification code of the Pedigree ensures that the contents of the Pedigree weren't manually altered. From this point on, the normal promotion mechanism in FIG. 7a and FIG. 7b is followed with one exception. The boxes where Foreground, Pre and Post Processing occur are all bypassed. Rather than simply checking existing results to see if they meet criteria, the DCS makes a list of all Pre-processes for the target level and Post processes for the previous level. It then checks the Pedigree information for evidence that equivalent processes were run and achieved acceptable results. If any processes exist in the DCS for which no corresponding Pedigree results exist, or any Pedigree result does not meet the prescribed criteria, the promote fails.

Authorities (Section 1.12)

The DCS permits the Data Manager to establish a wide variety of authorities which gives him great flexibility in managing the library. Each type of authority can be defined very loosely (the user is authorized for all design components, at all levels, in all versions) to very tightly (the user is authorized on an individual design component basis). The utility for granting authorities works in one of two modes:

In one mode the Data Manager is offered a screen in which he can fill in the design component name, type, level, version, user ids, and the type of authority. For any field, except for the user ids, he can default it to "ALL".

In the other mode an authority profile can be called up and executed. An authority profile allows the Data Manager to pre-define the types of authorities for a given type of job. For example, profiles may exist for Designer, Technical Leader, Model Builder, etc.. This information is contained in an editable ASC file in which the Data Manager defines the kinds of authority to varying degrees of restriction. Once the profiles are created, the Data Manager uses this mode to either add/delete users to/from the profile and process the changes within the DCS.

Authorities exist for the following tasks:

Setting Locks (Move, Overlay, Update, ALL)

Promoting design components and/or BOMs into levels (Engineering Levels, Release Level.

Creating BOMs

Initiating Library Processes

Setting Pseudo Process Results

Data Manager GUI User Interface (Section 1.13)

The DCS contains a robust Data Manager interface which is used to "program" the library. It's configured as a series of sub-menus arranged under higher level menus. Each sub-menu has fields to fill in and may employ Predefined Function (PF) keys for additional features. Graphical elements such as cyclic fields, radio buttons, scrollable windows, etc.. may be used to further enhance usability. Utilities exist to:

Define the library properties

The user is afforded a means to enter the path of the repository where the data resides, the userid of the Data Manager and any alternates, the userids of any Automated Library Machines, and whether the library is under Design Fix or Part Number and EC control. If the library is under any type of control, additional entries are made for the data types which should be tracked by Part Number, the data types which should be tracked by Design Fix number, the EC control level, and a field for a generic problem fix number. For any ALMs, the DCS will automatically add the proper authorities (including operating system authorities) to permit the ALM to store data and record results.

Define the structure (levels, versions and their interconnections).

This is the means by which the Data Manager adds and deletes levels and versions. It also enables him to defined the interconnections of the levels, and the dependance of versions on other versions. A minimum interface consists of one screen for level structure and one for version structure. The level structure screen displays the current structure.

Define the types of data which will be under library control.

For all data types known to the DCS, this enables the Data Manager to select those managed in this particular library. The screen displays all known data types in the system with a flag indicating whether it's being tracked by this library. Each data type also has a field for an alternate storage location. This solves the problem caused by certain data types that can be very large. Therefore, problems may arise in trying to store these data types along with the all the other types in a particular level. By specifying an alternate storage location, these large data types can be further segregated.

Manage Library Controlled Processes

For each level, the Data Manager can add, modify or delete processes. For each process information is required about the type of machine it can run on, any necessary arguments, the result criteria, disposition instructions for the output, whether it's dependent on another process, and whether it should be deferred. The DCS provides Process Specific Boilerplates which can be used to manage process configurations for an entire project. Necessary and required information for each process can be programmed into the DCS, so when a Data Manager attempts to define that process to his library, some of the fields appear with default data already filled in. He can override any of the data.

The information for each process can be entered/edited individually on a menu containing all the above fields or a utility exists to load "process groups" which are pre-defined library controlled processes. The Data Manager simply selects a process group and attaches it to the appropriate data type, level and version. The process groups are ASC based files which contain the necessary process information in a prescribed format. They can be created using any ASC editor.

Set up authorities.

See the previous Section 1.12 for details.

Define automatic data groupings (Subset of BOM Tracking)

This enables the Data Manager to define a data group which consists of a master object and member objects. Each member object can be required or optional. For each master object entered, the user must enter a list of member objects with their required/optional flag. In addition, an Erase-To-Level flag exists which determines the outcome of the following scenario: a data group, comprised of optional members, exists at a level. The same data group, without some of the optional members, exists at the next lowest level. Upon promotion of the lower level data group, the DCS will either erase the members of the upper level data group or leave them, depending on the Erase-To-Level flag. By leaving them in place, it allows members of newer data groups to join with members of older data groups.

Design Fix Tracking (Section 1.14)

One of the most powerful aspects of our DCS is provided by the process used to track fixes to design problems. This is accomplished by tightly or loosely coupling the DCS to a problem management database. Typically, a problem is found and entered in the problem tracking database. Once the design components are identified which require updating, the DCS is used to attach the problem number to those design components. Ideally this should be done prior to the design components entering the library, but it can be done as part of the promote. It's often redundant to track all design components with problem numbers, so the DCS can be programmed to only enforce Design Fix Tracking on certain data types. Whenever a promote is initiated, the DCS checks to see if the library is in Design Fix Tracking mode (which means some data types require Fix problem numbers to enter the library), and looks to see if any of the data types included in the promotion are being tracked. For those that are, a screen displays all known problem fix numbers for that design component. The user can select an existing one or add a new one to the list. At this time, the DCS will check to see if the EC control level is being crossed (or bypassed via a fast path promote). If so, it will attempt to associate the problem fix number to an EC identifier. If it can't automatically determine this association, the user is prompted to enter the EC identifier for the selected problem fix number.

If the designer chooses to do the association in advance, a utility exists which allows him to enter a problem fix number or choose a default number. The status is immediately reflected as "working". Once the promotion is initiated the status will switch to "libraried". The DCS offers utilities to view or print reports showing which design components exist for a problem or which problems are fixed by a design component. The report generator allows the user to enter the problem number and see which design components are associated to it. Or the design component can be specified to see which problems it fixes. Finally, and EC identifier can be specified and all problem numbers and design components associated with the EC can be displayed.

Part Number/EC Control(Section 1.15)

In addition to tracking design fixes, the DCS can track the design by part number and/or EC. For projects which assign part numbers to various design components, the DCS provides utilities to generate and associate these part numbers to the design components. In addition, the DCS supports Engineering Changes where successive tape-outs are assigned an EC identifier. All design components participating in an EC are associated with the EC identifier. Since part numbers are assigned to specific design components, the DCS uses the links between components design fixes and EC's to track the association of part numbers to ECs. The DCS uses the concept of a PN/EC control level to permit the Data Manager to determine at which level PNs and Design Problem numbers get associated with EC numbers. As design components cross this level, the DCS checks to see whether a problem number or PN exists for the component. If so, and the system is able to determine which EC that number is associated with, it automatically connects the component to the EC. Otherwise, if no EC information can be found, the user is asked to enter it. The rules for Design Fix and EC control are as follows:

One EC can contain multiple Design Fixes;

Any single Design Fix # (number) can only be associated with a single EC;

One design component can have many Design Fix numbers, but they must all belong to the same EC; and Variations of a design component can exist in multiple ECs, but each must have a unique set of Design Fixes.

Figure 8A:
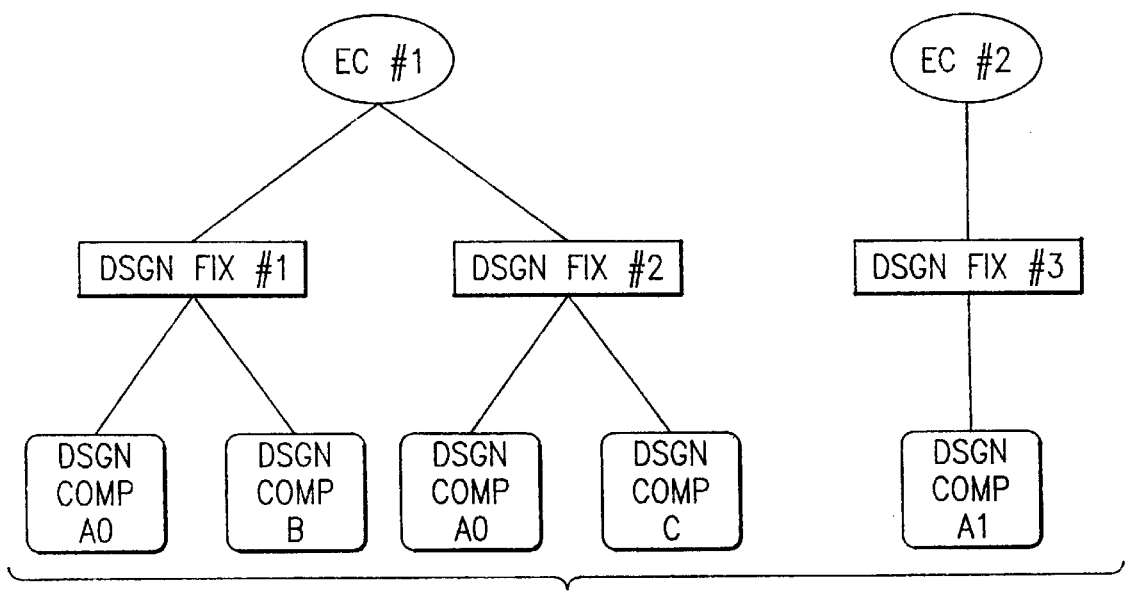
FIG. 8 (illustrated in parts FIG. 8a and 8b) illustrates our preferred Design Fix Management and EC Control.
Figure 8B:
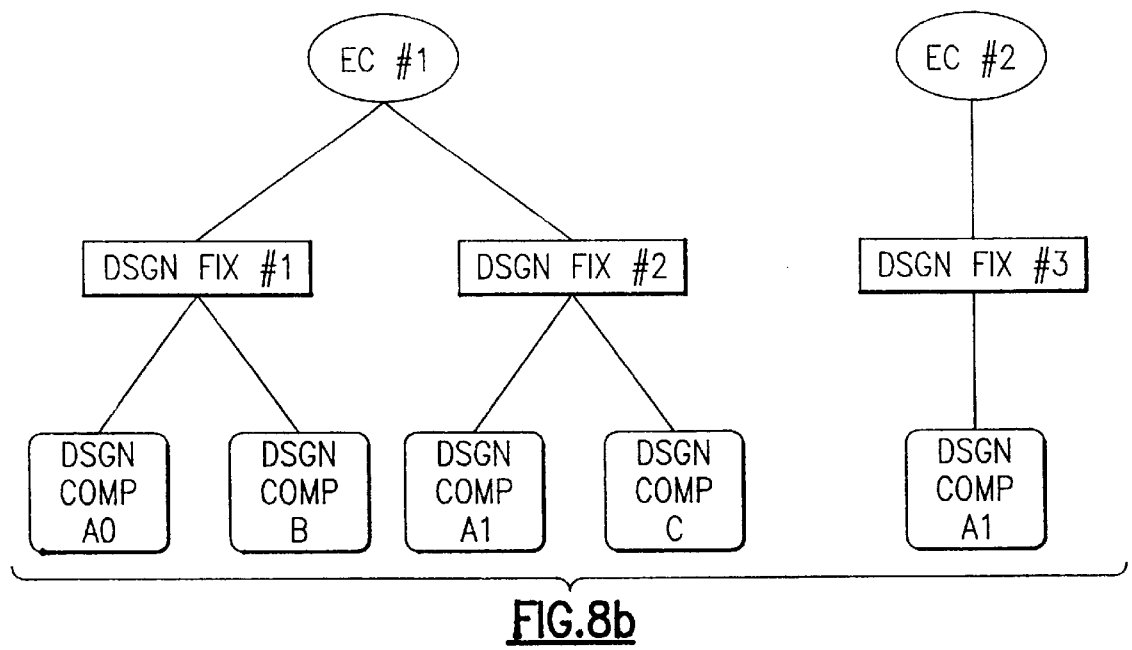

FIG. 8a illustrates a legal example. It shows two EC's where the first contains two design fixes and the second contains a single design fix. There are three design components, of which the one denoted A0 is associated with Design Fix #1 and Design Fix #2. Design component A1 is a different variation of design component A0 The example shows how the two versions of design component A must belong to separate ECs. In FIG. 8b the rules have been violated since design component A1 is associated with Design Fix #2 which belongs to EC #1. The DCS detects this condition and alerts the user to either move Design Fix #2 over to EC #2, or detach design component A1 from Design Fix #2. In addition to tracking all the part number and EC information the DCS is capable of generating a variety of reports including one listing all the part numbers for a given EC. This report can be sent to manufacturing in advance so the foundry can manage their resources.

RAS and Security (Section 1.16)

The DCS is designed in such a manner that provides maximum security for the control data. None of this data is present in simple ASC files residing in a writable repository. All updates to this information must be made through the proper utilities by authorized people. Libraried data only exists in repositories where the Data Managers or owners of the data have write permission. This prevents other users from modifying another designer's data outside of the DCS. Nearly continuous availability is achieved by implementing the DCS in the following manner:

If the primary DCS server fails, the system can be brought up on another server with minimal human intervention. The physical locations of all libraries are determined by the Data Manager which permits the data to be strategically located throughout the network to improve availability.

Multiple paths exist to request information from the Control Repository. They provide alternate routes in the event of network or router problems.

Archiving and backing up data is accomplished with the following features:

The Design Control Repository can be archived onto tape or backed up to another repository by the Data Manager as often as deemed necessary. In the event of corruption, this back up copy can be restored into the primary repository.

All libraries can be archived to tape or backed up to alternate repositories defined by the Data Manager as often as deemed appropriate.

The DCS provides a utility which checks to see if a backed-up or archived copy of the Design Control Repository is in sync with a backed up or archived copy of a library. During the archiving procedure, the system assigns unique identification codes (i.e. CRC codes) to each data object. These codes are used during the recovery to ensure the data was not tampered with while dormant on the back-up repository.

The system provides a method for restoring individual data objects from backed-up or archived repositories in the event the data object is deleted from the active library.

GUI User Interface (Section 1.17)

The User Interface consists of all the menus, dialog boxes, and screens by which the designers interact with the DCS. They all have the following characteristics in common:

They are user friendly with convenient on-line help.

They share a common look and feel to make it easy for the user to find common features.

When something fails or the user makes an entry error, the system clearly indicates the error with an English description of the problem, and suggestions on how to fix it.

A command line interface exists to perform any operation that can be done through the graphical user interface.

Various designer utilities exist to:

Initiate promote requests. The minimum interface requires the user to enter the name of a design component or select from a list, enter the level from which to begin the promote, the target level where the promote should terminate, a flag indicating whether it's a BOM promote, and the version.

Send results from External Data Processes to a library. This utility allows the user to enter the name of a Pedigree and the target level and version to which the Pedigree information should go.

Set up and manage a private library. The utility has fields where the user can specify the name of the library (if one is to be created), the library path where the repository will reside, the userids of the owners, and either the userids or authorization groups of those who can access it. These properties can be called up for modification at any time. Whenever the owner or access fields are altered, the DCS automatically updates the authority records within the Design Control Repository as well as the operating system (i.e. AFS) permissions of the directory where the library resides.

Create and monitor a Bill of Materials. The utility offers two modes of operation. In the first, the user identifies the Bill of Materials, and enters the names of all design components to be added as members. This same utility will display any existing information for a BOM, so members can be modified or deleted. For each member, the user must indicate whether it's an input, output or support member. For an existing BOM, a function exists to revalidate all members, but this can only be done by the BOM owner. The second mode builds the BOM by reading all the information from an ASC text file written in a prescribed format. This mode can be used by designers, Data Managers, and third party tools. Regardless of how the BOM is created, a newly created BOM will result in the valid flags being set for all members. The user who creates the BOM using the first mode is automatically the owner, whereas the input file used for the second mode contains the owner information.

View process and pseudo process results. The user specifies the design component, data type, level and version. He can specify the exact process or obtain a list of all processes. For each process, the display shows the result (if it exists), the date and time it was set, how it was set (library controlled process, external process, or manually) and the criteria. These results can only be changed by the Data Manager.

Associate design problem numbers to design components. The designer uses this to pre-associate problem fix numbers to design components before they are promoted into the library. This way technical leaders and other designers can determine if a particular problem is being worked on. The interface requires the user to identify the component by name and type. Since it's not in the public library yet, it has no level or version. The user must also supply the problem fix number. The DCS automatically assigns the "working" status to it. Later, when the designer wants to promote the component, the problem fix number will appear on the selection list, and after the promote completes, the status will change to "libraried". The DCS allows the Data Manager to define a generic problem number which designers may select to associate with miscellaneous design changes that have no corresponding design problem.

WWW/Internet Access (Section 1.18)

The DCS provides a mechanism which permits access to all process and pseudo process results through the World Wide Web. Key quality control indicators can be exported out of the DCS into an accessible format by users on the WWW. Usually these results would exist in a secure repository which could only be accessed by WWW users who are working on the project. This same mechanism can be used for network access in general, including the extranets, intranets, and the internet. In addition to accessing information, the ALMs can receive special e-mail requests from users to perform these tasks:

Generate various status reports on topics such as PN-EC and Design Fix Tracking, Process & Pseudo Process Results, or BOM information. The DCS would generate the report on the fly and return it to the user's Internet or e-mail address.

If the user has the proper authority, he can submit e-mail requests to add pseudo-process information into the DCS. The contents of the mail would contain a specifically formatted command which the DCS can interpret to set the appropriate results. This could be used by people remotely connected to a project (such as the chip foundry) to send status information directly to the DCS.

The DCS permits an authorized user to send commands through the Internet Common Gateway Interface (CGI) to query information from the DCS or invoke Designer Initiated Library Processes (DILPs).

Actors & Objects (Section 1.19)

Figure 9:
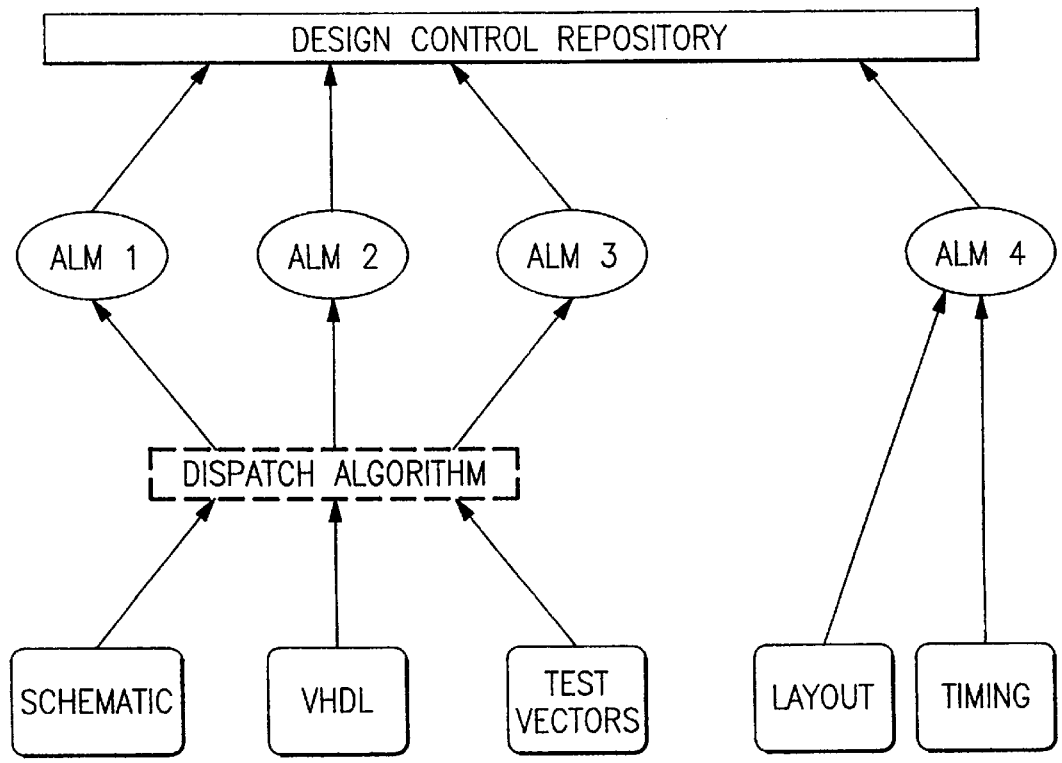
FIG. 9 illustrates our preferred DCS Using an Actor/Object Environment.

In the event of a project where a single large design team or multiple smaller ones, require their data to reside in a single repository, the potential exists for a performance bottleneck in the Automated Library Machine. The DCS offers a feature called Actors & Objects to combat this. Actors & Objects allow the Data Manager to define an alternate structure in which designers tasks are dispatched to a pool of Automated Library Machines (Actors). No design data is stored on any of them; they merely execute the tasks then store the results and data into the Design Control Repository (Object). The Data Manager can control the types of jobs each Actor is allowed to perform by creating Actor Lists. These lists contain information which the DCS uses to determine which ALM to route a particular job to. FIG. 9 shows an Actor/Object environment with four Actors. Jobs involving the data type of layout and timing are segregated to ALM4. All remaining work is sent to ALMs 1 through 3. The DCS determines which to use based on an mechanism which tries to find either a free ALM or choose one that may be able to spawn a parallel process (assuming the operating system supports it).

Importing and Tracking Data (Section 1.20)

Internally the DCS tracks all data by component name, data type, level, version, library and most importantly a file reference (fileref) number. These six attributes give every piece of data in the system a unique identity. In a private library, all data is tagged with a DCS identifier as part of the filename, but the identifier may or may not be unique. This is because private libraries don't have a concept of levels, versions or file references. They are merely working areas for the designer, and only require the data to be identified by name and type. The system permits the designers to have multiple copies of a design component by using iteration numbers to distinguish between recent and older data. However, even though the concepts don't apply, the DCS still assembles an identifier and tags the data. There are two methods by which a piece of data can appear into a private library.

1. The designer creates the data from within the private library using some tool (Schematic editor, text editor, circuit simulator).
2. The data is created by some tool completely outside of the private library, but the designer wishes to import it into the library.

In either case, the tool (or user) chooses the filename. By default, this is the design component name. In the first case, the designer will be asked to specify the data type either prior to, or during invocation of the tool. In the second case, the user will be prompted for the data type during the import. In both cases of a data type entry requirement the DCS will automatically default the version, level and file reference number in order to assemble a uniform identifier code. This code will be appended to the design component name and will become the new name of the object. Upon promotion from a private library into a public library, the DCS will automatically assign a real file reference number to the object. Based on the destination version, and level, the DCS will assemble a new identifier and rename the object accordingly. The file reference number remains the same for the life of the object. As the object traverses through the levels of the library, the level is the only piece of the identifier that changes. In addition, the DCS maintains the same identifier information internally. This is considered the official tracking information and is always updated first during a promotion or installation of a new object into a public library. The object renaming is done afterwards. Appending the identifier to the object name serves two purposes:

It increases data security by providing a way for the DCS to check data integrity during promotions. The information contained internally must match the external identifier at the start of a promote. A mismatch signifies possible tampering of the data outside of the DCS, and the Data Manager is alerted to the mismatch.

It provides an alternate way for a user or another tool (such as the library search mechanism) to ascertain the version, level, and data type of an object simply by looking at it. This contributes to the availability by providing a means to locate and access data even if the Design Control Repository is unavailable (i.e. server down).

Figure 10:
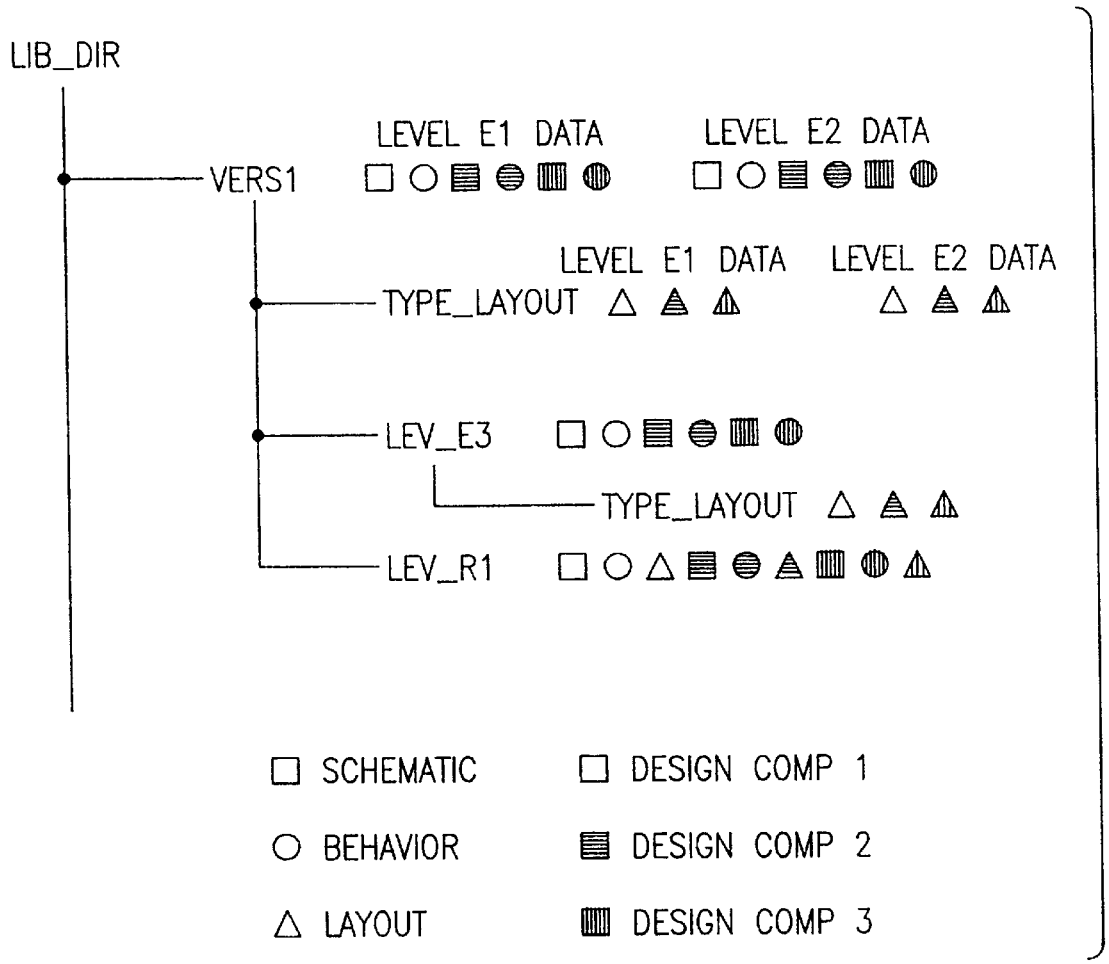
FIG. 10 illustrates our preferred Example of Location Independent Data Tracking.

One major advantage to this tracking scheme is it's independent of the physical location of the data. The DCS permits the Data Manager to establish as many repositories as he needs down to any level of granularity. For example, all data for a library could reside in one physical directory, the data could be segregated by version only, or there could be separate directories for each type of data. This level of flexibility allows the Data Manager to optimize the library to a given environment. For example, he can define his repositories in such a way that the data which moves most often is located on a single volume on his fastest server. Data which never moves (i.e. Release Level data) can be located on slow servers or spread out over multiple servers. As the Data Manager defines his library structure, he can specify the locations for every level of each version. In addition, if he has specific data types that he wishes to further segregate, he can specify a location for them. Finally, the DCS supports a feature called Automatic Component Grouping in which all data types for a given component name will automatically be located in a subdirectory off of the level directory. FIG. 10 illustrates a portion of a library directory structure with different levels of storage granularity. LIB_DIR is the primary directory for all data in the library. Under it, data is segregated by version where version 1 data resides in the subdirectory VERS1. At this point the diagram illustrates three examples of further segregation. In the VERS1 directory are are the schematics and behaviors which comprise level E1 and E2 for all 3 design components. Although they are physically mixed together, their unique identifiers allow the DCS and users to tell them apart. The diagram shows the circuit layouts to be further segregated by data type. So they reside in subdirectory TYPE_LAYOUT Once data reaches level E3, it is segregated by level and type. LEV_E3 contains all the schematics and behaviors for the E3 level, but the layouts reside in the TYPE_LAYOUT directory under LEV_E3 The final example shows data segregated only by level with no regard to type. This is seen in the release level repository LEV_R1 By offering this kind of flexibility, the DCS permits the Data Manager to group the data in the most advantageous way. In addition, the Data Manager could invoke Automatic Component Grouping, which would result in further subdirectories under VERS1, LEV_E3 and LEV_R1 to segregate the pieces by component name.

Note: This is unnecessary in the TYPE_LAYOUT directories since the only difference between the objects is the component name. In order to boost performance, every time a structural change is made to a library which involves repositories, the DCS automatically generates a master cross reference between library/level/version/type and physical location. This table is used by mechanisms such as the library search engine to locate data without requiring extensive querying of the Design Control Repository. It also enables library searches to occur in the event the Design Control Repository is unavailable.

Preferred Embodiment for Managing Shared Libararies (2.0)

The present embodiment provides a controlled environment for the acquisition, movement, disposition and removal of data from a Data Management System. The embodiment is described from the perspective of an overall algorithm which manages data Libraries. This encompasses not only the storage management issues but the necessary interaction with a centralized Data Control Repository.

Our embodiment covers a broad array of implementations ranging from a system whereby the user constantly interacts with the Data Control Repository to acquire ownership, deposit or move up through the system described in the preferred embodiment which incorporates Automated Library Machines (ALM) with a sophisticated file movement algorithm.

The Library Management algorithm serves as the interface between the user and the Data Management system for routine data control functions. Our preferred embodiment interacts with the Lock and Authority Manager to permit an environment which allows multiple users to possess ownership in a data object, but ensures only one owner is updating an individual instance at any given time. A Check Out utility is provided for the user to request ownership to a piece of data, transfer ownership, or take ownership if they are an authorized surrogate of the current owner. Likewise, a utility exists to perform data deletion in a safe and controlled manner by ensuring only authorized Data Managers or valid data owners delete their own data without jeopardizing any other data.

An integral part of Library Management is establishment of private and public libraries. Often these public libraries are shared by many users which can create data integrity exposures if data is not properly stored into and moved through a public library. The overall algorithm manages the movement of the data between the actual physical locations specified under the established library structure. Since our embodiment permits data to reside across different computer platforms, the algorithm contains functions for handling cross-platform data transfers. Although our Library Management algorithm only requires a simple promotion algorithm in order to function, the present embodiment reveals a highly sophisticated File Movement Algorithm.

Lightly loaded Data Management Systems can usually support execution of the above Library Management functions in the client's environment where the user calls upon the Data Control Repository to initiate the function, and the repository immediately invokes the appropriate algorithm or utility. However, in large enterprises, this can lead to unnaceptable performance degradation as many users simultaneously access the repository. Therefore, our Library Management algorithm is capable of supporting Automated Library Machines arranged in a variety of configurations to optimize performance. The use of ALMs also permit Automated Library Processing to occur. The Library Manager incorporates routines for properly installing any output created by an Automated Library Process into the DMS.

Finally, the Library Manager provides instant notification to the user for any service rendered. This occurs whether the task is executed in the user's environment or remotely on an Automated Library Machine. In the event a task fails to complete, error messages explain the problem. Successful operations also result in notification thus ensuring users possess situational awareness of their data at all times.

Our preferred embodiment describes a File Movement Algorithm which interfaces with other Managers in the overall Data Management System. This provides a great degree of data security while offering a plethora of automated features. The Promotion Algorithm interacts with the Authority and Lock Managers to ensure that users transfer data that they own from a private library into a public shared library. Furthermore, only authorized users may promote the data through the various library levels.

Upon initiating a promote request, the algorithm compares any recorded process results against pre-defined promotion criteria to ensure that only data which meets a quality standard may be elevated to the next level. The promotion algorithm offers a flexible means of promoting large volumes of data including features which handle heterogeneous tapes of data from different levels and versions within the same request. Interaction with the Aggregation Manager allows fast and efficient Bill of Material (BOM) promotes.

The promotion algorithm also works in conjunction with the Problem Fix and Release Manager to apply problem fix tracking, incremental change, part number and release control to any desired piece of data moving through the Data Management System. This includes interaction with the user to gather the appropriate information at promotion time as well as background checking to safeguard against data integrity violations such as a single part being associated with two different releases.

For environments such as preferred embodiment, which incorporate Automated Library Machines, our promotion algorithm permits the user to precheck a work request interactively prior to the request being sent to the ALM. This feature ensures the work request will complete successfully by running all the same checks which are normally run by the ALM prior to data movement. Since our embodiment permits the user to request a promote through multiple levels with a single invocation, this pre-qualification feature can greatly improve productivity.

In order to maximize throughput of large data volumes, our Library Management Algorithm employs Automated Library Machines to act as independent agents for the user community. These ALMs are service machines which use a virtual queue to accept work requests from users and perform Library or non-Library functions. The ALMs interface directly with the Data Control Repository through dedicated high speed ports in the Communication Manager. They can exist on clients, servers and on different computer platforms. Our preferred embodiment describes three basic configurations which permit the ALMs to perform any of the services requested by the Library Manager algorithm. The basic configuration is known as a Conventional system where a single ALM accepts all work requests and handles all services for the Library Manager, including any Automated Library Processing. The second configuration is Remote Execution Machines which is an extension of the Conventional system. Here, a single ALM receives all work requests from the user, and processes all promotion, installation, movement, and removal of data. However, additional ALMs may exist to perform Automated Library Processing. The ALMs interact with the Library Manager, Communication Manager and Promotion Algorithm to dispatch any desired library processing to a Remote Execution Machine, which executes the task and returns the results to the master ALM. The most powerful configuration is known Actor/Objects and this arrangement employs a pool of ALMs which serve as general purpose machines. They can perform any desired Library Management function, including Automated Library Processing. They can even interface with Remote Execution Machines to provide an environment with both general purpose machines and dedicated service machines. Each ALM can be programmed by the Data Manager to define the type of work requests it can process. This arrangement even includes a special Dispatcher ALM whose sole purpose is to dispatch user work requests to the next available Actor machine.

Automated Library Machines are special purpose AutoReader service machines which means they are capable of performing virtually any software task that can be invoked from a command line. These tasks can be completely independent of the Data Management System which permits an ALM to play multiple roles in a business environment. It can literally be processing a Data Management request one minute, and formatting a word processing document for printing the next minute. The underlying AutoReader mechanism incorporates features to enable automatic recovery in the event of a system crash. The Library Manager further enhances this by adding automatic retry of aborted library operations due to system problems.

File Promotion Process

The present embodiment incorporates a robust process for promoting data from a private library into a shared public library as well as moving data through a shared public library. Although it's especially suited to interact with Automated Library Machines and the other algorithms described in the other sections of the Preferred embodiment, this process does not require any of those elements to be present in the Data Management System (DMS).

In order to track data properly, our embodiment provides a conduit for data to enter, and travel through, the DMS in a safe and controlled manner. This ensures that all data is subjected to the proper checks regardless of the point of origin or final destination. The preferred embodiment depicts the overall flow of the promote, or data transfer, in FIG. 12.

Figures 12, 13:
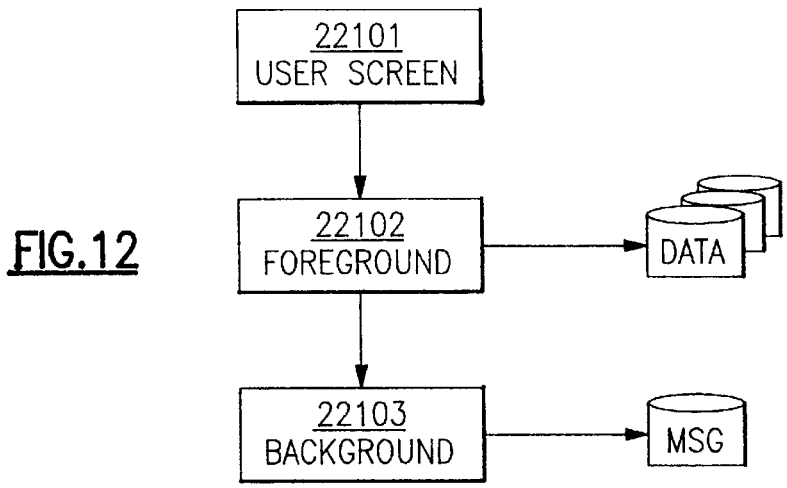
FIG. 12 illustrates the overall diagram of the Promote Process.
FIG. 13 depicts a data entry screen for initiating a Promote.

The flow begins with Step 22101 in FIG. 12 in which the user is presented with the Promotion Screen. FIG. 13 shows this screen, which permits the user to enter information about the file(s) they wish to process. Promotion can entail transferring data from the user's private library to a public library or moving data within a public library.

Turning our attention to FIG. 13 we see the promotion screen which consists of data entry fields 22201 through 22208. A single screen is used to either Put a file from a private library into the DMS or Promote a file from one level of the DMS to another. The type of action is determined by the user supplied information.

The preferred embodiment presents the user screen in a graphical environment where the user engages pull down menus, pop-up menus, drop-down lists, radio buttons, push buttons, fill-in fields, and mouse interaction. It should be noted, however, that all functions discussed further in the preferred embodiment can be implemented using simple text screens, or more advanced data entry systems such as touch screens, voice commands or 3-D graphics. The preferred embodiment depicts the method most conducive to the Motif™, Windows™, and OS/2™ application environments.

Field 22201 holds the name of the file to be promoted. If a single file is being promoted, the name is typed in directly. If the user desires a selection list, it is automatically invoked by simply leaving the field blank and completing the remainder of the form. Upon hitting Enter, a library search would be employed to obtain a selection list of files. The third method is to promote a group of files via a text-based list, edited in advance, in a prescribed format. This is covered below in the explanation of user options.

Fields 22202 and 22203 allow the user to enter the Version and Library File Type respectively. In the preferred embodiment a promotion is not permitted across versions nor can a file type change as a result of a promote.

Fields 22204 and 22205 convey the Source Library and Level information. In the case of a Put, the Source Library can be any valid private library in the DMS. The Level would default to User, but a valid entry level, name can be entered. Field 22204 can also be the name of a public library. In this case, field 22205 would contain the starting level for the Promote. Each field has a "smart" drop down menu button associated with it. The Library button next to field 22204 displays a list of all public libraries in the DMS plus all private libraries owned by the user. The button next to field 22205 displays all valid levels for the Library entered in field 22204.

Fields 22206 through 22208 are almost identical to fields 22204 thru 22205, represent the Destination information. Field 22206 is the destination library which is frequently the name of a public library. As with field 22204, the drop down menu button next to field 22206 displays all libraries in the DMS. However, our embodiment also permits a private library owned by the user to be a valid entry. In this case, fields 22207 and 22208 default to User, but can be changed to the valid level names, and none of the options at the bottom of the screen apply. The resulting operation would be a simple file copy from the source private library to the destination private library, with the file being named according to the Destination Level information.

Returning to the general case, if field 22206 contains a public library then the user would fill in the destination level in field 22207. Once filled in, field 22208 automatically takes on the same value. In the case of a simple Put, field 22207 represents the final destination and is equivalent to the Destination Entry Level in field 22208. For a Put with Promote, field 22207 represents the destination level while field 22208 denotes the doorway through which the file should enter the DMS. Finally, in the case of a Promote, field 22207 again represents the Destination Level and field 22208 is ignored.

Turning our attention to the lower portion of the screen, we see two sets of push buttons. The first set, 22209, represent user options that pertain to any type of Put or Promote. Any number of these options can be invoked and they are defined as follows:

Via List The list of files to be processed will be read from a text based file. The user is presented with a dialog box requesting the name of the file. The names of the files will be read from this list, but all other information will be taken from fields 22202 through 22210.

Foreground Checking Pre-checks the data using the same checks that will take place during the background portion of the promotion. This allows the user to test the promote and ensure everything will work before the request is submitted to the DMS.

Via Copy is normally active for most environments. It enables the DMS to use a file copy operation as the preferred method for transferring data from the source to the destination. In certain environments, this may not be possible or desirable, so deselecting this option forces the data to be "sent" from the source to the destination.

Reset Update Lock is the means by which the user informs the DMS to remove any existing Update Lock from the file(s) and leave them in an unowned state at the completion of the promote.

High Priority Tells the DMS to process this request next assuming it's the only high priority item in the queue. If there are multiple requests with this priority, they are processed in FIFO order.

Override Process Parms Allows the user to add or modify the parameter passed to an underlying library process.

The last set of buttons is set 22210 which represent options only available during a Promote. This is because these options only pertain to data already under control of a DMS. Any number of them can be selected and they are:

BOM Promote Indicates the user wants the Bill of Materials associated with the file entered in field 22201 to be promoted. If the file doesn't have a BOM associated with it, the promote will fail.

Anchor Only Indicates to the DMS to only promote the anchor file of the BOM associated with the file entered in field 22201, but leave the members at their current locations.

Retain Source is usually "off" which enables the DMS to move the file from the source location to the destination. However, in certain environments it may be desirable to leave a copy of the file at the source location after the promote is completed, so this option exists for this purpose.

Figure 14A:
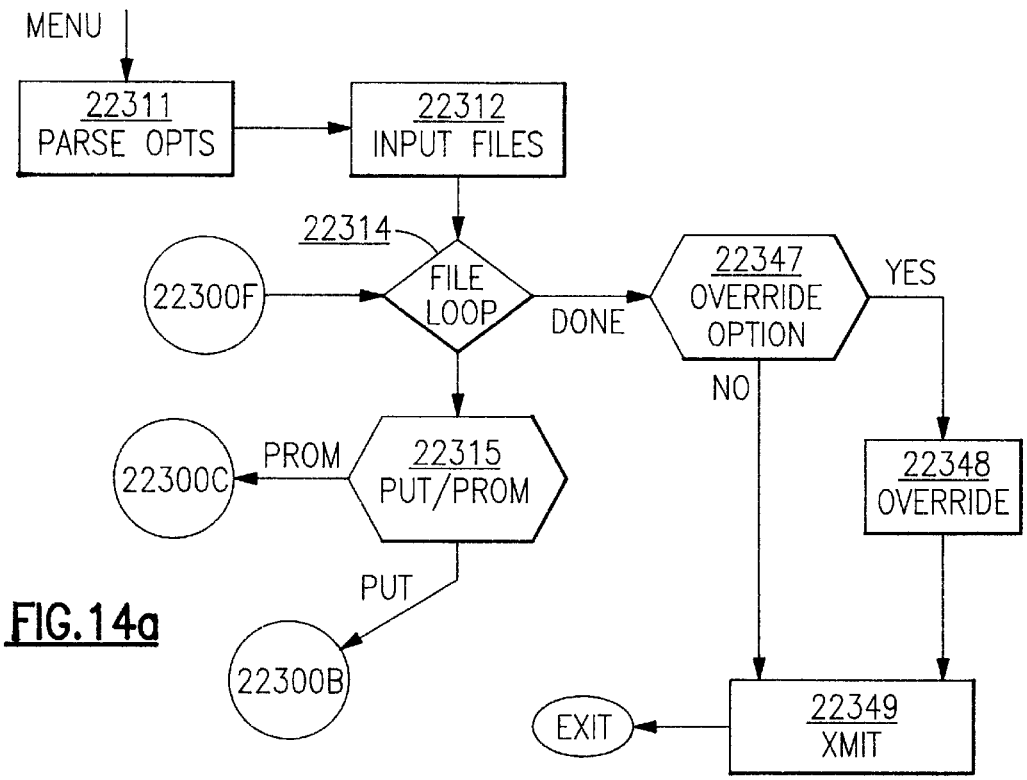
FIGS. 14a thru 14f describes the algorithm for Promote Foreground Processing.

Returning to the overall flowchart in FIG. 12, information entered in Step 22101 is now passed to Step 22102, Foreground Processing. The detailed algorithm for processing promotion requests in the foreground is described in FIGS. 14a thru 14f. It begins with Step 22311 of FIG. 14a, Parse Opts. Here all the information entered in Step 22101 is checked for validity. The following cases are examined:

If the Source and Destination Libraries are private libraries, then the Source and Destination Levels are allowed to be any combination of User and valid public levels. The user must have edit authority to the Destination private library. This results in a simple file copy with the name being adjusted according to the Destination level field.

If the Source Library is a private library and the Destination Library is public, then the following conditions must be met:
1. If the Source Level is User then the Destination Entry Level must be a valid entry point. The Destination Level must be the same or higher.
2. If the Source Level is a valid entry point, then the Destination Entry Level must be identical. The Destination Level can be the same or higher.

If the Destination and Destination Entry Levels are the same, this classifies as a simple put. If the Destination Level is higher, it's a combined Put with Promote.

If the Source Library is a valid public library, and the level is a valid level, then the Destination Library must be the same as the Source Library and the level must be higher than the Source Level. These conditions signify a Promote In this case the Destination Entry Level is ignored.

Any other combinations of those fields is considered an error condition and the promote terminates. In addition, the options are examined to set various flags which will be used to determine branching later in the algorithm.

Step 22312, Input Files follows Step 22311. Here, FIG. 13, entry field 22371, Name is examined for three possible responses. The simplest case is the name of a single file which implies only this file is to be promoted. Second, is a blank or some other keyword in which the user requests a library search of all files of the specified Library File Type starting at the specified Source Library, Level and Version. If any of these fields are invalid or missing, the user is prompted to enter the information. The standard Library Search manager is invoked to perform this task. At the completion of the search, the user is presented with a selection list of all files found. One or more files can be selected for promotion. The third possibility is that the ViaList user option in button field 22379 of FIG. 13 has been selected. This indicates that the user wants the foreground process to extract the names of the files from a text file. The user is prompted for the name of the file which lists the names of the files to process. All other information, besides the file name, is taken from the main screen.

Once the input file(s) are determined, the algorithm enters the File Loop in Step 22314. For the simple case of a single file being promoted, this loop is only exercised once. In the cases where a selection list or text file was used to provide a list of data to promote, all Steps between 22313 and 22347 are executed for each file.

Step 22315 asks the question "is this a Put or Promote?" The answer to this question determines which way the program must branch. A Put refers to data entering a public library from a private library whereas a Promote refers to data moving through a public library. Our embodiment permits a Put followed by a Promote in the same request, but for purposes of resolving Step 22315, that request is treated like a simple Put. All Promotes continue to Step 22326 in FIG. 14c while Puts branch to Step 22316, Fig Info in FIG. 14b.

Figure 14B:
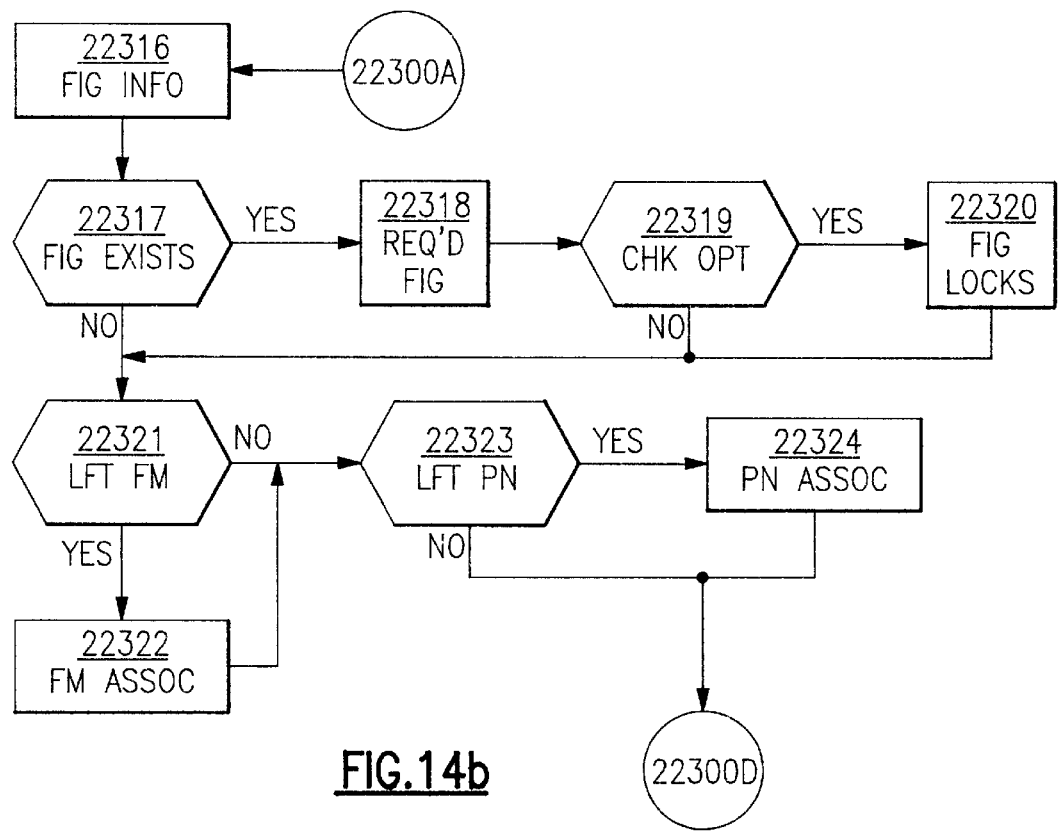

In Step 22316 of FIG. 14b, the program requests any Automatic File Group relative to the file being promoted. This information includes a flag indicating whether the candidate file is the master file of a file group, and if so, the list of Library File Types associated with that file group. By definition, all members of a file group share the same file name, library, version and level.

Step 22317 reviews the information returned in Step 22316 to see if a File Group Exists If so, the program continues with Step 22318. Otherwise, it branches to Step 22321. Steps 22318–22320 pertain to processing file groups. In Step 22318 the program checks for the existence of any Required Members of the File Group. These are denoted in the information returned in Step 22316. If a required member can't be found in the user's private library, an error message is issued and the promote is terminated. If an optional member doesn't exist, a warning is issued to the user, but the promotion continues.

Step 22319 examines the Check Option whose flag was set in Step 22311. If it's true, then the locks on the all existing subordinate files are examined, in Step 22320, Fig Locks, to ensure the user either owns the Update lock or is a surrogate for the owner. In addition, it ensures no other type of lock exists which would prevent the Put. Such an example would be an Overlay lock at the entry level. If the user is not the owner, our Lock Manager will Update Locks.

In our preferred embodiment, our embodiment maintains absolute data integrity by adhering to the following rule. The Foreground Check option, available to the user on the promotion screen in FIG. 13 only pertains to the foreground processing of the promote. It is ignored in the background, where full checking is done at all times. The option serves merely as a performance enhancement which allows the user to submit promotion requests with minimal checking. The advantage of the Check option is that an error free foreground session practically guarantees a successful promote in the background. However, depending on the environment and the implementation, the trade-off may be lengthy processing time on the client machine. For these situations, our embodiment offers the user the option of bypassing a series of foreground checks and "taking their chances" on the promote processing successfully in the background.

Steps 22321 and 22323 can be processed in either order, and they are used as decision points for Steps 22322 and 22324 respectively. In Step 22321, the program inspects the Fix Management information for the package. If the package is under Single Fix Mode or Engineering Change Mode, then the LFT FM, or Library File Type Fix Management, flag is examined for the LFT being processed. If the flag is on, Step 22322 is invoked, otherwise the program proceeds to Step 22323. In Step 22322, FM Assoc, the program attempts to associate the file being processed with a Problem Fix Number. If the package is under Single Fix Mode, the default Problem Fix Number is associated to the file. If the package is in Engineering Change Mode and the repository already has existing Fix Numbers for that file, they are presented on a user screen. This is usually done with another interrogation of the Control Repository. The user is given the choice of selecting one of the existing numbers or entering a new one. If no Fix Numbers exist, the user is prompted to enter a new one.

In Step 22323, the program checks to see if the Part Number Control Level is being crossed by comparing it to the Destination Level provided by the user in Step 22301. If the answer is "yes", then the LFT PN, or Library File Type Part Number, flag is examined for each LFT being processed. If the flag is on, Step 22324 is invoked, otherwise the program proceeds to Step 22325. In Step 22324, PN Assoc, the program attempts to associate the file being processed with a Part Number. If the repository already has an existing Part Number for that file, it is presented on a user screen. This is usually done with another interrogation of the Control Repository. The user is given the choice of selecting the existing PN or entering a new one. If no Part Number exists, the user is prompted to select a new one.

Since Steps 22321 through 22324 may be repeated for a large number of files, the Design Control System may be implemented in such a way that the DMS server returns all associated Part Number and Fix Management data for all files being processed with one large query. The client then sifts through the data to find the information necessary to interact with the user. The algorithm states the information that must be obtained from the Control Repository and the user, but permits a great deal of flexibility in the way it is acquired.

Figure 14C:
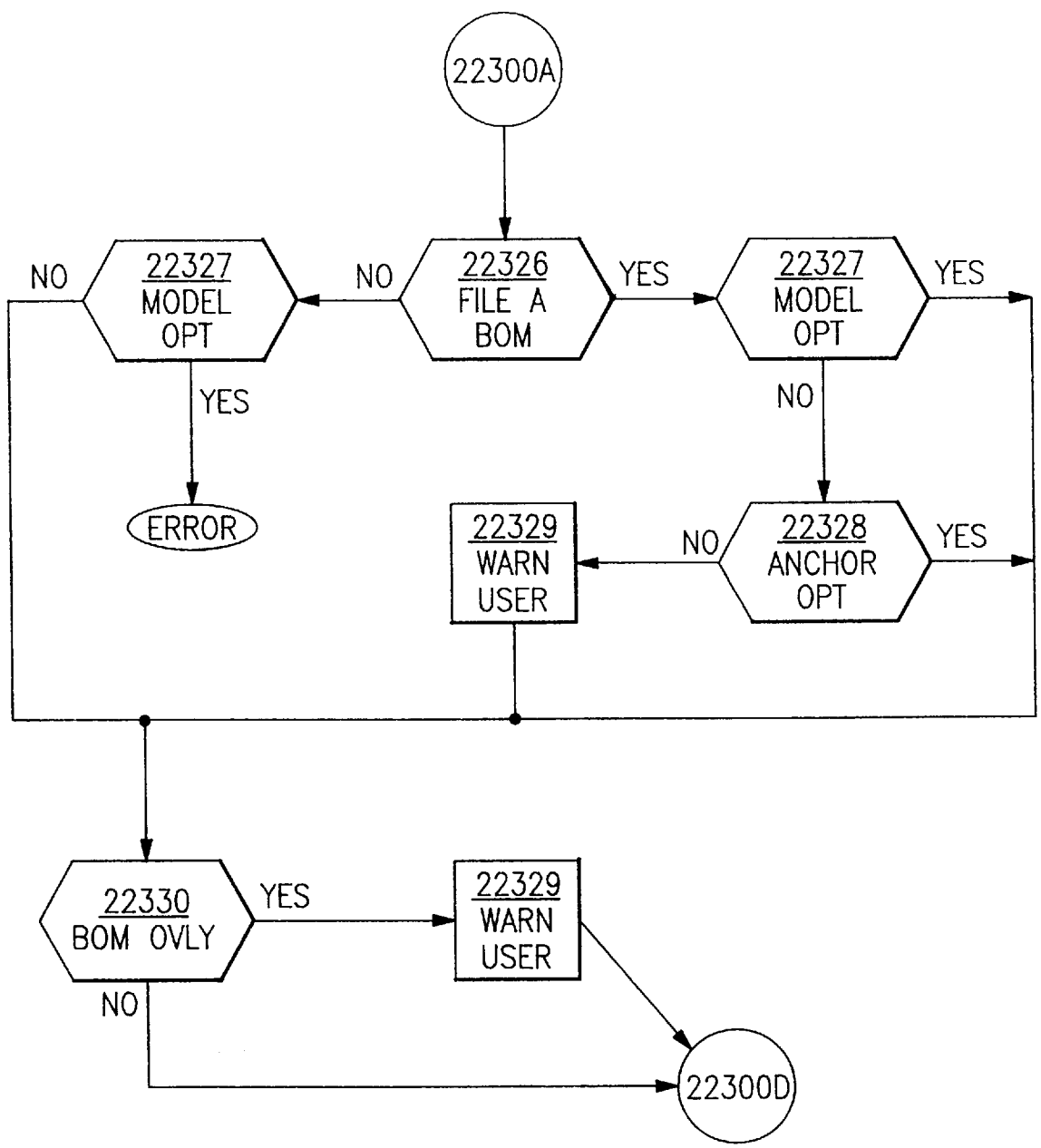
Figure 14D:
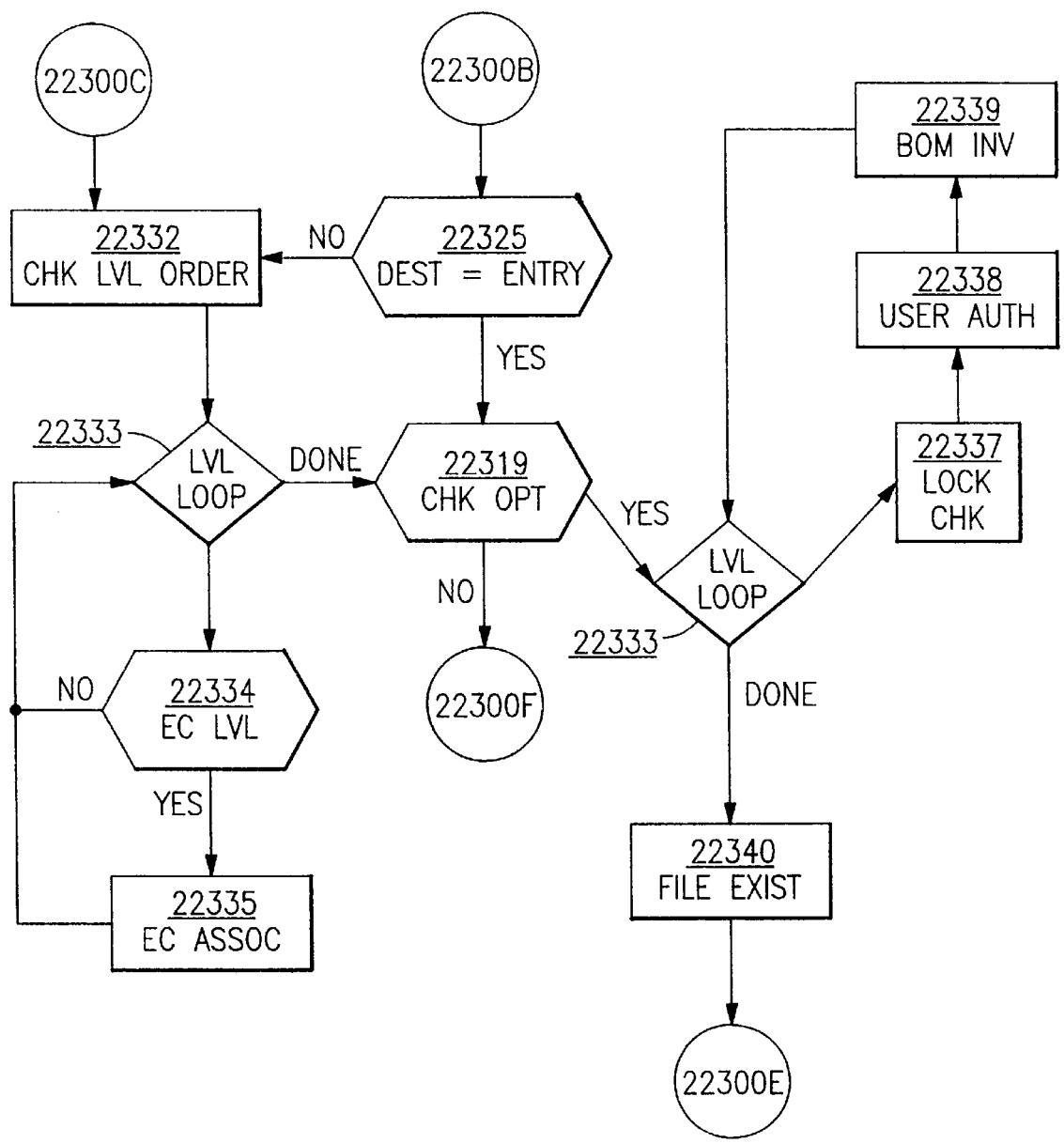

At this point the algorithm continues with Step 22325, Dest=Entry in FIG. 14d. In this step, the code determines if this is a simple Put or a Put/Promote combination by comparing the Destination Entry Level with the Destination Level. If they are the same, it's considered a simple Put. In this case the code proceeds to Step 22319. If the Target Level is higher than the Entry Level, it's considered a Put with Promote and continues to Step 22332.

Returning to the Put/Prom decision in Step 22315, if the user is requesting a promote, the code branches to Step 22326 in FIG. 14c. Here the control repository is queried to find out whether the file being promoted is the anchor file to a Bill of Materials (BOM). Regardless of the outcome, the Model Option flag in Step 22327 is examined. The answer to both questions yield four possibilities. If both answers are "yes" or both answers are "no" this is the normal case in which the algorithm proceeds to Step 22330. If the file is a BOM, but the BOM Promote Option was not specified in Step 22301, the Anchor Only Option flag in Step 22328 is examined. If this flag is on, then the user is requesting to promote only the anchor file and not the entire BOM. If the flag is off, a warning is presented to the user requesting that either the BOM Promote or Anchor Only Option must be selected. Finally, if the file is not a BOM, but the user specifies the BOM Promote Option, an error message is displayed and the program terminates.

Continuing with Step 22330, the program checks to see if a BOM exists at any of the levels being promoted through with the same name as the file. If so, a warning is issued, in Step 22329, to the user indicating a BOM will be and subsequently deleted if the promote continues. The user is given the option to continue or abort the operation. If no BOM Overlay is imminent, or the user accepts the overlay, the algorithm proceeds to Step 22332 of FIG. 14d.

In Step 22332, Chk Lvl Order, the promotion path is examined to ensure a legal path exists from the Source Level to the Destination Level. In the case of a Put, where the Destination Level is not equal to the Entry Level in Step 22325, the Entry Level is also checked to ensure it's part of the path. If not, an error is displayed and the program terminates. Step 22333 is a Level Loop which must be set up so Steps 22334 and 22335 can be performed for each level in the promotion path.

Step 22334, EC LVL, is where the program checks to see if the EC Level is being crossed during the transport. This is done by determining if the Destination Level entered in step 22301 is at or above the EC Control Level. If the test resolves to a "yes" answer, the program must perform step 22335, EC Assoc. Here it queries the Control Repository for EC information regarding any Problem Fix Numbers and Part Numbers selected or entered in steps 22322 and 22324. For any Fix Number or Part Number not associated with an EC, the program prompts the user to select an EC from a list of existing EC Numbers or choose a new one.

Upon completing the loop, the Check Option flag in Step 22319 is examined again. If this flag is off, the program proceeds to Step 22345 in FIG. 14f. Otherwise, if the user requests the option, the Level Loop in Step 22333 is again invoked. Step 22337, Lock Check is performed to ensure no locks exist against the file at any of the levels being traversed. These include Update, Move, Overlay and Processing locks. If Update locks exist, the user must either be an owner or a surrogate of the owner. In the latter case, the user is given the opportunity to reset the lock, upon which notification would be sent to the current owner.

In Step 22338, the User's Authority is checked to ensure they can promote the file to that level. Finally, in Step 22339, a complete BOM Invalidation check is performed. There are two forms of this check. In the simplest case, the file is not a BOM, so the control repository is examined to see if any other BOMs will be invalidated by the movement of this file to the Destination Level. In the more complex case, the file is a BOM. Here the same check is made as in the simple case, but additional checks must be made for every member of the BOM to determine if their movement will invalidate any other BOM. In either case, the results of the pending invalidation are displayed for the user to examine, using our Aggregate Manager for this check, as BOMs may have many members.

It should be noted that the order of Steps 22337 through 22339 is not critical and is combined into single large queries in our preferred embodiment. Files being promoted from a Private Library into a Public Library employ the QRSUPGET function, while promotions within the Public Library utilize the QRSUPCHK routine, described in FIG. 16. Upon completion of these checks for each level, the program moves on to Step 22340 to ensure the File Exists This not only means the file physically exists with the proper nomenclature in the directory corresponding to the Source Level, Package, Version and Library File Type, but this also means the control repository agrees that the file exists in that location. If for example, the user believes the file is at Level A, but the control repository is tracking it at Level B, this is a data integrity violation and the promote ceases.

Figure 14E:
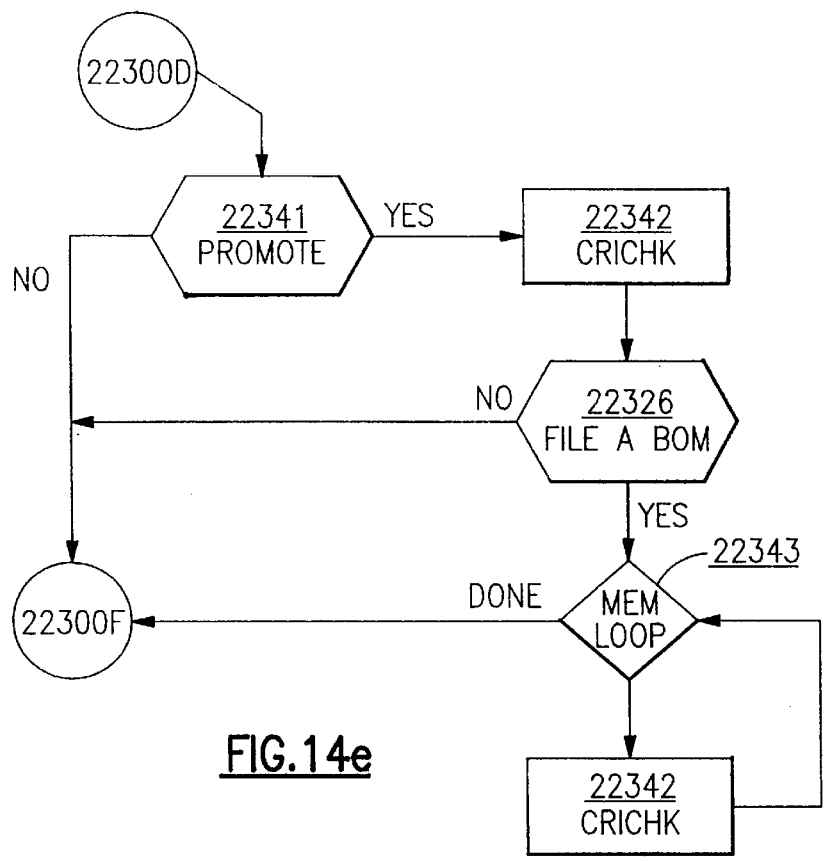
Figure 14F:
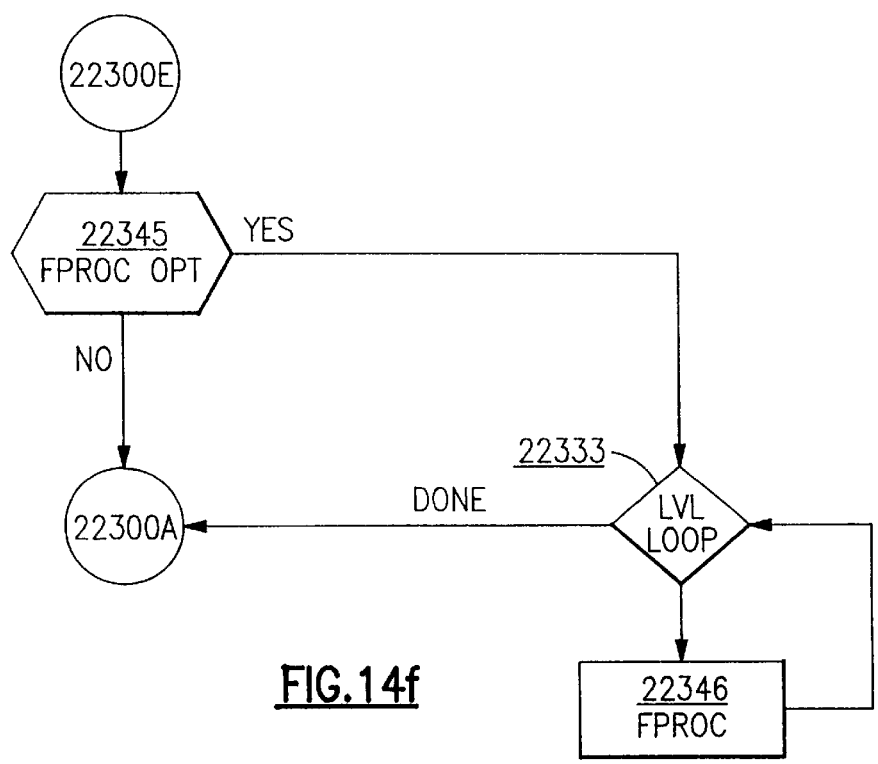

At this point, the algorithm proceeds to Step 22341 in FIG. 14e, where the question "is it a simple Promote" is asked. If so, Step 22342, Crichk is performed. For a promotion beginning at a library level (not one that is chained to a Put), the control repository is queried for any Post-Processes or DILPs defined at the Source Level. If there are any processes, then the process results for the file being promoted are examined to ensure they meet the proper promotion criteria. If any fail criteria, a warning is issued informing the user that the promotion will fail.

Next, Step 22326 is executed again to check if the file ;s a BOM. If so, a Member Loop is set up in Step 22343 where each member has their process results checked against any Post-Processes or DILPs which exist for those LFTs at the Source Level. This checking is the same as Step 22342.

If the answer to the Promote question in Step 22341 or the BOM test in Step 22326 is "no" the code proceeds to Step 22345. Likewise if the Member Loop in Step 22343 was exercised, the code proceeds upon exit to Step 22345 in FIG. 14f. In Step 22345, Fproc Option flag is examined to see if the user is bypassing Foreground Processing. If the flag is off, the code returns to the top of the File Loop in Step 22314. If the flag is on, the Level Loop in Step 22333 is initiated again. For each level that the file will pass thru, Step 22346, Fproc will be called.

In the Fproc step the code queries the control repository for all foreground processes defined for that Library File Type at that level, version and package. Each process is then executed immediately in sequence so the user can enter the appropriate responses. These foreground processes are established by the Data Manager. Upon completion of the Level Loop, the code returns to the File Loop in Step 22314 of FIG. 14*a*. Once Steps 22314 thru 22346 are executed for all files in the promote request, the algorithm proceeds to Step 22347, Override Option.

In Step 22347, the Override Option flag is examined. If it's off, the program proceeds to Step 22349. If it's on, then Step 22348, Override is executed. In this step the user is allowed to override any of the process parameters for the library processes that will be executed during the promotion. The algorithm queries the control repository for all Pre and Post-Processes defined for this Library File Type at this level, version and package. All of the process parameters are displayed on the screen, and the user can select and modify as many as desired. Once finished, the user "OK"s the modifications, and they are written into the control information which is used in the next step. The DMS will use these modified parameters to drive the library process, only if they exist. Otherwise it defaults to using those define by the Data Manager.

In step 22349, Xmit, the program gathers and transmits all of the necessary data to the Design Control System. In our preferred embodiment, the destination would be an Automated Library Machine which would access most of the information via a "copy" operation. The following types of information need to be transmitted:

The type of request: Put, Promote, or Mixed

The list of files being promoted. The following information must exist for each file in the list:
  The Filename
  The Library File Type
  The Package
  The Version
  The Source Level, Entry level, Destination Level
  Fix Numbers (if any)
  Part Numbers (if any)
  EC number (if any)

Any user selected options that pertain to the background operation.

The user's electronic id or e-mail address.

Information gathered during any foreground processing that occurred.

Information relating to any process parameters altered during the Override operation.

In addition, for Put operations the files themselves must be transferred from the user's private library. This includes all existing members of Automatic File Groups. Our preferred embodiment performs this by either having the Automated Library Machine copy the files or by sending them. The determination is made based on a user option called Via Copy which exists on the main input menu in FIG. 13. One other option on the main menu is the Emergency option which informs the DMS to treat this as the highest priority in the processing queue. This feature enables critical work to be processed ahead of older jobs.

Figure 15A:
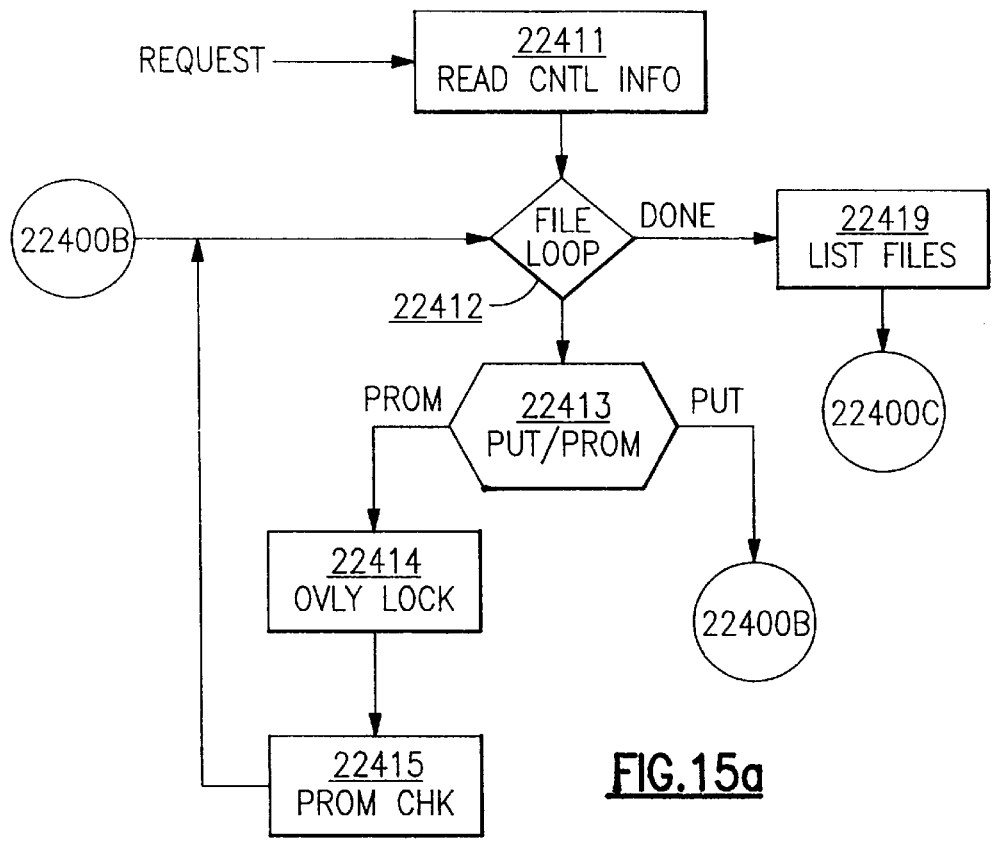
FIG. 15a thru 15e describes the algorithm for Promote Background Processing.
Figure 15B:
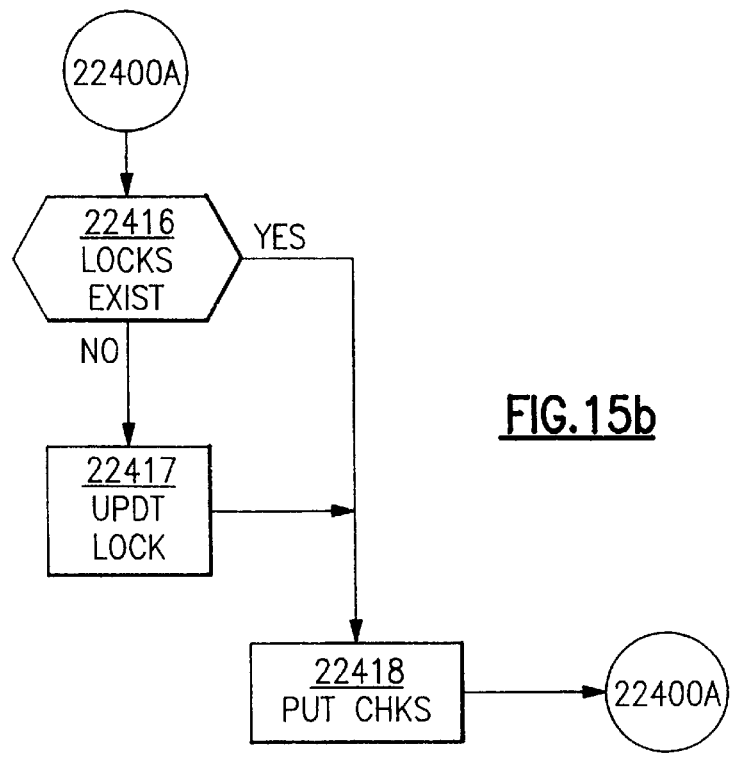

Returning to FIG. 12, the algorithm proceeds with the Background processing in Step 22103. In our preferred embodiment, the promote request from Step 22102, Foreground is transmitted to an Automated Library Machine (ALM) for processing. The first step is for the ALM to Read Control Information which is done in Step 22411 of FIG. 15*a*. Here, the names of files in the promote request are stored into a data structure along with all pertinent control information like Problem Fix numbers, Part Numbers, EC Numbers, Entry Level & Destination Level for each file, and the user options. The options are further parsed to set flags. In our preferred embodiment, these requests are homogenous which means all files in the request move from the same source to the same destination. Since the Foreground step determined the type of request, it's contained in the control information and used to set the flag which is examined in Step 22413.

However, our embodiment also supports heterogeneous file movement. An example of this is two files where one moves from level A to B while the other moves from level C to D. Although this request can't be generated by the Foreground process in Step 22102, it can be created by 3rd party tools interfacing with the DMS. To accommodate this, the control file indicates the type of request as Mixed In this case, Step 22413 must employ the same algorithm used in the Input Files step of FIG. 14*a* to determine if the request is a Put or Promote on a file-by-file basis. Since the control information contains the Source, Destination and Entry Level for each file, this is quite easily done. At this point, the File Loop in Step 22412 is entered in order to execute Steps 22414 thru 22418 on each file in the request. Step 22413 checks to see whether the request is a Put, Promote, or Mixed where:

Put means all files in the request are being promoted from a private library into the same level of a shared public library. The files may have to be promoted one or more times to reach the destination, but all files will travel the same path.

Promote means all files in the request are being promoted from one level of a shared public library to another. The files may have to be promoted one or more times to reach the destination, but all files will travel the same path.

Mixed means the request contains a mixture of files where 2 or more files may travel different paths. In this case the background algorithm must determine the promotion path for each individual file.
  Note: Our preferred embodiment does not allow this type of request to be generated from the Foreground user interface, but 3rd party tools may create one.

In the case of a Promote (ie. the file is being moved from one level of the DMS to a higher level), Step 22414 is employed to set an Overlay Lock on the file. The DMS uses this Overlay Lock to prevent a different ALM from moving the same file while this request is in progress. Next, Step 22415, Promote Check is called upon to do the following checks:

Ensure that the Source Level is valid and not a frozen Release Level.

Ensure that a valid path exists from Source Level to the Destination Level.

Determine the next higher level above the Source Level. (This may not be the Destination Level if this is a multi-level promote).

Obtain the physical location of the Source and Destination Levels.

Ensure the user is authorized to do this promote. For regular promotes, the user must have normal promote authority whereas for BOM promotes, Model Promote authority is required.

Ensure the file really exists in the DMS at the expected Source Level.

Check for any Processing or Move locks. Also look for any Overlay Locks at the next level.

Check all Post-Process and DILP criteria at the Source Level to ensure the file meets all of the criteria. In the case of a Bill of Materials (BOM) promote, each member of the BOM is also checked to ensure all criteria is met.

If the file is crossing the EC Control Level, and the file is under Problem Fix Management, check to ensure a proper EC number is provided.

If a BOM Promote is requested, a check is made to ensure a BOM is associated with the file being processed.

If a processing lock is detected, the promote request is recycled back into the DMS queue to await completion of the library process.

Note: If a processing lock exists, special hang detect code is used to determine if the file has been locked for an unusually long period of time. If so, the user is notified and advised to check on the process job.

Returning to Step 22413, if the request is a Put, then Step 22416 in FIG. 15 is employed to see if Update Locks Exist in the user's name, at the Destination Entry Level, for the file being processed. If not, one is acquired in Step 22417, Updt Lock. This lock may be permanent or temporary depending on the setting of a user controlled option which is discussed later. The reason for setting it at this time is to prevent someone from taking ownership of the file while the Put is in progress.

In Step 22418, Put Checks, a series of checks are performed against the file. Many of these are duplicates of those run in the Foreground in Step 22102, if the user specified the Check option during Step 22101. In our preferred embodiment, these checks are all done with a single query to the Control Repository. The following are performed:

A check is made to ensure no Processing, Move or Overlay locks exist on the file.

Ensures the user is authorized to Put this file to the Entry Level.

The physical location of the Entry Level and Source Level are acquired.

The File Reference number is generated.

The Lock Reference number is acquired.

The Entry Level is checked to ensure it's a valid entry point into the DMS. It may be a Sideways Release Level, but not a regular Release Level.

If any of the checks fail, the promotion terminates with an appropriate error message.

At this point the File Loop in Step 22412 is repeated until all files are exhausted. Upon exit from the loop, control proceeds to Step 22419, List Files. Here, the file information is re-written with the source and destination physical locations in preparation for the upcoming file transfer. The file name of this control file indicates whether the file transfer pertains to a Put or Promote.

Figure 15C:
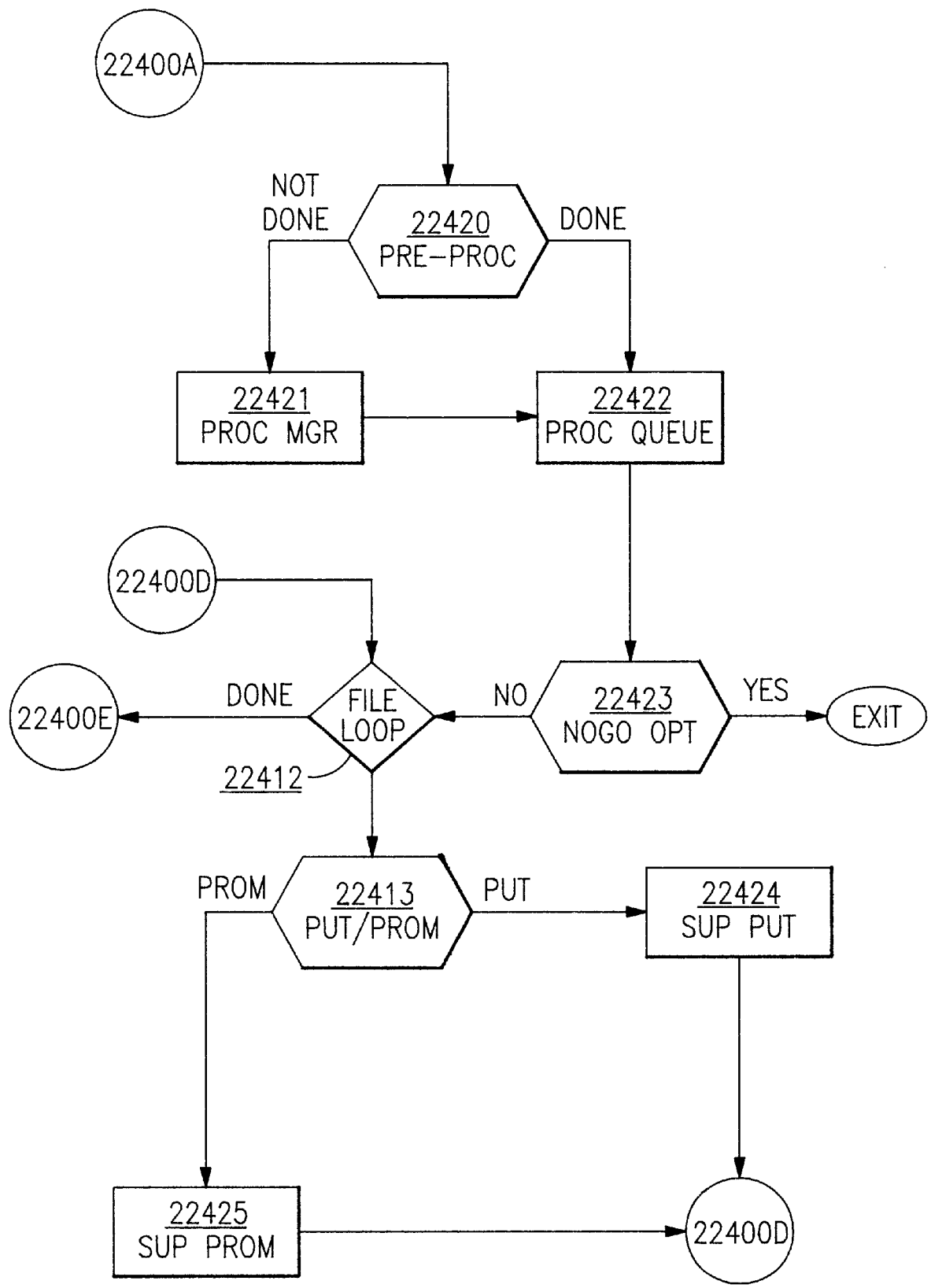

Upon completion of List Files, the Pre-Processing Done flag is examined in Step 22420 of FIG. 15c. The flag is set to "Done" if no Pre-Processing is required, or whenever the Process Manager completes all required PreProcesses. If the answer is "no", then the Process Manager, in Step 22421, is employed to run any pre-processes that exist. The Process Manager processes all files in the list with a single invocation using the control file generated in Step 22419. If any of the pre-processing fails, the promotion with an appropriate error message. At the completion of the Pre-Processing, the PreProcessing flag is set, and the Process Queue in Step 22422 is interrogated. Although the processing completed in Step 22421, it may have required work to be dispatched to other ALMs. In this situation, the DMS maintains data integrity by setting a Processing lock in the Process Queue. If the current ALM detects an outstanding lock in Step 22422, on the file being processed, it will recycle the promote request until the lock is cleared. This ensures that the order of execution for library processes is always maintained regardless of the distribution of workload.

Continuing with Step 22423, a special option flag denoted Nogo is checked. If it's set, the promotion terminates successfully even though no files were actually transferred. This is a mechanism the DMS uses to initiate library processing against a transient file which doesn't need to be permanently retained. For example, a transaction file may be promoted into the DMS for the sole purpose of initiating a library process to update a master file residing in the library. Once the master file is updated, the transaction file is no longer necessary so it can be discarded. In this case, the Nogo option terminates the Put without wasting time transferring and deleting the file. If the Nogo option doesn't exist, control proceeds with another File Loop.

Once again, Step 22412 is invoked to loop through all files in the request In addition, Step 22413 is used to determine if this is a Put or Promote. In the case of a Put, Step 22424, Sup Put is exercised. In our preferred embodiment, this is performed via the QRSUPPUT routine, which is responsible for updating all the necessary tables to indicate that the file now resides in the new Entry Level location. In addition, the Control Repository examines the Fix Management and Part Number flags for the current Package, File Type, Version, and Level (PFVL). It also checks to see if the EC or Part Number Control Levels are being crossed. Depending on the results of these flags and levels, it expects the corresponding Problem Fix numbers, Part Number and/or EC Number to be available. This information was gathered during Step 22102, Foreground Process The DMS updates all tables associated with Problem Fix Management and Part Number control at this time. If the file is overlaying an older version of the same file, the Problem Fix numbers from the old file are appended to those of the new file. Any previous iteration of the file, at a higher level, with the same Problem Fix Numbers as the file being promoted will result in the higher level Problem Fix Numbers being Superseded Also, the locations of the File Group subordinate files are updated. If this query completes successfully, the file is officially promoted into the DMS, even though the file hasn't physically been transferred yet. In order to maintain absolute data integrity, the DMS always has the correct information. If a file physically resides in a state other than that reported by the DMS using a query, the file is in error and needs to be rectified.

If Step 22413 determines the request is a Promote, Step 22425, Sup Prom is invoked. In our preferred embodiment, this is a accomplished by the QRSUPPRM routine, which is responsible for updating all the necessary tables to indicate that the file and all File Group subordinate files now reside at the level above the Source Level. For BOM promotes, the tables for all member files previously at the Source Level are updated as well. Members currently at the Destination Level or higher, or members in other libraries, will not be affected. In addition, the Control Repository examines the Part Number flag for the current Package, Version, Level and LFT. If it exists, and the Part Number Control Level is being crossed, it expects the corresponding Part Number to be available. Likewise, the DMS checks to see if the EC Level is being crossed, and if so, the appropriate EC Number must be present. This information was gathered during Step

22102, Foreground Process The DMS updates all tables associated with Problem Fix Management by appending any new Problem Fix Numbers to any existing numbers pertaining to the previous iteration of the file. Any previous iteration at a higher level with the same Problem Fix Numbers as the file being promoted, will result in the higher level Problem Fix Numbers being Superseded Subsequently, the DMS attaches all Problem Fix Numbers for this file to the EC Number. Also, the Part Number tables are updated, as necessary.

Figure 15D:
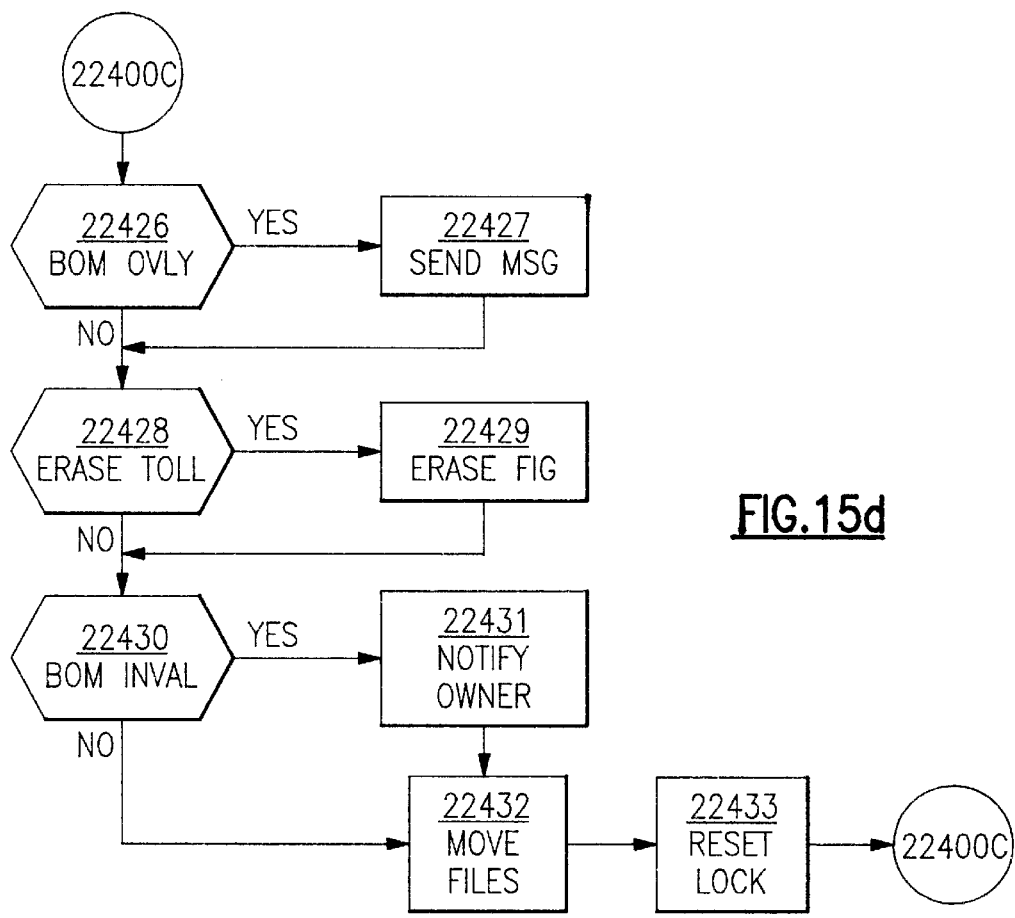

At this point control proceeds to FIG. 15d where various flags must be checked, and possible additional actions taken. In Step 22426, BOM Ovly, the Sup Put or Sup Prom return code is checked for an indicator that an existing BOM was overlaid by this promotion. If so, then Step 22427, Send Msg is invoked to send a message to the owner of the BOM informing them of the BOM eradication. Next, Step 22428, Erase Toll Fig is invoked to check if a file group exists for the file being promoted. If so, and the Erase-To-Level flag is set, then Step 22429, Erase Fig is invoked. Here, the program determines whether the subordinate file will be replaced by an incoming file. If not, the existing subordinate file is erased and a message is sent to the owner informing them of the file removal.

In Step 22430, the BOM Invalidate flag is checked. This indicates that the promotion of this file caused one or more BOMs somewhere in the DMS to be invalidated. This would happen if this file is a member of some other BOM. A sophisticated algorithm exists in the DMS to quickly check all BOMs in the system for the presence of this file. If an invalidation occurs, Step 22431 is invoked to Notify BOM Owners exactly which BOM was invalidated and which file caused the invalidation. It should be noted that Steps 22426 and 22428 and 22430 can be checked in any order.

The algorithm continues with Step 22432, Move Files. The method for moving data is very dependent upon several factors. These include the system environment, the existence and/or arrangement of Automated Library Machines, and the user options selected during initiation of the Put or Promote. If no ALMs exist in the DMS, it's assumed that the user's client environment has the proper read and write access to the data repositories. The code uses the appropriate combination of copy, delete and/or rename commands to accomplish the desired Move operation. However, if ALMs are employed, a Move algorithm is used to determine how this step is implemented. This algorithm is discussed in more detail below. For the moment it's assumed that a method is in place to copy, delete, and/or rename files throughout the entire DMS.

In our preferred embodiment Step 22432 is usually done with a file copy for a Put operation, but the system does support an environment where files can be sent, or otherwise transmitted. To accommodate this, a special option called "ViaCopy" exists on the main promotion menu. It defaults to an "on" position, but can be turned off to signify that the data files are being sent to the ALM's reader along with the control information. If the files are sent, they must be "read" into a temporary holding area while the promotion process takes place. Otherwise, they can reside in the user's private space until the actual transfer takes place. At this point the file is physically copied from the source location to the Entry Level. In addition, any subordinate files that belong to this file's Automatic File Group are also transferred to their destination.

For a promote, the preferred method is to move the file(s) from the source location to the destination location. This may result in a simple rename of the file(s) if both physical locations are identical, or it could result in the file(s) being physically moved from one server to another. The exception to this is if the Retain Source option is specified on the promotion screen in Step 22101. This would result in copying the file(s) from the source to the destination.

For a BOM Promote, a list of all BOM members is returned by the Control Repository in Step 22425. All members on this list are moved in the same manner as the Anchor file indicated in the main File List.

Similarly, if the current file is the Master of a File Group, a list of all subordinates are returned from the Control Repository during Step 22425. This list is used to move all the subordinates to their target destination.

For environments incorporating Automated Library Machines, the ALM must have a means to access and update any data within its own library. Whenever possible, all ALMs in a given library are provided with read and write authority to all physical data repositories. For example, in a simple DMS all data within a library would reside in a single directory, and the ALM would have read and write authority to that directory. However, since our embodiment permits different PFVLs to reside in separate repositories, this can't always be achieved. For instance, one PFVL may reside in a Unix or AIX directory, while another PFVL resides on a VM Minidisk. An ALM running in the Unix/AIX environment may not have direct write access to the VM Minidisk. The following algorithm is used to handle all types of file movements in the DMS, depending on the ALM configuration and platform environment.

In order to maximize efficiency, the ALM will always try to rename or move a file if the environment supports such an operation and the source and target PFVL reside in an amenable environment such as two Unix/AIX directories (same or different) or the same VM Minidisk. In this case, the ALM attaches to the target repository in a writable manner, and performs the move operation. Otherwise, the operation is performed by a combination of file copy followed by file deletion. In this case, the algorithm first determines if both the source and target repositories are writable by the ALM. Such is the case for a Conventional ALM system or an Actor/Object system running in a Unix/AIX environment. Here, the ALM directly performs the copy from the source to the target PFVL. Once the file is safely copied, the ALM deletes the source file. In an Actor/Object configuration in a VM environment, the Actor must send a message to the Object and pass a list of files to be copied and deleted. The Object runs a continuous message handler which allows multiple Actors to interrupt and initiate the copy and deletes. For situations such as a Conventional ALM arrangement running on a VM system, where the source and target PFVLs are on different account Minidisks, the ALM handling the promotion always has write access to the target PFVL. Therefore, it can directly perform the copy operation. The delete is handled by generating a file deletion request similar to that generated by the. File Deletion routine. This job request is transmitted to the ALM with write authority for the source repository.

Figure 15E:
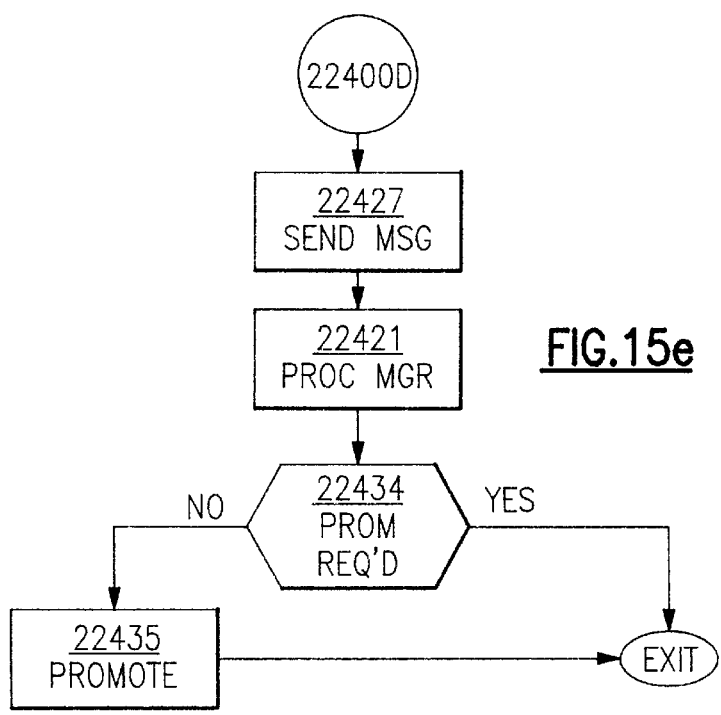

For promotions involving the movement of data across different platforms, our embodiment incorporates the concept of a Cross-Platform Transfer. The method differs depending on the source and target platforms. Our embodiment will always try to use the ALM currently executing the Promotion algorithm to link to the target platform directly. In these cases, the underlying Actor/Object code sets up the appropriate file transfer protocol and copies the file from the source to the destination. It then deletes the file from the source repository. The most complex case is when the target environment can't be linked directly by the ALM. Such is the case when the ALM is running in a Unix/AIX environment, but the target PFVL is on a VM Minidisk. Achieving this file transfer involves using dedicated ALMs running on the source and target platform, which serve as agents to forward the work requests. The following steps are performed:

1. The ALM prepares a special Cross-Platform Transfer request file which contains the source and target level, the userid of the requester, the type of promote, and a list of all files that need to move. This request file and the original promote request are copied into a special punch directory whose name is also contained in the request file.
2. The ALM currently processing the promote, establishes a socket connection with the VM agent to request a file transfer to VM.
3. The VM agent copies all the data from the punch directory, and the Cross-Platform Transfer request file to its working space.
4. The request is sent to the appropriate VM Actor, where it's handled by Steps 29162 and 29163 of the ALM algorithm. This algorithm is described in detail in FIG. 55c. Step 29163 takes care of transferring all the data as well as deleting the copies from the source repository.
5. At this point, the code exits the Promotion algorithm, and the remaining steps in FIG. 15d and 15e are performed by the code executed in Step 29163 of the ALM algorithm.

Note: Our embodiment only supports Cross Platform promotions using Actor/Object arrangements.

An alternate embodiment permits all the files in the DMS to reside in the same physical location. Symbolic links would serve as place holders and reside in the locations defined by the Data Manager for each PFVL. During a Put, the link would be created while the file is being copied to the master location. During a Promote, the file would be renamed and the corresponding link would be updated. Depending on the environment, this may provide performance or data maintenance advantages over the preferred embodiment.

The last step within the File Loop pertains to the Update and Overlay Locks established in Steps 22414 and 22417. In Step 22433, Rst Lock, the Reset Lock Option is examined. If it's on, this signifies the user's desire to leave the file in an "unowned" state at the completion of the Put or Promote, and the program resets any Update Lock that exists for this file at the new level. For promotes, an additional step is taken to reset the temporary Overlay Lock set in Step 22414 regardless of the Reset Lock Option.

Control is returned to Step 22412 in FIG. 15c until all files in the request are exhausted. Upon exit from the loop, control is passed to FIG. 15e. Here Step 22427 is again invoked to send a message to the user indicating a successful Put or Promote. The message includes the names of all files processed including Automated File Groups and members of a BOM.

Next, the DMS again invokes Step 22421, Process Manager to run any Post-Processes that exist for any of the files. Just like with Pre-Processes, the Process Manager handles the entire list of files with a single invocation.

That last steps in the operation attempt to determine whether additional promote requests are necessary. In Step 22434, Prom Req'd, the Destination Level is compared against the current level for each file in the list. For Puts, the current level is the Entry Level. For promotes, it's the Source Level. If any files are found with a Destination Level higher than the current level, this indicates that further promotion is necessary, and Step 22435, Promote, is invoked to handle this. In this step, a promote request is actually created listing all files which require further movement. The control file also lists their newly acquired level as their source level and lists their Destination Level as the target level. The entire background algorithm is repeated with Step 22411, but using the newly created promotion request as the main input control file. Once the current level and Destination Level are the same, the promotion is complete.

Methods of Storing, Retrieving, and Managing Data in a Shared Library System

The present embodiment incorporates various algorithms and processes to permit data to be stored into, deleted, and retrieved from the Data Management System while maintaining absolute data integrity. The Data Management System (DMS) is comprised of one or more shared public libraries servicing one or more users in a client server environment. The users may also have private libraries where work is performed until such time that it is ready to be deposited into a public library for shared access. Our embodiment has the capability to provide continuous access of the shared libraries to large numbers of users.

These algorithms and processes are especially suited to interacting with the File Promotion Process and Automated Library Machines (described in the other sections of the Preferred Embodiment), although they will work without Automated Library Machines and with other File Promotion Algorithms.

In order to safely deposit data into the Data Management System, our preferred embodiment uses an Installation Algorithm described herein. The algorithm is depicted in a library environment using Automated Library Machines configured in any arrangement, although one skilled in the art would appreciate that the algorithm can function in the absence of ALMs simply by executing in the client's foreground environment.

The most frequent initiator of install requests is the Process Manager. The Process Manager executes Automated Library Processes which create output data that must be deposited into the DMS. Our embodiment maintains close ties between the output data and the source data used to create it. If this output data can't be successfully installed into the DMS, the source data may be prevented from moving through the DMS or undergoing further processing until the problem is corrected. Because of the multitude of different types of Automated Library Processing, our preferred embodiment contemplates several types of install requests combined with a plurality of user options.

The following types of installs are supported:

Regular Install Deposits the output into the DMS under full data control. The output file may or may not be assigned a File Reference number and completely tracked by the Control Repository. Once installed, the file can be processed like any other file in the DMS. The install can be immediate, whereby the install is initiated and further processing suspends until it completes, or the install can be delayed which means further processing may continue while the Library Manager processes the install request.

High Performance (HP) Install Similar to a Regular Install, except it deals with groups of component files. This occurs during an Aggregate Install which always begins with an Anchor file undergoing a Regular Install, followed by all the related components undergoing a High Performance Install. The information necessary to install the group of files is conveyed through a special file transmitted with the Install Request.

Create DILP Install Used only on the output file of a Create DILP. This install is identical to a Regular Install with some additional steps that assign the process result to the output file once it's safely in the DMS. The necessary information is passed to the Install algorithm through a special file transmitted with the Install Request.

Regular Store Deposits the output into the Data Repository, but the file is not tracked by the Control Repository. These files exist for some other reason than data management, and don't require any DMS operations (promote, library processing, problem tracking, etc.). This type of disposition can be immediate or delayed.

The following options are supported for the above types of installs:

Result: Allows Pseudo Process Results to be set against files being installed.
  Note: All information is exchanged via a Results File
Part Number: Allows Part Numbers to be assigned to files being installed.
  Note: All information is exchanged via a Part Number File
Resolve: Allows Library Process Results to be primed for files being installed as long as the process structure for the installed files is identical to that of the source files. For example, if a file is copied from a source PFVL to a target PFVL, since the installed file is identical to the source file, any Library Process results for the source file can be automatically propagated to the target file.
  Note: All information is exchanged via a Resolve File Now, the program begins by receiving an Install Request The Install Request contains the target Version and Level, the e-mail address of the user initiating the request, the File Name, Type and Package of the subject of the install, the Level Reference Number, one or more File Reference Numbers representing the data which was used to create the subject data, a multiplicity of user options, and a flag indicating whether a new File Reference number should be acquired for the subject data or whether an existing reference number should be retained. This information is generated by the algorithm responsible for creating new data which needs to be installed in the DMS. A typical example would be our Background Automated Library Processing.

In a Conventional System, this request may be transmitted from a Remote Execution Machine to a Primary ALM whose responsible for installing the data. In this case, the Install Request contains additional information regarding the Process Manager's Process Queue. This includes the Library Processing Phase (Pre, Post or DILP), the File Reference of the file used to set the Processing Lock and the Process Queue Reference Number. A Checksum or Cyclic Redundancy Code is also included to help detect transmission errors in the data. In an Actor/Object arrangement, the Actor can execute this algorithm directly, so there's no need to transmit the request. In this situation, no Process Queue entry is required and no CRC code is needed. However, the Install Request file is still created.

The algorithm begins with Step 24910, which Reads the Request File into a data structure. In addition any user options are examined and for those requiring separate support files, the file names are assembled. The program also determines whether the ALM currently executing the algorithm is an Actor, and if it's not an Actor it checks to see if the request was sent from a different ALM. If so, the information in the Install Request is written into an Install Recovery file which is used by the ALM Algorithm to recover the install in the event of a system crash. Also, in a the case where the Install Request is transmitted, the subject data is also transmitted, so it is transferred into the ALM's working space.

Next, Step 24911 is invoked to perform a Data Access of the physical repository where the subject data will be deposited. This may be as simple as ensuring the ALM has the proper write authority (such as a Unix/AIX environment) or it may require linking media such as DASD in a VM environment.

Step 24912 tests for Return Code=0 from the previous step. A non-zero return code indicates that one or more physical repositories could not be located or accessed in the proper manner. This results in Step 24913 being called to possibly clear the Process Queue. Step 24913 tests to see if the Install Request was transmitted by a Remote Execution Machine. If so, the Process Queue Reference Number is used to delete that entry from the queue. Furthermore, if an entry exists and the Process Phase is a Pre-Process, then a special entry is added to the Process Queue in order to prevent any subsequent Library Processes or movements occurring against the source file used to generate the subject file being installed. This maintains data integrity in the DMS by ensuring that output data always matches input data, and input data may not be elevated to the next level unless all required Library Processes run successfully and the output is successfully deposited into the repository. Upon completion of Step 24913, the requestor is notified of the failed installation attempt and the program exits.

Returning to Step 24912, if the Return Code equals zero, then the physical repositories are ready to accept the data and control proceeds to Step 24914. In Step 24914, the Actor flag, set in Step 24910 is examined. If the flag indicates that the current ALM is not an Actor, then the Install Request was transmitted with a Cyclic Redundancy code which pertains to the data being installed. The program generates a new CRC Code using the subject data in the working area and compares this with the code embedded in the request file. If they don't match, a transmission error occurred which is a data integrity violation. This results in a message being returned to the requestor, and the program aborting.

Assuming the transmission occurred successfully in a Conventional System, or if the current ALM is an Actor, then control continues with Step 24916 which sets the Fix Management Flag This flag is passed to the underlying QRSUPGEN routine to tell it whether to propagate the Problem Fix Management data from the source files to the subject file. This flag is set to "true" if the Package is in Single Fix Tracking or Engineering Change Mode and the Library File Type has its Fix Management flag active.

At this point, control is passed to Step 24918. In the preferred embodiment, Step 24918 is exercised before Step 24922, but these are independent tests which can be performed in either order. In Step 24918, the Create DILP option is examined. If the current request is for output generated by a Create DILP, then Step 24919 is executed to Read the Create DILP Info. This information is stored in a separate file which accompanies the Install Request and the subject data. The file contains the true name of the output file, which may differ from the name contained in the Install Request. Create DILPs are part of our library process. This file also contains the Log and Process Reference Numbers of the Library Process which created the file, and the Library Process Return Code. Step 24920 is then invoked to Create Recovery Information. This consists of generating a Create DILP Recovery File which includes all the information in the Create DILP file along with the corresponding Control Repository command required to store the information in the DMS. In the event of a system crash, the ALM Algorithm will use this file to exercise all the steps necessary to recover and complete the installation.

Finally, Step 24921 performs a File Copy into the repository. The file is copied here temporarily so it's sure to exist in the event of a crash. However, if the subject file is overlaying an existing file, the existing file is backed up first. This enables the ALM Algorithm to completely and accurately reproduce the state of the DMS if the subject file is unable to be properly installed. A flag is written into the recovery file indicating whether an overlaid file has been backed up.

If the current request is not for a Create DILP, then Step 24922 is employed to test for a High Performance install. This option can be requested to install a group of files. Our embodiment requires that at least one member of the group to act as an Anchor file. This means it must endure all the normal checking of a regular install. The remaining files benefit from the High Performance install which eliminates certain checks that are redundant to those done on the Anchor file. The list of files to be installed is maintained in a separate file transmitted with the Install Request. Step 24923 Reads the File List into a data structure that will eventually be passed to the Control Repository.

Step 24924 is then invoked to Access All the Repositories necessary to accommodate the entire list of files. Since our embodiment permits the list to include files of differing PFVLs, and files may be physically segregated down to the PFVL granularity, a plurality of repositories may have to be acquired. The method of access is identical to that performed for the subject file in Step 24911.

Whether the tests performed in Steps 24918 and 24922 are true or not, control eventually reaches Step 24928 which Updates the Control Repository. This step consists of updating all the necessary tables with the information required to track the subject file(s). In the case of a Create DILP or regular install, the QRSUPGEN routine, is called. In addition to the File Name and PFVL information, the algorithm also passes the New File Reference flag, the Problem Fix Management flag, and any of the Source File Reference numbers pertaining to the source data used to create this data. In the case of a High Performance install, the same information is passed with the exception of the Problem Fix Management flag. Instead a list of the entire file group is passed. If an error occurs, such as the existence of a lock which prevents the install, and this is a Create DILP which necessitated the back up of an old subject file in Step 24921, then the backed up file is restored. All severe errors during this step result in a message being sent to the user, followed by the immediate termination of the installation.

If no severe errors occurred during Step 24928, then control proceeds to Step 24930 in FIG. 33c. Here the return code of QRSUPGEN is examined for a Bill of Materials (BOM) Invalidation Message. Two types of warnings exist. One case is when the subject file overlays an existing file which happens to be the Anchor of a BOM. In this case, the BOM is deleted and the owner of the BOM is notified. The other case is when the subject file overlays a file which is the member of a BOM. In this case, the BOM becomes invalid and the owner of the BOM is again notified.

Next the program again invokes Step 24918 to test the Create DILP option. If this is a Create DILP install, then Step 24932 is employed to store the Process Result into the Control Repository. This result, along with the Process and Log Reference Numbers are contained in the Create DILP file. Since a Create DILP requires the Library Process result to be recorded against a file that doesn't exist when the process completes, the Process Manager must forfeit the setting of the LP result to the Install algorithm. Once the result is set in the Control Repository, Step 24933 checks to see if an overlaid backup file exists from Step 24921, and if so, it Erases the Backup file. It also erases the Create DILP recovery file, since all the steps that can be recovered have succeeded.

Control eventually reaches Step 24934 which Deposits the File into the data repository. The program checks to see whether the cut-rent ALM is an Actor. If so, and the environment allows the Actor to have direct write authority to the repository (such as Unix/AIX), the ALM copies the subject file from the Actor's working space to the target repository. If it's an environment such as VM, then the Actor establishes a communication link with the corresponding Object ALM, and requests the file copy. If the current ALM is not an Actor, then it must have write authority to the repository, so it simply copies the file from the working space to the physical location. If the current install request is for a High Performance install, the same steps are run against each file in the file list except for the Anchor. The Anchor is bypassed since the definition of a High Performance install requires the Anchor to be installed separately using a regular install request.

Next, Step 24935 is performed to test for the Result Option. If this option is passed, then there are Pseudo Process results which need to be recorded against the subject file. Step 24936 is employed to Read the Results File which contains the Pseudo-Process Name, the result, an optional message, and the name and PFVL information of the file for which the result should be recorded against. The code looks through the file for a matching file name and PFVL, and if one is found, it calls upon Step 24937 to Set the Pseudo. This is done via a function in the Process Manager to set the Pseudo-Process result into the Control Repository. Disclosure # PO996-0009 contains more information on Pseudo-Processes and the Application Program Interface that allows other routines to set them.

Eventually control passes to Step 24938 which tests for the Resolve Option. This option allows Library Process results from a different PFVL to be recorded against identical processes for the subject FFVL. If this option is passed, Step 24939 Reads the Resolve File which contains the Process Name, Process Reference Number, PFVL information where the source process resides, the Process Result to be recorded, the File Name and PFVL of the subject file and an optional Process Message.

Step 24940 is then employed to Find the Matching Process. This is done by querying the Control Repository for all processes defined for the source PFVL. The code loops through the process definitions until it finds one whose Process Name and Reference Number match the information in the Resolve File. If no match is found, the information in the Resolve File is inaccurate, and the program terminates with a message sent to the user. If a matching process is found, the exact location in the process structure is saved. Next, the control repository is queried for the process structure defined for the subject PFVL. The same location in the process structure is examined to ensure the Process Name is identical to that listed in the Resolve File. If not, then the structures are different, and the rule regarding use of this option is violated, thus causing the process to abort.

If the Process Names match, the Process Reference of the subject PFVL is used to query the Control Repository and store the Process Result and Message against the file being installed. Step 24941 interacts with the Process Manager to Store the Result into the Control Repository.

Eventually, Step 24942 is invoked to test for the Part Number Option This option is used to store PIN information against the subject file. If this option is passed, Step 24943 is called to Read the Part Number File which contains the Part Number, the File Name and PFVL for whom the Part Number belongs, and the owner of the P/N. The program loops through the Part Number File until it finds an entry whose File Name and PFVL match the subject file. Step 24944 is then employed to interact with our Release Control Manager. to Assign the Part Number information into the Control Repository.

Note: In the case of a High Performance install, the subject file referred to in Steps 24935 through 24944 would actually be all files in the High Performance File List whose names and PFVLs match those listed in the Results, Resolve and Part Number files.

Finally, Step 24913 is executed in the event that a Process Queue entry requires clean-up. If the install request was received from an ALM other than the current ALM, then the sending ALM set an entry in the Process Queue. That Process Queue Reference number is included in the install request, and is used to remove the entry from the queue. In addition, if the Process Phase is a Pre-Process, and any part of the algorithm failed to complete successfully, then a special entry is added to the Process Queue to prevent any subsequent Library Processes from executing against the source files. In addition, the source files are prohibited from moving through the DMS until the install can be successfully retried.

File Check Out Utility

Our embodiment permits the user to request ownership of any file in the DMS and associate that ownership with an entry point into the library. This concept of ownership by entry point allows a sophisticated environment to exist where one owner can modify data at one level, promote the data to a higher level, and a second owner can make further modifications. The DMS Architecture also permits a user to set Update Locks at non-entry Levels, or set locks on ALL Levels which prevents another user from modifying or moving the file. However, these actions are not part of the File Check Out Utility and must be performed through a lock setting utility in the Lock Manager.

The user is also given the option to physically copy the file from a public library into their private library. The entire operation suns in the user's environment without the aid of an Automated Library Machine. The request will be honored or rejected depending on the current state of ownership and the relationship of the user to the current owner. The user initiates the operation with the File Check Out menu.

The preferred embodiment presents the user screen in a graphical environment where the user engages pull down menus, pop-up menus, drop-down lists, radio buttons, push buttons, fill-in fields, and mouse interaction. It should be noted, however, that all functions discussed further in the preferred embodiment can be implemented using simple text screens, or more advanced data entry systems such as touch screens, voice commands or 3-D graphics. The preferred embodiment depicts the method most conducive to the Motif™, Windows™, and OS/2™ application environments.

The screen contains six data entry fields, labeled 25901 thru 25906. Field 25901 is where the user types in the name of the file. Fields 25902 thru 25904 are used to denote the Library Name, Library File Type and Version in which the data permanently resides. If the file is currently in a private library, the user enters the name of the public library to which the file will be promoted to in the future. Drop down menu buttons 25907 can be used to display a list of all the known public libraries in the DMS. Button 25908 will display a list of the valid Library File Types used in the library. Likewise, button 25909 will show all valid Versions for the given library. If no library name is entered, then clicking on either button 25908 or 25909 will produce an empty selection list.

Field 25905 represents the Starting Level for the library search engine to conduct the search. This doesn't mean the file must exist at this Level, it's simply where the user desires the search to begin. This can be any valid Level associated with the Library entered in field 25902, or it can be the keyword user. This keyword instructs the search engine to first inspect the user's private library for the file. If it's not found there, then the search engine should traverse the library structure beginning with the Entry Level denoted by field 25906. Drop down menu button 25910 can be used to acquire a list of all available Levels for the Library, Version, and Type entered in fields 25902 thru 25904. One of the choices is always the keyword user.

The Entry Level field, 25906, serves two purposes. The first is to provide direction for the library search engine in the event that field 25905 indicates user, but the file is not found in the user's private library. In this case, the search engine will begin at the level entered in field 25906 and traverse through the library structure until the file is located. The second purpose is to determine which level the Update Lock is to be associated with. Our embodiment permits multiple users to hold Update locks on the same file, but at different entry points into the DMS. Button 25911 displays a list of all valid Levels for the given Library, but unlike field 25905, the keyword user is not permitted.

The algorithm for checking data out of the library begins with Step 25951, SLL=User. Here the Starting Library Level entered in field 25905 is checked to see if it's the User Level of a private library. If so, the user's private library is examined to see if the User File Exists in Step 25952. If so, the Lock Check subroutine illustrated in is invoked and the program complete s. The Lock Check routine is discussed in greater detail later.

If the file doesn't already exist in the User's private library, then the SLL Library Search is employed. The standard library search engine is used to seek out the most recent copy of the file starting at the User Level. The search engine also uses the Entry Library Level entered in field 25906 of to direct the search through the proper entry point. If no file is found, the user is asking for an Update lock on a non-existent file which is an error condition that terminates the program. At the conclusion of the search the user is shown the solution of the search. The Lock Check subroutine is again used to establish an Update lock. Upon return from the Lock Check routine, Step 25954, File Copy, is invoked. The program asks the user for permission to copy the file from the Library Level into the User's private library. The file is renamed to the SLL, which is user in this case, and the program completes.

Returning to Step 25951, if the SLL is not the User level, it's assumed to be a valid Level for the Library, Library File Type and Version entered on the menu. This Starting Library Level is used to initiate the library search engine. Upon completion of the search, the solution to the search is shown to the user. The Lock Check subroutine is invoked, and upon return, Step 25955 is employed to see if the Starting Library Level File Exists. If not, Step 25954 is again invoked to copy the file to the user's private Library and rename it to the Starting Library Level. The user is given the opportunity to confirm this operation.

If a file already exists with the same Starting Library Level, the program indicates this to the user, in Step 25956, by showing the solution of the search along with the file in the user's library. The user is given the opportunity to replace the private copy of the file with the library copy. If the user accepts it, the file is copied and renamed using the Starting Library Level. If the user rejects it, the program terminates with the end result being an Update Lock set on the existing file in the private library.

Turning to the Lock Check Subroutine, the algorithm begins with Step 25960 which calls upon the QRSUPGET to return all the lock and authority information about the file. Next, Step 25961, ELL Lock examines these locks to see if any are owned by someone other than the user. If so, these other locks are displayed so the user can see who else claims ownership of the file. If another user has any ownership locks (at the same or different level), the user is given the opportunity to abort the check out. In addition, the user is also notified whether they have the proper authority to promote this file into the desired Entry Library Level.

If a lock exists for the Entry Library Level, it's checked in Step 25962 to see if the User Owns It. If so, the user officially owns the "key" to this "entry door" and the routine passes control back to the main algorithm User Surgte, is invoked. Here, the database is queried to see if the user is a valid surrogate for the current owner of the lock. If not, then the user is told why the lock can't be set in their favor and the program terminates. If the user is a valid surrogate, then Step 25964, Reset/Notify is employed. In this step, the user is told who currently owns the lock and is given the opportunity to take ownership. If the user accepts it, the DMS sends a notification to the previous owner indicating that the user has now taken ownership of this entry point. The routine returns control to the check out algorithm.

Returning to Step 25961, if no Update lock corresponding to the Entry Library Level exists, then an Entry Library Level Lock is Set in Step 25965 for the user. This is done via interaction with our various Loch. Manager functions.

At this point the program returns control to the main algorithm.

File Deletion Utility

Since data integrity can be easily compromised by uncontrolled file deletion, our embodiment provides a robust utility for deleting data in a safe and orderly manner. It also ensures that the control information such as Problem Fix Numbers and Part Numbers are correctly handled. The preferred embodiment depicts the overall flow of the delete or data removal.

The flow begins with Step 28101, Entry Screen, where the user is presented with the File Deletion Screen. This screen, permits the user to enter information about the file(s) they wish to process. In Step 28102, Foreground, the information gathered in Step 28101 is processed and additional information may be requested. Some basic checks are performed before passing control to Step 28103. In Step 28103, Background, our preferred embodiment processes the request on an Automated Library Machine since these are the only users with the proper permission to edit or delete data within the DMS.

The preferred embodiment presents the user screen in a graphical environment where the user engages pull down menus, pop-up menus, drop-down lists, radio buttons, push buttons, fill-in fields, and mouse interaction. It should be noted, however, that all functions discussed further in the preferred embodiment can be implemented using simple text screens, or more advanced data entry systems such as touch screens, voice commands or 3-D graphics. The preferred embodiment depicts the method most conducive to the Motif™, Windows™, and OS/2™ application environments.

The screen contains five data entry fields, which could be labeled 28211 thru 28215. Field 28211 is where the user types in the Name of the file. The user may type the name in directly or leave it blank to generate a selection list which allows the user to choose multiple files to delete. Field 28212 denotes the Library where the file(s) reside. This function is only intended for data tracked in a public library, therefore this field must contain the name of a valid public library. Drop down menu button 28216 can be used to obtain a list of all the public libraries in the DMS.

Fields 28213 thru 28215 are used to enter the Library File Type, Version and Level where the file(s) reside. Button 28217 will display a list of the Library File Types used in the Library, button 28218 will show all valid Versions and button 28219 will display all valid Levels. This information is used to initiate a library search for the file specified in field 28211. In the event the file doesn't exist at the specified Level and Version, a dialog box will display the closest file found in the library search. The user is given the opportunity to accept or reject the result of the search. If field 28211 is left blank, a selection list resulting from the library search will be displayed and the user may select as many files as desired.

In the cases where the file being processed is under Part Number or Problem Fix Control, the user can explicitly specify the Level and/or Version of the previous file which should be used to reassociate the Part Number and/or reactivate the Fix Management data. The Level and version are entered in fields 28220 and 28221 respectively. These fields are optional, and if left blank will cause the Foreground process to interact with the user to obtain the information. Drop down menu buttons 28222 and 28223 can be used to show a list of valid Levels and Versions for the corresponding Library.

The only option for this operation is the Model option which the user can specify via push button 28224. This is the means by which the user acknowledges that deletion of the file will cause either Bill of Materials deletion or invalidation.

Returning to the overall flowchart, information entered in Step 28101 is now passed to Step 28102, Foreground Processing. The detailed algorithm for generating file deletion requests begins with Step 28311, Parse Opts. Here all the options are examined to ensure they are recognized and the values are acceptable. If Previous File Info is passed as an option, the values are checked to ensure they exist for the given Library.

In Step 28312, a File Loop is initiated in the event the user selected multiple files from the user screen in Step 28101. In this case each file must be subjected to the same checks and tests since each file possesses individual characteristics.

The next series of steps pertain to handling Bill of Materials (BOMs), if they exist. Beginning with Step 28313, Model Opt, the program tests the Model Option flag. If this flag is true, it indicates the user accepts the possibility of BOM Deletion or Invalidation and does not wish to be warned in advance of the consequences. One example is the act of deleting a file which is an anchor to a BOM. If the user knows this in advance, they can pass this option to avoid unnecessary checks. In this case control proceeds to Step 28317.

However, if this option is absent, Step 28314 is invoked to check for BOM Deletion. Here, the Control Repository is queried to see if the current file is a BOM. If so, Step 28315, Warn User is employed to notify the user of the impending BOM deletion. The user is given an opportunity to abort the process. The next step, 28316, queries the repository for any BOM Invalidation. This tests for the situation where the current file belongs to some other BOM, so its removal will result in a BOM becoming invalid. Our Aggregate Manager is used to quickly locate any BOMs in the DMS which contain this file.

Once again, if an invalidation will occur, Step 28315 is employed to notify the user and give them the chance to abort the deletion.

Regardless of the setting of the Model Option flag, control eventually proceeds to Step 28317, File Check. In this step, the algorithm queries the database to ensure the file exists in the Control Repository and the repository agrees on the Level and Version. If the Level and Version returned by the Control Repository are not identical to that indicated by the user in Step 28101, an error occurs which notifies the user and aborts, the program.

The algorithm proceeds to Step 28318 where the Part Number and Fix Management Flags are obtained from the Control Repository and examined for the Library File Type being processed. If the LFT is under Part Number Control, Single Fix Tracking or Engineering Change Mode, control proceeds to Step 28319. In Step 28319, PN/FM Info, all Part Number and Fix Management information is obtained for the file being processed. In addition, all obsolete files, of the same name, and at higher levels, which are attached to the same part number and/or attached to the same EC Number are also returned.

At this point the algorithm determines which dormant file, if any, will be used to reassociate the Part Number and/or reactivate the Fix Management information. First, the Previous File Info fields 28220 and 28221 are examined in Step 28320. If the user specifies a particular level or version, they are expecting the corresponding file to be used to reassociate the PN and/or revalidate the problem fix numbers. In this case, the program employs Step 28321, Locate Previous File, to sift through the data returned in Step 28319 in search of the expected file. If the file is not in the list, it's an error condition and the program terminates. Assuming the file exists, the program proceeds to Step 28322, Trap PN/FM Info. In this step, the algorithm sets a flag and remembers all the information necessary to disassociate the old Part Number and Fix Management data from the file about to be deleted. It also captures the information about the file selected for re-association. Although the information is captured, the actual updating of the Control Repository is done in a later step.

If the Previous File Info fields are empty, the programs checks to see if the list returned in Step 28319 only contains a single entry. If so, Step 28315 is invoked to warn the user that the file in the list will be the one used for PN/FM reassociation. It also provides an opportunity to abort the process. If the user accepts this, Step 28322 is employed to capture the information.

The last possible case for PN/FM re-association, Step 28324, involves a list with >1 File being returned in Step 28319. If this is the situation and no Previous File Information is provided, the program uses Step 28325 to present the user with a Selection List The user may select only one entry or abort the operation. Assuming one is selected, Step 28322 is invoked to capture the information.

If the Part Number and Fix Management Flags in Step 28318 are off, or no files were returned in Step 28319, or any PN/FM information was trapped in Step 28322, control proceeds to Step 28326. In this step, the Level of the file being deleted is checked to see if it's a Release Level This includes active or frozen Release or Sideways Levels. If the Level is any of the aforementioned types, Step 28315 is invoked to warn the user and provide an opportunity to abort.

Control eventually proceeds to Step 28328, PN/FM Re-assoc. In this step, the algorithm uses the information trapped in Step 28322 to interact with the Control Repository. It eliminates all Part Number information associated with the file about to be deleted, and reincarnates all Part Number information pertaining to the file found in the previous step. In addition, the superseded Problem Fix numbers attached to the file are converted to an active state. All appropriate Part Number and Fix Management tables within the repository are updated to reflect a state whereby the previous file assumes the role of the file being deleted.

At this point, control returns to the top of the File Loop in Step 28312. Once all files have been processed through Steps 28313 thru 28325, control proceeds to Step 28329, List Files. Here the Filenames, Library, Level, Version, Library File Type, and File Reference numbers are written into a Library Delete List which will be transmitted to the Automated Library Machine in the next step.

In step 28330, Xmit, the program gathers and transmits all of the necessary data to the Design Control System. In our preferred embodiment, the destination would be an Automated Library Machine which would "receive" the information from the user via an AutoReader The following information need to be transmitted in the delete request:

The type of request: Delete
The list of files being promoted. The following information must exist for each file in the list:
The Filename
The Library File Type
The Package
The Version
The Level
Any user selected options that pertain to the background operation.
The user's electronic id or e-mail address.

This file is transmitted to the ALM for use in the Background Processing step.

Returning to the overall process, the foreground information in Step 28102 is transmitted to an Automated Library Machine for background processing. The detailed algorithm for Step 28103, Background, begins when the algorithm enters a File Loop, in Step 28411, where the list of files transmitted from the Foreground are processed into a data structure. Each step in this algorithm must be performed against every file in the list.

Step 28413 obtains the Lock Information for the file from the Control Repository. This includes information about every possible lock the file possesses at any Level within this Version. In the subsequent steps, the list of locks are examined and different actions are taken depending on the types of locks in existence.

Step 28414 checks to see if any Processing Locks exist on the file at the specified Level. This would indicate a Library Process is currently dependant on the existence of the file, so Step 28415 is invoked to Recirculate the delete request. In our preferred embodiment this entails re-writing the delete request file with the names of all the unprocessed files, and sending it back to the main queue of the DMS. In a simple system without Automated Library Machines, the necessary action would be to introduce the request back into the DMS queue or inform the user to try again at a later time. At this point the processing is complete.

If no processing locks exist, Step 28416 checks for Move or Overlay Locks at the Level where the file exists. In either type exists, Step 28420 Sends an Error Message to the user indicating that the file can't be erased. The program terminates after the notification is sent.

If no Move or Overlay Locks exist the program proceeds to where Step 28417 examines any Update Locks that exist. In this step all Update locks are examined regardless of the Level. In Step 28418 a determination is made as to whether the User Owns All the Update Locks If this is true, then the user is the official owner of the file according to the rules of the DMS. In this case, control can proceed to Step 28421.

If there are some Update Locks which the user doesn't own, or no Update Locks exist at all, then the program checks to see if the user is the Package Manager or Alternate in Step 28419. As long as the user is the Data Manager or a valid alternate, the program is allowed to proceed to Step 28421. If the user is not a Data Manager, Step 28420 is invoked to send an Error Message indicating the situation, and the program terminates.

Assuming that the user meets one of the authority criteria, control proceeds to Step 28421 where the File is Checked to ensure the Control Repository agrees that it exists at the specified Level and Version, and ensure the file doesn't reside in a frozen Release Level.

Next, the algorithm checks the Fix Management Flag in Step 28422. This consists of querying the Control Repository to see if the FM flag exists for that Library File Type. If so, Step 28423 is invoked to Delete the Fix Management Information pertaining to the file. This is done via our Fix Management routines.

Step 28424 performs a similar function with the Part Number Flag The repository is queried to see if the PN flag exists for the LFT being processed. If so, Step 28425 is implemented to Delete the Part Number Information pertaining to the file. This is done via our Part Number routines.

At this point control is passed to Step 28426 to Delete the Lock Information pertaining to the file. This is done via our Lock Management routines. If the user is a Data Manager, it is possible for the file to be in a completely unowned state. In this case, the DMS will not abort, but will continue with the next step.

Figure 11:
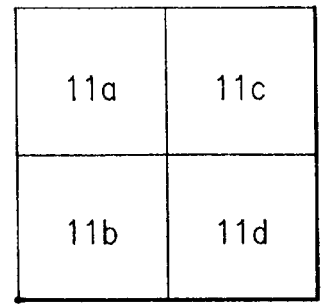
FIGS. 11, 11a–11d describes the QRFILDEL Process.
Figure 11A:
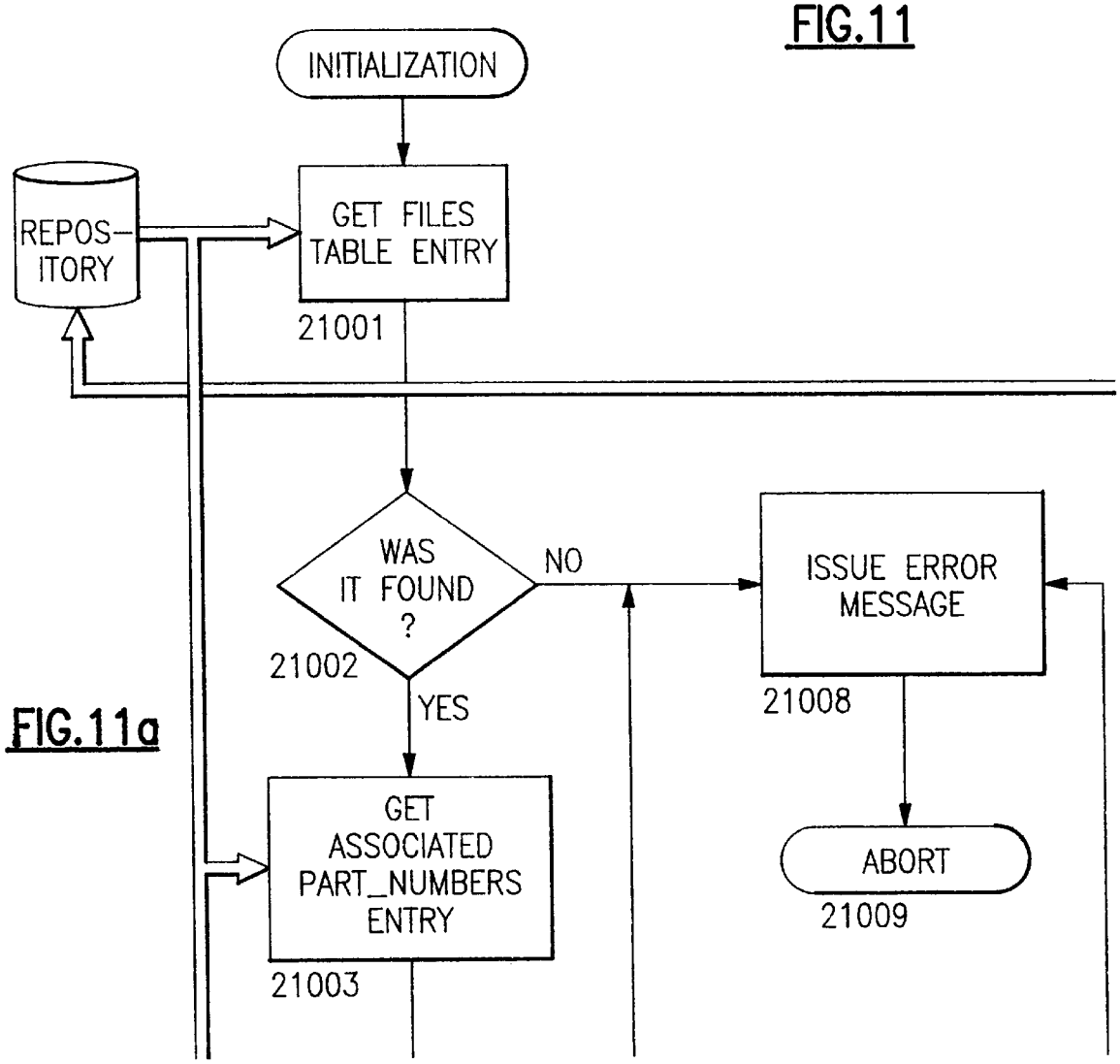
Figure 11B:
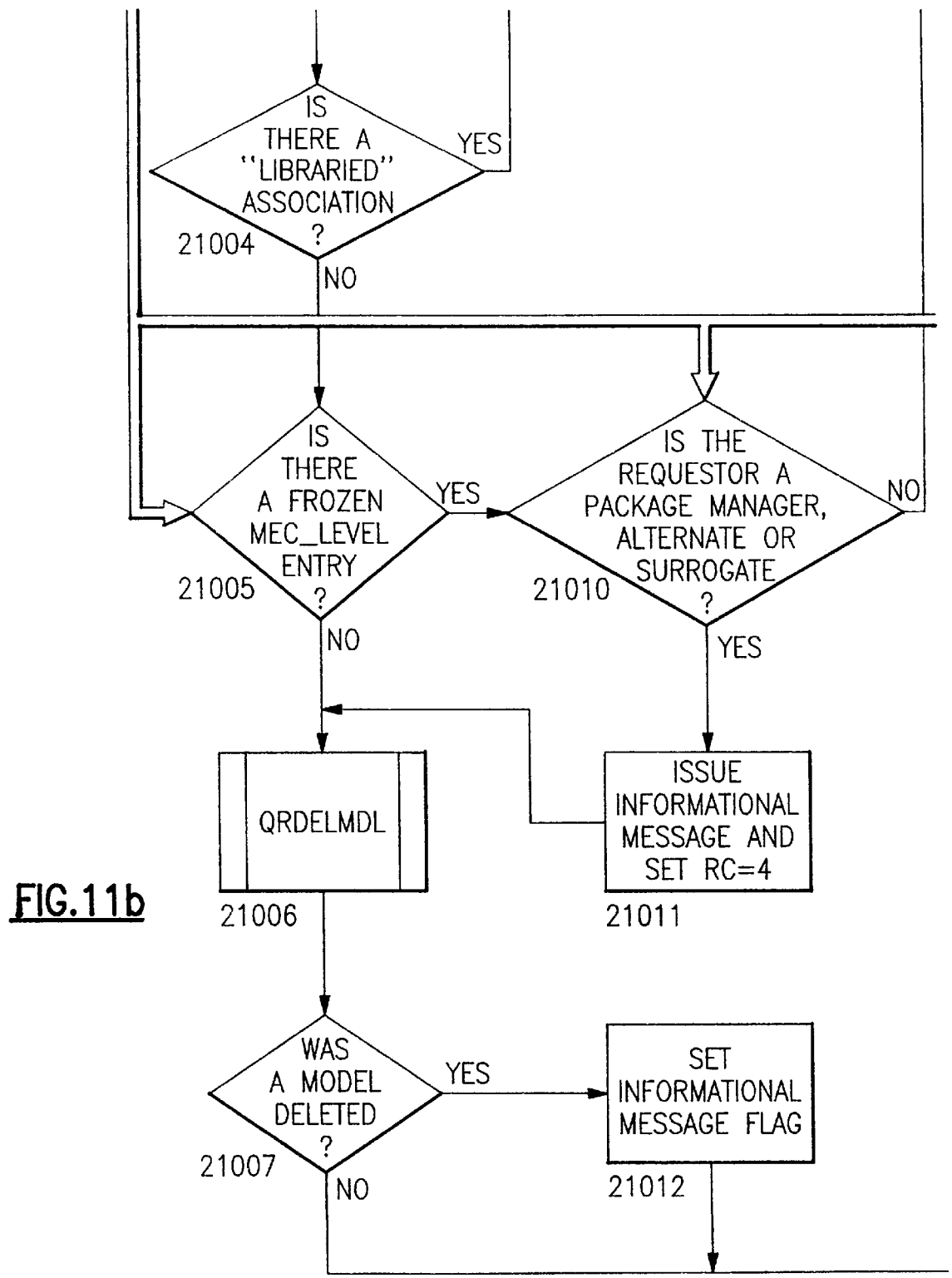
Figure 11C:
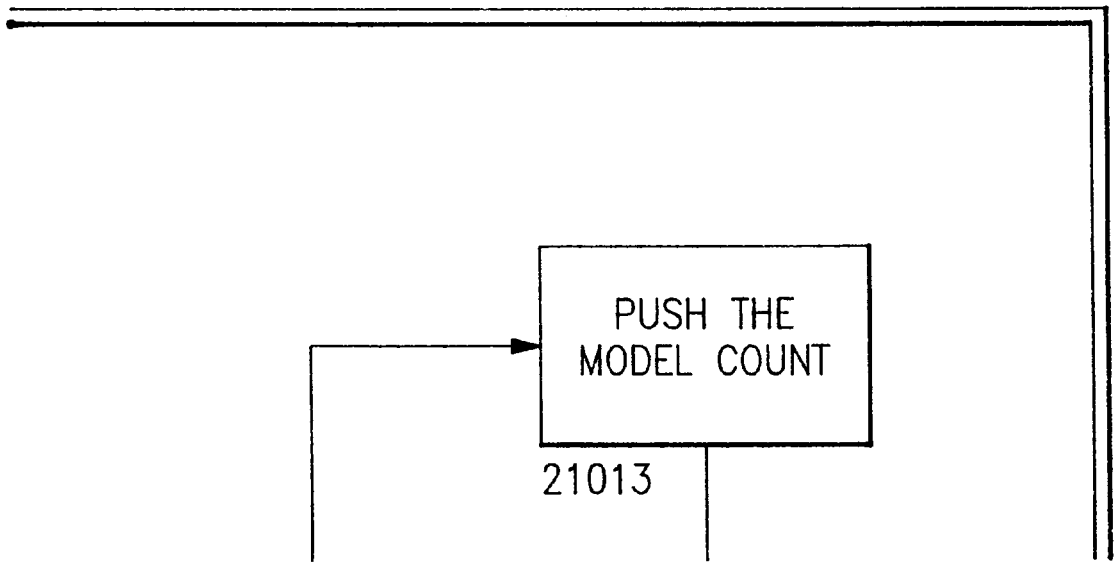
Figure 11D:
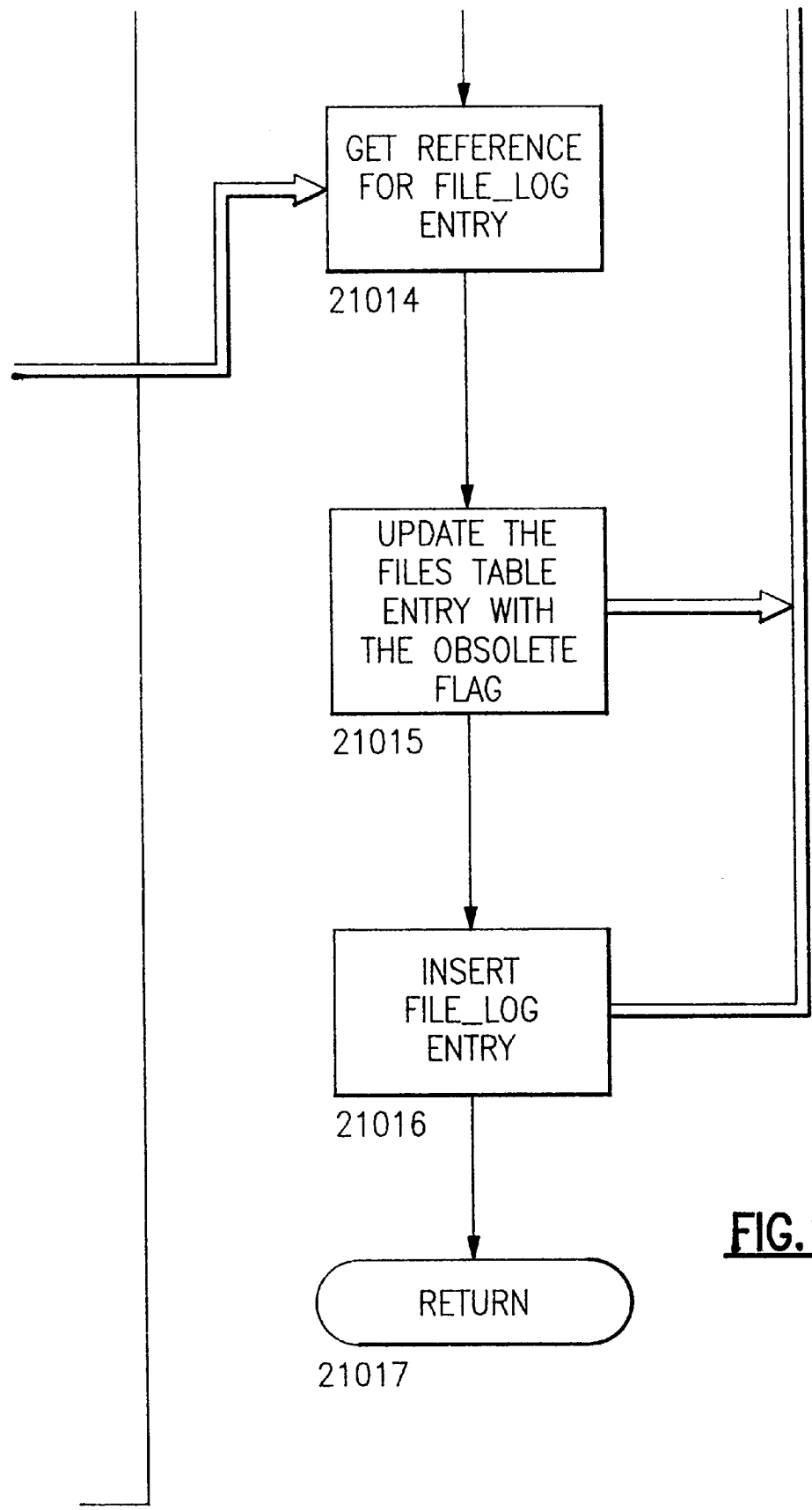

In Step 28427, the QRFILDEL routine, described in FIG. 11, is employed to Delete the File from the Control Repository. This entails updating the necessary files tables to eradicate any associated entries.

Steps 28428 thru 28430 are designed to handle any Bill of Materials associated with the file. In Step 28428, the DMS checks to see if the file itself is the anchor file of a BOM. If so, BOM Deletion will occur for all BOMs associated with the file. Step 28430 is invoked to Notify the owners of all the BOMs about the elimination. BOM deletion is Performed via our Aggregation Management routines.

In Step 28429 the DMS checks to see if any BOMs are Invalidated by the removal of the file. If so, Step 28430 is again invoked to notify all owners of any affected BOMs. BOM invalidation is performed via our Aggregation Management routines.

The last step in the File Loop is Step 28431 which will Erase the File. This includes obtaining the physical location of the file from the Control Repository and performing the deletion. Depending on the environment, the Automated Library Machine may have the proper permission to perform a direct removal, or it may have to transmit a request to an agent which is capable of performing the removal. In our preferred embodiment, the method of removal depends on the ALM configuration employed. In a Conventional System or any arrangement running on a Unix/AIX platform, the ALM can delete the file without assistance. However, in an Actor/Object configuration running on a system such as VM, or a complex system involving multiple computer platforms, the ALM may need to request the Object to perform the file removal.

Control returns to the top of the File Loop in Step 28411 until all files in the request are processed successfully. The operation then exits with a success message sent to the user.

Automated Library Machines (ALMs)

Our embodiment contemplates the use of Automated Library Machines (ALM) to process the work requests on behalf of the users. Although this embodiment is ideally suited for the various process and methods described in the other sections of the Preferred Embodiment, ALMs are not confined to running only those processes. ALMs may exist in Data Management Systems running processes and algorithms outside of those mentioned in this disclosure.

Our embodiment employs an Automated Library Machine (ALM) to service data management requests on behalf of the users. This enables the user to initiate a library job such as promotion request, Designer Initiated Library Process, or delete request without requiring significant client resources. The ALM provides continuous service by utilizing the concept of a reader to queue and prioritize users' requests. Performance of the Control Repository may also benefit since the most of the communication is with a relatively small number of ALMs compared to the larger number of individual users.

The preferred embodiment uses ALMs to execute all the Background algorithms included in the embodiment. One skilled in the art would appreciate that an alternate embodiment doesn't require ALMs by eliminating all the transmittal steps in the various Foreground algorithms, and simply running the Background algorithms on the client machines. As eluded to above, this may require substantial client resource and may compromise performance of the Control Repository.

For large Data Management Systems, our embodiment permits the creation of multiple ALMs to service a single library. This enables large user groups to redeem faster results through the use of parallel processing. The Data Manager has the option of arranging the pool of ALMs in one of three configurations depending on the expected type and volume of data management requests. The basic configuration is known as a Conventional System where a single ALM accepts all work requests and handles all services for the Library Manager, including any Automated Library Processing. The second configuration is Remote Execution Machines which is an extension of the Conventional System. Here, a single ALM receives all work requests from the user, and processes all promotion, installation, movement, and removal of data. However, additional ALMs may exist to perform Automated Library Processing. The ALMs interact with the Library Manager, Communication Manager and Promotion Algorithm to dispatch any desired library processing to a Remote Execution Machine, which executes the task and returns the results to the master ALM. The most powerful configuration is known Actor/Objects and this arrangement employs a pool of ALMs which serve as general purpose machines. They can perform any desired Library Management function, including Automated Library Processing. They can even interface with Remote Execution Machines to provide an environment with both general purpose machines and dedicated service machines. Each Actor can be programmed by the Data Manager to define the type of work requests it can process. This arrangement even includes a special Dispatcher ALM whose sole purpose is to dispatch user work requests to the next available Actor machine.

The means by which data is physically moved between, added to, or deleted from, the repositories depends on the chosen configuration. In a Conventional System, the primary ALM is the only ALM with the proper authority to manage files on any repository within its own library. Remote Execution Machines may only receive work requests and return data and results to the Primary ALM. Our embodiment does not permit Conventional Systems to process file transfers across multiple platforms.

In this system, all actions are initiated by job requests. These may be include:

Class A: Requests to promote data from a user's private library into the public library or invoke Designer Initiated Library Processes.

Class B: Requests to promote data through the public library.

Class C: Requests for Automated Library Processing on a Remote Execution Machine or responses from Remote Execution Machines to indicate completed Library Processes.

Class D: Requests to install new data generated by Library Processes on Remote Execution machines, delete files from the DMS, or perform Data Management functions.

The classes represent priorities with Class D being the highest and Class A being the lowest. Every ALM in the library (Primary ALM and all Remote Execution Machines) runs the ALM algorithm as an AutoReader task. AutoReader automatically invokes the algorithm whenever a file is received in the reader.

In an Actor/Object system, either the Actors have the ability to directly manipulate files in the repositories (such as Unix/AIX), or they must rely on a dedicated ALM known as an Object to handle all file management tasks. The Object has the proper authority for all repositories in the library. The Actors run the ALM algorithm as an AutoReader task, just like the primary ALM in a conventional system. However, many of the Class C and D jobs related to file management are replaced by the Actor performing its own file manipulations (if the environment allows it), or by communication with the Object (such as a VM Actor/Object system).

In systems requiring an Object, communication between the Actor and Object is accomplished by an asynchronous messaging system where the Actor initiates a request to the Object and waits for a response message from the Object. The message consists of a command line which includes the:

Function to be Performed

Source File Name

Source File Type

Target File Name

Target File Type

Source Repository

Target Repository

The repository fields include enough information to physically locate the file regardless of the platform or environment. The Object, in turn, runs a continuous routine implemented as an AutoReader interrupt hook. Whenever it receives a message, the routine "wakes up" and checks to ensure the message is from a valid Actor, and contains one of the supported functions. It then executes the appropriate function and sends a completion message to the Actor. If either the Actor or Object fails to transmit or respond to a message successfully, a mechanism will resend the message until the handshaking is complete.

Regardless of the environment, all Actor/Object systems support the following functions:

Rename Move or Rename the file from the source to the target location. This is only used on environments which support it such as Unix/AIX, or VM when the source and target are the same minidisk.

Copy Copy the file from the source to the target location. This is used to install an output file from an Actor into the repository, or as the first part of promotions involving a Cross-Platform file movement, Cross-Account or Cross-Minidisk file movement on VM.

Delete Delete the file from the source location. This is used for File Delete requests or as the second part of promotions involving a Cross-Platform file movement, Cross-Account or Cross-Minidisk file movement on VM.

Batch Used for multiple files which must be manipulated as part of the same task. A batch file is generated listing each file along with it's corresponding command line. The commands must be one of the three supported commands (Rename, Copy or Delete). The ALM loops through each line of the batch file and Processes each file successively.

Note: ALMs only deal with file manipulation requests. In the preferred embodiment, it's up to the DMS algorithm overseeing the file movement (such as the Promotion or File Installation algorithm) to determine which type of library arrangement exists and whether job requests should be created and transmitted to a Conventional ALM or Actor/Object commands should be generated and executed. Therefore, the underlying code for all these algorithms must query the DMS for the type of library arrangement. If it's Actor/Object, the code must also determine whether the environment utilizes an Actor/Object messaging scheme, or whether the Actor can execute the Rename, Copy and Delete functions directly.

Automated Library Machines are based on the concept of an Automated Reader where the Reader is a temporary storage area which accepts library requests. A Reader may simply be a directory where data is copied into, or it may be part of the environment such as the VM system. A simplistic implementation of an Automated Reader would incorporate a continuous loop with a timer to view the files in the Reader at specified intervals, and upon finding one, initiating the ALM algorithm. However, our preferred embodiment implements an Automated Reader by using an AutoReader service machine. This software machine is capable of performing many tasks outside the arena of Data Management, as well as providing the Automates Reader function.

Once a file is detected in the Reader, the ALM algorithm is invoked. It begins with Step 29120 where a registration check is performed. All ALMs must be registered with the Control Repository, and when registration is complete a flag is set. In Step 29120, Reg. Flag, this flag is tested to ensure it's set. If not, Step 29121 is invoked to Register the ALM. The ALM is first checked to ensure it's an authorized user of the Control Repository, and if so, it updates the repository with certain environmental information such as user id, system address, etc.

Upon completion of the registration, Step 29122 is executed to test for a Startup command. This is passed into the ALM algorithm as an AutoReader parameter whenever the machine is re-started. This could be the result of a system crash or a manually initiated command. In the case of an ALM Startup, various tests are made to attempt to recover any interrupted or incomplete tasks. The first test, done in Step 29125, is for a Process Crash. This is done by looking for the existence of a Bucket in the ALM's work space. Our Process Manager writes a Bucket file each time it begins running an Automated Library Process. If the process completes normally, the Bucket is erased. The existence of a Bucket signifies a Mid-Process crash, which results in Step 29126 being executed to Send a Message to the user who requested the Library Process. This information is contained in the header of the Bucket file.

Control proceeds to Step 29128 to test for a Create DILP Recovery file. This file is created during the installation of the output of a special Automated Library Process known as a Create DILP. In the event of an ALM interruption, this file contains all the information necessary to retry the file installation. Next, Step 29129 checks for the File Existence of the Create DILP output. Assuming it's present in the ALM's work space, Step 29130 in invoked to Automatically Retry the installation of all Create DILP output. The installation entails calling the QRSUPGEN function to update the necessary files tables as well as calling QRRESADD to add the Library Process result.

The third test is for a regular Install Crash in Step 29132. This is accomplished by testing for the existence of an Install Recovery file. Like the Create DILP Recovery file, this file is written as part of the file installation algorithm to aid in automatic recovery. If it exists, the recovery action is determined by the existence of the Process Phase parameter in the Install Recovery File. Step 29134 tests for the Process Phase. If it is absent, the installation was not initiated by an Automated Library Process, therefore Step 29136 simply Recirculates the Install Request. If the phase does exist and the originator of the request is an ALM other than the current machine, then Step 29138 is executed to test if the Phase= Pre Process. If so, then Step 29140 will be invoked to call the QRPRQADD function to add a special entry to the Library Process Queue. This prohibits the file undergoing Pre-Processing from moving through the DMS, or executing any further Library Processes, until the installation can be performed successfully. Regardless of the phase, Step 29142, QRPRQDEL, will eventually be called to delete the entry from the Library Process Queue that was created by the Install Algorithm to prevent any file creation or movement while the installed file is in transit.

Once the appropriate recovery action is completed, or if none of the three types of recoverable scenarios are satisfied, control exits the algorithm and returns to the AutoReader machine.

Returning to Step 29122. if the current request is not a Startup then control proceeds to Step 29123 to Order the Reader. This step incorporates a combined algorithm to provide first-come-first-serve processing for non-Data Management requests, while ensuring Data Management jobs are handled in order of priority. First the file is examined to see if it's possesses a higher priority than a library request. The type of request is also checked to see if it's a supported library request. All library requests contain a LIB keyword in the job type. If none of these conditions are satisfied, the program immediately returns control to the AutoReader algorithm to process the non-Data Management request. Otherwise, this is assumed to be a library work request. In order to maintain data integrity, all library requests are processed in order of highest to lowest priority. Step 29123 accomplishes this by sorting all reader files, which possess one of the four job classes, in descending priority order. If multiple files contain the same priority, they are sorted by time from oldest to most recent. This yields the oldest, highest priority file. The program then determines if the type is a library request. If so, it will be processed, otherwise, the sorted list is searched until the oldest, highest priority library request is found. This ensures that the library requests are done in the proper order, but still permits non-library work to be intermixed.

Next, Step 29124 is invoked to Resolve the Sender of the library request. This entails reading the sender's id and electronic address from the header portion of the work request. At this point control proceeds to a Receive the File. Receiving the file refers to moving the file from the reader to the ALM's workspace so downstream programs can access it. These downstream programs may be the Promotion algorithm or an Automated Library Process, but our embodiment ensures all ALM's use identical work spaces, which are environment specific, so any downstream process can easily find the data. For example, in an aix/unix environment, a nomenclated subdirectory is used as the ALM's work space, whereas temporary DASD is used in a VM system.

Steps 29146 through 29163 are used to direct the library request to the proper algorithm. It can best be handled with a case or select statement, and the don't imply any order for these steps. Step 29146 tests for a Report Request. Our embodiment permits the user to send requests for various nightly reports. If Step 29146 tests positive, then Step 29147, Rpt is invoked to add the request to the nightly report queue file. At a pre-determined time, a service machine wakes up and processes all the requests in the queue.

Step 29148 tests for a Promote Request. These can be requests to transfer data into a public library from a private library, or move data through a public library. The data may be an individual file, a group of files, or an aggregate grouping. Regardless of the type of promote, control is passed to the Promotion algorithm in Step 29149. This algorithm is detailed in FIGS. 14 and 15.

Step 29150 tests for a Delete Request. These are requests to delete data from a shared library, and they can be initiated by the owner of the data or the Data Manager. Delete requests are handled by the Delete algorithm in Step 29151.

The case structure continues with Step 29152 which tests for an Install Request. This type of request originates from an ALM acting as a Remote Execution Machine in a Conventional Library System. Since the Remote Execution Machine can only execute Library Processes, but not manipulate data, it must send a request to the Primary ALM to store the data into the repository. In this case, control is passed to the Install algorithm in Step 29155.

Step 29154 tests for a Store Request. This is almost identical to the Install Request in Step 29152, except that the data is not tracked in the Control Repository. It's simply deposited into the data repository without any affiliation to the library structure. These requests originate under the same circumstances as Install Requests, but they are handled by the Store algorithm in Step 29155.

The Store Algorithm in Step 29155 simply consists of reading the file information out of the request file and determining exactly which repository the file should be stored on. This information is contained within the job request. Next, the code receives the file from the reader and copies it into the appropriate repository. Since the file is not tracked by the DMS, no queries are made to the Control Repository. Furthermore, the nomenclature on the file consists only of a Filename, Library File Type and Version. There is no Package, Level, or File Reference Number.

In Step 29156, the program checks for one of the many types of requests associated with Automated Library Processes. Due to the many different library arrangements supported by our embodiment, any given ALM may be playing the role of a Conventional ALM, Remote Execution ALM, or an Actor. This means that any ALM must be capable of receiving a job request to initiate an Automated Library Pre-Process, Post-Process, or a Designer Initiated Library Process (DILP). Additionally, it may receive responses from completed Pre, Post or DILPs. All requests related to Library Processing are handled by our Automated Library Processing algorithm in Step 29157.

Step 29158 is designed to handle requests which Create a Structure File. Our preferred embodiment uses Structure Files to supplement the Structure Tables in the Control Repository. These files contain a formatted list of all the Levels and Versions installed for this Package, their repositories, and the information linking the Level and Version tree. This permits many of the Data Management functions to reference this file instead of querying the repository, thereby increasing availability and possibly improving performance. In order to assure that these files are kept in sync with the Control Repository, any changes made by the Data Manager to the library structure result in a Create Structure File Request being sent to the library's main ALM. Upon receiving it, Step 29159 is invoked to Update the Structure File using the latest information in the DMS. This step extracts the structure information from the Control Repository and writes it into the Structure File with the proper format.

The case structure continues with Step 29160 which tests for an Authority Request. Data Managers may elect to use Authority profiles to generate a master list of authorized users for their Package. Every time this list is generated, it's sent to the master ALM for the Package, where upon receiving it, Step 29161 is invoked to Replace the Authorized Users List. This simply consists of copying the newly received file over the existing user list. Detailed information regarding Authority Profiles can be found in our Authority Manager.

Step 29162 tests for a Cross Platform data transfer such as a file being promoted from a Unix/AIX platform to a VM platform. Step 22432 of our Promotion algorithm, describes how files are moved from the source repository to the destination. In many cases the ALM running the algorithm has the proper access to perform the necessary file transfer functions without any assistance. However, cases such as this one, don't permit the proper access to the ALM on the source platform. Therefore, the source ALM suspends running the Promotion algorithm and uses a special ELM, running on the target platform, as a communication agent to forward a Cross-Platform job request to any ALM on the target platform capable of writing to the target repository. This ALM on the target platform receives the Cross-Platform Data Transfer job request which requires the special algorithm in Step 29163 to be invoked.

Step 29163 runs the Cross Platform Algorithm. which begins by reading the header line from the Cross-Platform job request file. Next a loop is established to process each file listed in the request. For each file the source repository is linked in a read mode, and the destination repository is linked in a writable mode. The appropriate file transfer protocol is established and the file is copied to the target repository. The copy of the file residing in the source repository is then deleted.

At this point the file movement is completed, so control returns to the top of the file loop until all files are moved to their target locations. The code then executes the same steps in the Promotion Algorithm that would've taken place if the source ALM performed the file movement. These consist of Step 22433 in FIG. 15*d* and all the steps in FIG. 15*e*.

If the request keyword doesn't match any of the tests, then control is returned to the AutoReader and a message is sent to the sender indicating a nonsupported library request. It should also be noted that this structure easily permits additional types of library requests to be added. For example, other environments may require a type of library processing not discussed in the preferred embodiment. By simply assigning a keyword to that type of request, any algorithm or program can be exercised upon receipt of the work request.

On the other hand, if any of the supported algorithms are executed, they will eventually return control to Step 29170 to test for a Processing Lock Some of the algorithms such as the Promotion and Library Processing algorithms may not be able to process the current request if it involves data currently locked in the DMS. In this case, the algorithms return a unique return code, which Step 29170 detects. If it tests positively, then Step 29171 is invoked to Recirculate the request. This entails placing the request back into the Reader with the same priority, but a current time stamp. If there are no other work requests in the Reader, then this request will continuously loop through the Reader until the Processing Lock relieved and the appropriate algorithm can service the request.

In a DMS utilizing ALMs, all Foreground algorithms transmit job requests to the ALMs which execute the Background algorithms. In order to assist these Foreground algorithms in locating the proper ALM to send the request to, our embodiment provides the following means. The preferred embodiment contemplates the use of a Master Library Directory which retains information about every library in the DMS. The listing is sorted by Package ID, and each record indicates whether the libraries for that Package are running in Conventional mode or Actor/Object mode. Additionally, the record indicates the primary repository for that library. This repository holds any data with library-specific data such as Library Logs, AutoReader control files, Actor lists, etc. User data may or may not be located in this repository.

The Master Library Directory may be maintained within the Control Repository or as a separate flat file kept in a commonly accessible location. Since any authorized user of the DMS may invoke a Foreground algorithm, all users' client environments must have access to this information. Regardless of its location, the Foreground algorithms always follow this procedure for transmitting job requests. First, the Package is checked to see if it's running a Conventional or Actor/Object system. If it's Conventional, then the primary repository is the Primary ALM where all job requests should be transmitted. Using the four level Class system explained above, the Foreground algorithm directs the job request to the Primary ALM's reader queue. Eventually, the Auto-Reader accepts the job request and initiates an ALM to process it. If the Foreground algorithm detects an Actor/Object system, then it must locate the Actor List. This is a listing of all the Actors servicing a given library. For each Actor in the list, information exists denoting the type of work requests it's allowed to receive. The Actor List is established by the Data Manager using our Data Management Configuration Utilities. A utility exists which permits the Data Manager to easily define a multiplicity of Actors with their corresponding qualifications. This information is stored in the Control Repository and may be duplicated in a text file which is stored in the primary repository.

Once the information in the Actor List is acquired, the Foreground Algorithm looks for a special Actor called a Dispatcher. In systems without dispatchers, the algorithm simply scans the Actor List until it finds an Actor capable of accepting the type of work request being transmitted. If more than one work request is being generated, and more than one Actor is capable of accepting that type of work, the requests are distributed evenly between the Actors in a simple round robin scheme. However, our embodiment incorporates the use of a Dispatcher to maximize efficiency by receiving all work requests from all users into a single "Bank Teller" queue. The Dispatcher is a special purpose ALM whose sole job is to accept work requests from users client machines, and dole them out to the next available Actor capable of servicing that particular request. The Dispatcher ALM runs a special Dispatching algorithm which is described below. Once the work request reaches the Actor, it's handled in the same manner as a Conventional System whereby the request is received and processed by the ALM algorithm.

Note: Work requests generated in the users' environment are never sent directly to Remote Execution Machines. The use of a Remote Execution Machine is specified for Automated Library Processes by the Data Manager. When a user initiates one of these special Library Processes, the work request is first analyzed by the Primary ALM, in a Conventional system, or an Actor ALM. The ALM algorithm decodes the work request and calls upon our Library Process Manager to direct it to the appropriate Remote Execution Machine.

Our embodiment further enhances libraries arranged in an Actor/Object configuration by contemplating the use of a Dispatcher ALM. The Dispatcher is a special purpose Actor which accepts job requests from the user and holds them until an Actor capable of processing that work request is available to service it. Throughput is enhanced by ensuring all Actors are kept busy whenever possible, and the workload is balanced across all of them. Configurations using a Dispatcher identify the userid in the Library's Actor List with a special entry denoting it as a Dispatcher. All foreground algorithms which generate work requests check for this entry upon detection of an Actor/Object configuration. If it exists, the job request is sent to the corresponding userid. Otherwise, the Actor List is examined for the first Actor in the list capable of servicing that request. The job is then dispatched directly to that Actor. If multiple jobs need to be dispatched, the jobs are distributed to all the Actors, capable of handling the task, in a round-robin fashion. This scenario may lead to an unbalanced workload among several Actors if the job requests have a large disparity in processing times. The Dispatcher is designed to eliminate this.

The preferred embodiment permits any ALM to act as a Dispatcher simply by configuring the Autoreader to run a special Dispatcher algorithm. It works on the premise that Autoreader permits three types of interrupts:

1. A new request arriving in the Reader causes a PreCheck interrupt.
2. A message or command may be used as an interrupt.
3. AutoReader's built in timer acts as an interrupt when it "wakes up".

The algorithm continuously monitors for any type of interrupts. Upon receiving one, it must check to see if it's one of the three aforementioned types. There are other types of interrupts, but they don't pertain to the Dispatcher function.

Our preferred Design Control Repository and System Methods (5.0)

Here we will discuss how our preferred Design Control Repository and System Methods can be used with various changes which need to be adopted for existing software in order to make use of that software in our new environment. In this area we will discuss the AFS environment. In order to be used commercially in the future, we believe that the current software, now insufficient for our complex needs, needs to be changed. Our PFVL structure and principles are adopted.

As one reads this, one will appreciate that we now have a data management system for file and database management which has a design control system suitable for use in connection with the design of integrated circuits and other elements of manufacture having many parts which need to be developed in a concurrent engineering environment with inputs provides by users and or systems which may be located anywhere in the world. Using our PFVL structure and process principles as the foundation for the architecture we provide a set of control information for coordinating movement of the design information through development and to release while providing dynamic tracking of the status of elements of the bills of materials in an integrated and coordinated activity control system utilizing a control repository which can be implemented in the form of a database (relational, object oriented, etc.) or using a flat file system. Once a model is created and/or identified by control information design libraries hold the actual pieces of the design under control of the system without limit to the number of libraries, and providing for tracking and hierarchical designs which are allowed to traverse through multiple libraries. Data Managers become part of the design team, and libraries are programmable to meet the needs of the design group they service. A control repository communicates with users of the design control system for fulfilling requests of a user and with data repositories of said data management control system through a plurality of managers. Each manager performs a unique function. Managers act as building blocks which can be combined in a plurality of manners to support an environment for suitable for multiple users of a user community.

Figure 16:
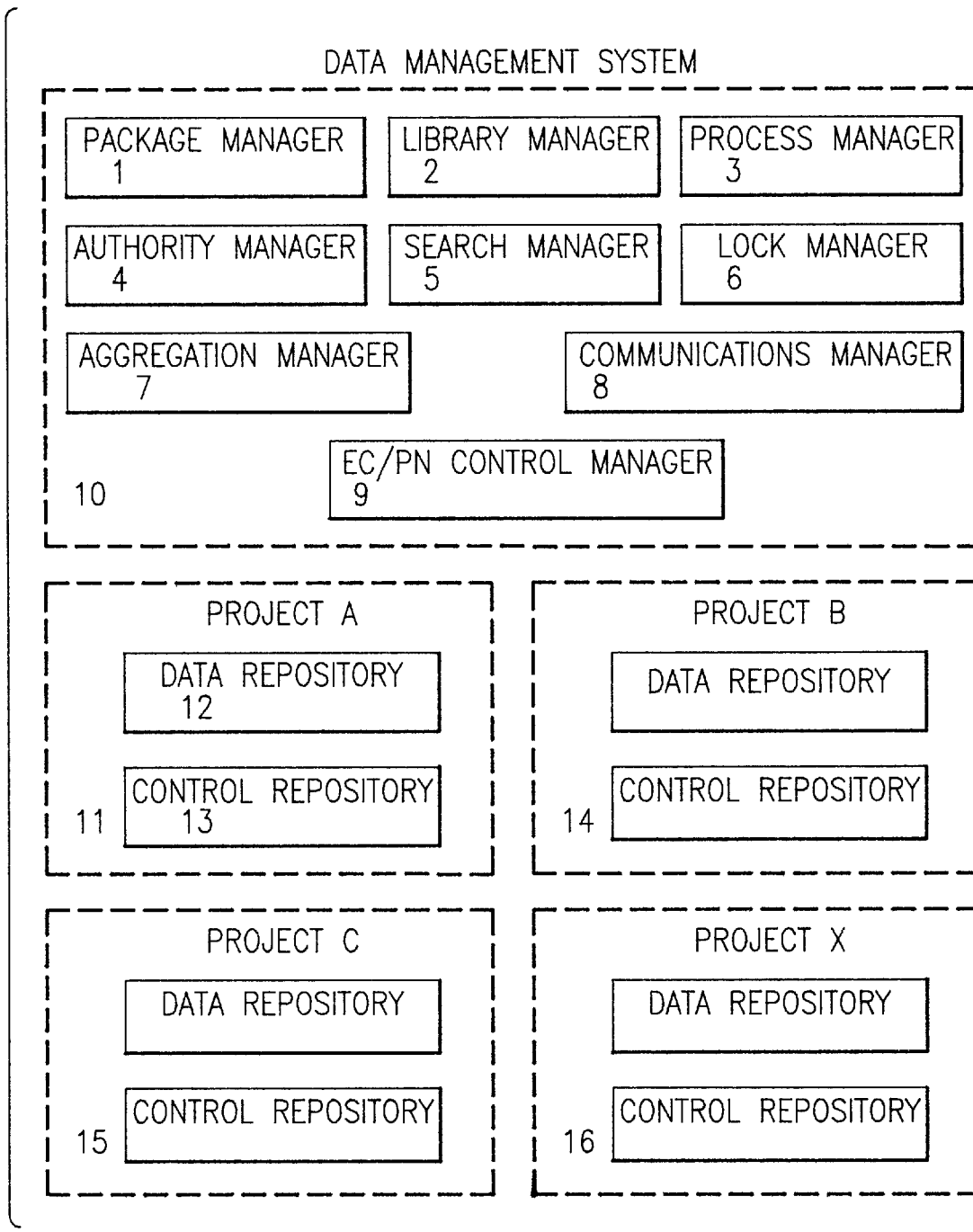
FIG. 16 illustrates the Overall Structure of our Design Control System's Data Management facilities.

As we review our concepts in greater detail, it will be seen that the present embodiment describes a Data Management System (DMS) which is composed of a suite of function managers and one or more projects (see FIG. 16—Items 10, 11, 14, 15 and 16). Each project is composed of a central Control Repository and one or more data repositories (see FIG. 16—Items 12 and 13) to store, manage, and manipulate virtually any type of data object. The Control Repository consists of a Common Access Interface and one or more data bases (see FIG. 17—Items 1 thru 5). These data bases may be:

A Relational Data Base consisting of a collection of tables of data where the columns contain the attributes of related data and the rows are the instances of the data.

An Object Oriented Data Base consisting of a collection of object instances of classes where the attributes are the class members.

A Control File Data Base consisting of a collection of files where the records are the instances of data and the attributes are arranged along the records.

A Directory Data Base consisting of a collection of file directories which may or may not contain files. Their relationships are described by the directory structure. The instances can be either sub-directories or files.

This repository communicates with users and the data repositories through a plurality of Managers, each performing a unique function. These Managers act as building blocks which can be combined in numerous ways to support environments ranging from a small user community to a global enterprise.

Our preferred embodiment employs a relational database to serve as the Control Repository. Each data object in the Data Management System (DMS) is assigned a unique identifier that permits all information about the object to be recorded and tracked by a multiplicity of relational tables. The physical data is stored using conventional storage management techniques which allow any type of data (text or binary) to be tracked in it's original form. The data may even reside on multiple platforms.

Users of the DMS communicate directly with the Control Repository, through a Communications Manager, to initiate some or all data management functions. Upon initiation, the Communication Manager employs one of the other Managers to complete the task. Our preferred embodiment contemplates the use of software service machines, known as Automated Library Machines, which execute requests on behalf of the users. These Automated Library Machines (ALMs) automatically enable the proper Manager to carry out the desired task, while freeing up the user's environment to perform other activities. The Communication Manager also enables the ALMs to communicate directly with the Control Repository.

In order optimize data storage, our embodiment uses a PFVL paradigm to identify all data in the DMS by Package, File Type, (Data Type), Version and Level. Packages are arbitrary divisions of data whereby all the data has some common association. A Data or Package Manager defines the structure for the Package and performs all data management administrative functions. Levels are typically associated with "degrees of goodness" or quality. Data typically enters the DMS at low Levels with minimum entry criteria. As the quality improves, it is promoted to higher Levels until eventually being released as a finished product. Our system supports robust promotion criteria definitions which may exist for every PFVL in the DMS. Versions allow multiple variations of the same piece of data to be processed and managed simultaneously. One Version may be independent or based on another, which eliminates the need for common data to be repeated.

The present embodiment expands the PFVL paradigm into a means which enables the Data Manager to configure a Package under numerous structural arrangements. For example, the Data Manager may store all the data into a single physical repository, or segregate it by PFVL. The structure may contain multiple entry points, which enables data to be Fast-Pathed into non-entry Library Levels. This feature supports unlimited branching where any Level may have multiple lower Levels, each of which may have multiple lower Levels. Levels may be denoted Working Levels which constitute the minimum structure all data in a given Package and Version must traverse prior to release. Working Levels are transitory places where no data resides permanently. In addition, our embodiment permits the existence of Release Levels where data resides upon release as a finished product. These can be Regular Release Levels where data may only enter from the highest Working Level and remain permanently frozen. There is also a concept of a Sideways Release Level which serve as a repository for modifications made to data residing in Regular Release Levels.

In order to aid users and third party tools in locating data, our embodiment offers a Search Manager. The underlying utilities provide a means to search for data starting at a specified Level and Version. If the search fails to find the data at the starting location, it will traverse the structure ascending Levels until all Levels in the current Version are exhausted. If the current Version is based on a previous Version, the search will traverse the previous Version. The search engine will locate data stored on multiple platforms and a single invocation can find multiple data objects of the identical or different data types. The Search Manager offers a multitude of options and features to seek out data in public and private Libraries, to sort and filter the results, and to perform the search with or without the assistance of the Control Repository.

Our preferred embodiment describes the most sophisticated form of the DMS which incorporates a Communication Manager to manage all communications with the Control Repository. It employs a series of communications machines capable of queuing and prioritizing queries initiated by users or Automated Library Machines. The mechanism enables unlimited access to the Repository regardless of the number of simultaneous queries supported by the database. The Communication Manager also provides a medium of information exchange for all other Managers and the ALMs. Since the Communication Manager supports multiple platforms, it acts as an agent to provide remote access to the Control Repository through conduits such as the Internet.

The present embodiment provides data control and security through a Lock Manager which offers three types of locks. First, there are Out for Update or Ownership locks which permit a user to check out a data object and modify it without fear of another user making a simultaneous update. Our embodiment also provides a means for transferring ownership of a piece of data from the primary owner to a designated surrogate without the primary owner's intervention. Upon completion of the transfer, the primary owner is automatically notified of the ownership transfer. Additionally, the preferred embodiment provides an environment where multiple users can own the same piece of data at different Library Levels.

In addition to ownership locks, the Lock Manager offers Move and Overlay locks which can be used to prevent data from being moved through the DMS or overlaid by the data at lower Levels. It also interacts with the Aggregation Manager to provide locking of entire an Bill of Materials, and it interacts with the Process Manager to provide an interlocking mechanism or data undergoing Automated Library Processing.

Our embodiment contains an Authority Manager to provide various types of user authorities down to the PFVL granularity. Interaction with the other Managers affords, but is not limited to, the following authorities:

Data Promotion into and through public Libraries.
Bill of Material Promotion through public Libraries.
Creation of a Bill of Materials
Setting the three types of locks on data objects
Initiating Automated Library Processes
Setting Level Independent Pseudo Process results Our embodiment even permits pattern matching on the names of the data objects to add another Level of granularity beyond the PFVL.

In order to aid the Data Manager in performing the multitude of administrative tasks, our embodiment contemplates a Package Manager which includes utilities and user interfaces to accomplish the following:

Set up Package Control Data such as Fix Management and P/N Control Levels.
Define or dynamically reconfigure the Library Structure, including selection of data types to be tracked under the DMS.

Define the physical repositories of the data (down to the PFVL if so desired).

Balance workloads among Automated Library Machines.

Define, manage and edit:
  Automated Library Processes
  Authorities
  Automated File Groups The Package Manager supports Authority Profiles which permit the Data Manager to assign users to a classification and apply authorities to the entire classification. It also incorporates the concept of pre-defined process groups and templates which allow process definitions to be standardized across multiple packages. In our preferred embodiment, these definitions can be stored in flat files called Progroups or within a sample Package in the Control Repository. The Package Manager also offers a variety of report generators for information about installed Levels, Versions, data types, Automated Library Machines, process definitions, process results, authorities, fix management and release control information. Upon completion of all interactive editing, the Package Manager employs a batch commit process which converts the changes into a series of Control Repository modification instructions.

Our Data Management System also employs various utilities to aid in performance tuning and automated recovery of the Control Repository, data archiving, Control information back-up, and a mechanism to generate performance tuning reports.

Additionally the DMS employs a Library Manager to execute all data movement, check out, manipulation, check in and deletion. It also contains a Process Manager to provide Automated Library Processing and External Data Control. Also present is a Problem Fix/Part Number/Release Control Manager to associate and track problems and part numbers to data as well as coordinate releases. Finally an Aggregation Manager is included for creating and tracking arbitrary collections of data objects.

Structure and Search Manager

The present embodiment incorporates a robust concept which permits a data management structure capable of tracking a plurality of data objects governed under similar or disparate processes. The concept is based on a paradigm in which all objects can be classified by Package or its synonym Library, Type of Object (Our preferred embodiment denotes this as File Type), Version and Quality Level. This paradigm is hereafter referred to as the PFVL paradigm. (See FIG. 18—Items 1 thru 7). Under this arrangement, a Package is simply defined as a grouping of objects with common characteristics. In some environments, such as Chip Design or Software Development, a Package is referred to as a Library. Commonality may be defined in numerous ways. For example, all the components in a Library may be members of the same higher level component (such as all the ASICs on a PC Board), and thus may be considered a single Package. Another example may be all the programming modules written by a particular software development team.

Within a Package or Library, data is organized by Version. Versions allow parallel evolution of the same components to coexist in the same Library. For example, two Versions of a Video Graphics chip may be developed in tandem, one for the PCI interface and one for VL-BUS. Our embodiment allows the two flavors of design to use the same object names, reside in the same Library, and even be at the same Level, simultaneously.

For each Version, there is a Level Structure. In our preferred embodiment, Levels denote a degree of completeness, stability or quality control. The definition of "degree of quality control" is left up to the Data Manager. Our embodiment simply affords the Data Manager a means to establish a Level structure commensurate with the goals and objectives of the user community.

All data objects are identified by name and type. Our preferred embodiment depicts all objects as files, but they can be any type of object that exists in a computer environment. The type of object serves as the fourth qualifier in the PFVL paradigm. In summary, an entity characterized by a single name may have multiple types of data objects, simultaneously residing in multiple Levels, of multiple Versions and spanning multiple Libraries.

In addition to denoting degrees of completeness, our embodiment permits Levels to be chained together to allow data to migrate from one Level to the next. Any or all of these Levels can be designated as Entry Levels whereby data may enter from a user's Private Library. Levels are also categorized as Working Levels or Release Levels. Data in Working Levels is transitory, and must eventually migrate to a Release Level. Release Levels serve as permanent storage vaults for a coherent set of data. Once the data is promoted into a Release Level, that Level is frozen and a new Release Level is opened. Data always migrates from the highest Working Level into the current, or open, Release Level. Any Working Level may be promoted to from another Working Level, or serve as an Entry Level for data coming from a Private Library. Release Levels are more restrictive. The current Release Level can be promoted to, but can't be an entry point for outside data. Frozen Release Levels are neither entry points nor are they promotable. Our embodiment does provide a means to thaw a frozen Release Level and delete data from it.

Our embodiment also discloses one special type of Release Level known as a Sideways Release Level. These Levels always branch out from a regular Release Level, but unlike regular Release Levels, data is permitted to enter from a Private Library. This arrangement permits updates and "fixes" to problems found with data residing in a frozen Release Level.

The PFVL structure lends itself to a powerful feature of the embodiment known as a Library Search Engine. In many commercial Data Management Systems, the means for establishing quality Levels often require physical segregation of data into a common repository. Usually this entails making copies of the data to multiple locations. Although our preferred embodiment will permit data to be copied as it migrates from one Level to the next, the default action is for the data to move to the higher Level. The Library Search Engine can be used to pick a starting location in the Library Structure and seek out a collection of coherent data objects, regardless of their current Library location or physical residence. The Search Engine and it's underlying algorithms are discussed in the Search Manager section.

Figure 17:
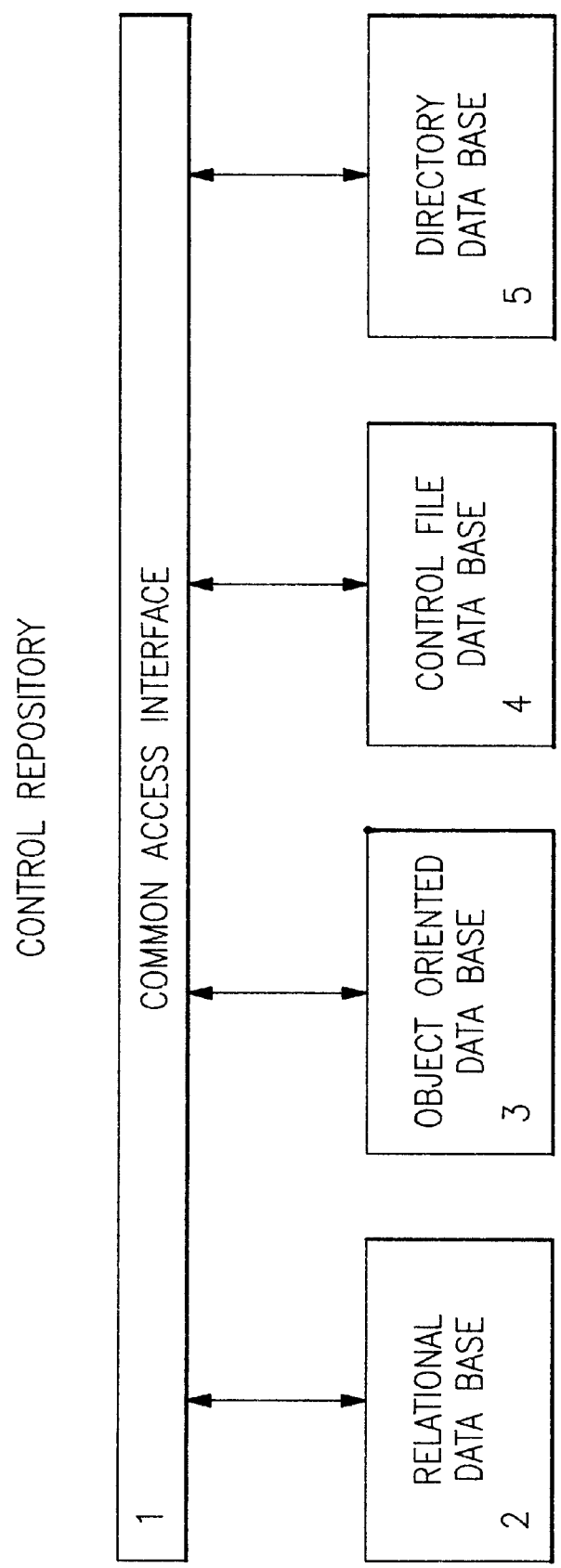
FIG. 17 illustrates the Control Repository.
Figure 18:
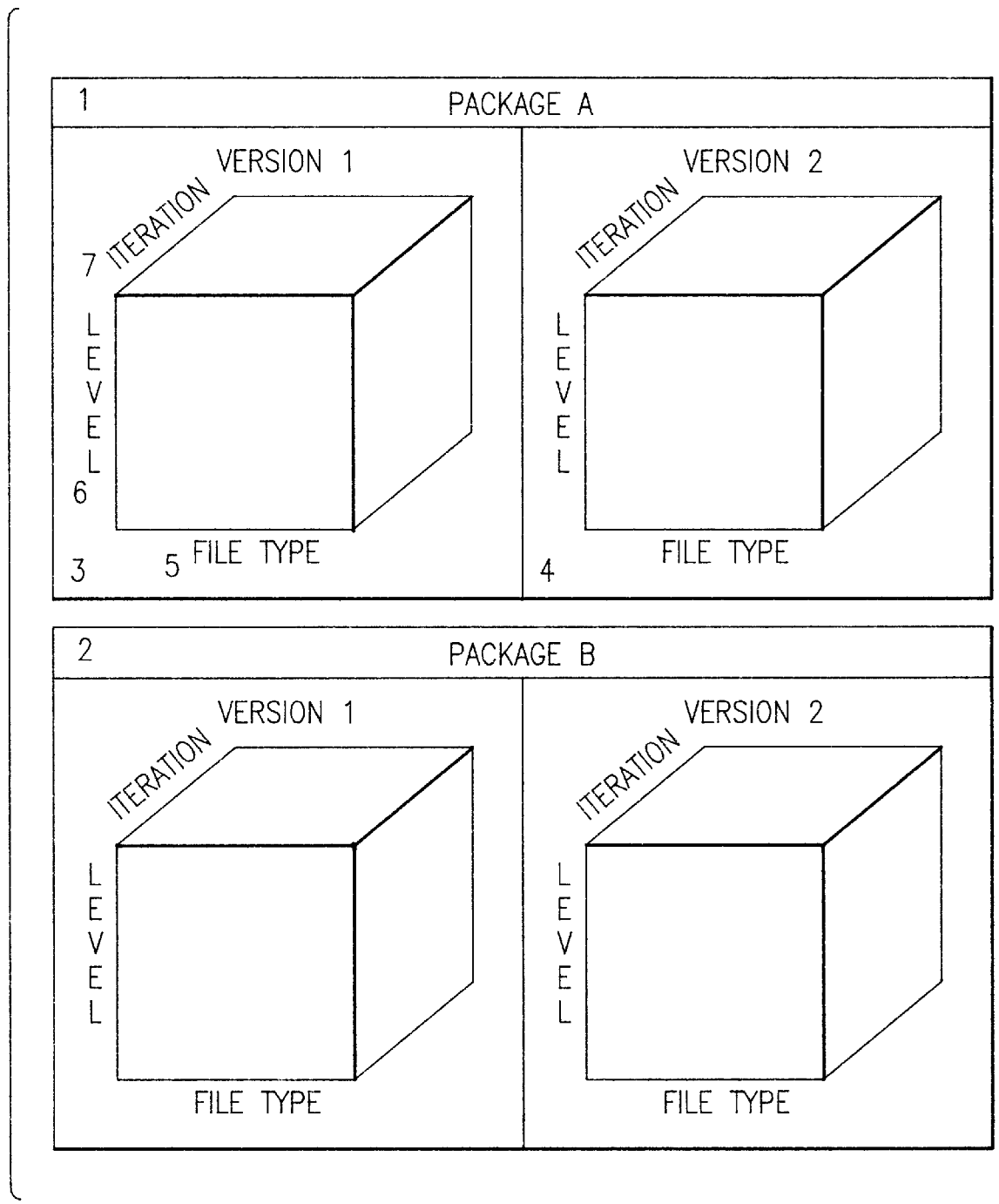
FIG. 18 illustrates the Data Repository.

Now, in considering our Control Repository illustrated by FIG. 17 and our Data Repository illustrated by FIG. 18 in implementing our system, an embodiment of a database that is used includes IBM's multimedia DB/2, or the databases of Informix which allow image and audio fields instead of plain text. With this kind of database, represented by the databases in the drawings, in the Control Repository, one could have image or audio fields. So a user could do a library search for all red sweaters that match a photograph of some hot new fashion design, at or above the P1 price level starting with the "Parisienne" version. (Hint: this scenario could be an implementation of our DMS in a large mail order clothing outlet which caters to Web shoppers.

One can use a text database such as DB/2 as the Control Repository, combined with the mutimedia DB/2, or other multimedia supporting database as a data repository. This would allow storage of the actual data, audio and images into DB/2 where the various pattern matching engines could be used, yet still allow the data to be "controlled" or managed using our techniques with the cheaper and simpler DB/2 (which really only needs simple textbased tables to work).

By using a multimedia database (e.g. DB/2 version) as the control repository, one could perform "queries" using voice commands like: "Display the Fix Management Data for Part 18F4475" or "Show me electrical checking results for all schematics at the Q1 level".

Figure 19:
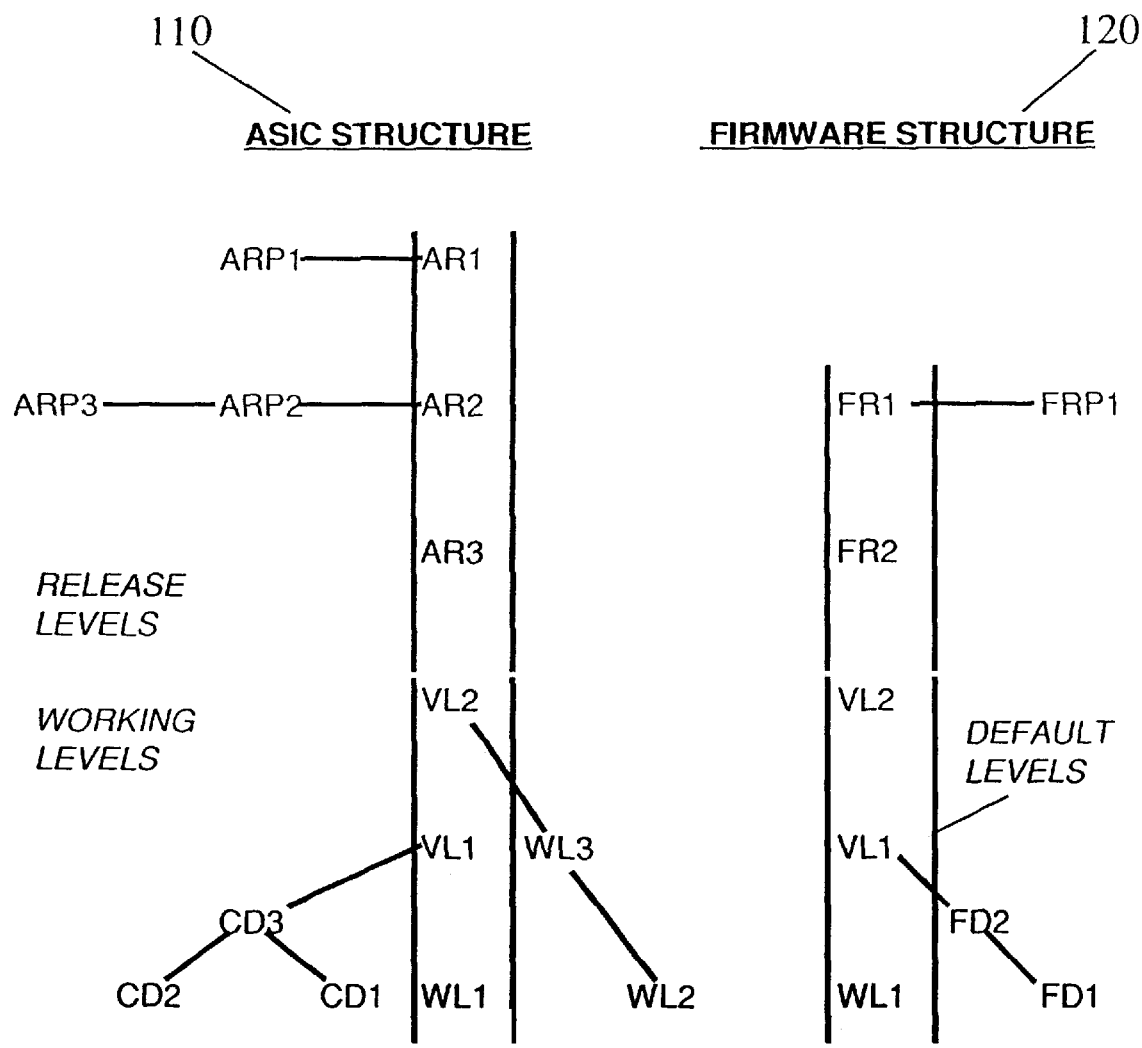
FIG. 19 illustrates the Inverted Tree Library Structure

FIG. 19 illustrates an example Library Structure. To clarify the example, the overall structure is segregated by Library File Type with inverted tree 110 denoting the ASIC structure, and inverted tree 120 denoting the Firmware structure. To begin with, both trees have Working Levels WL1, VL1 and VL2 in common. These are known as the Default Levels and these would exist for all LFTs in the Library. Turning our attention to the ASIC structure, it has additional unique Levels known as WL2, WL3, CD1, CD2 and CD3. This type of arrangement could be used to accommodate high Level design being done at the Default Levels, synthesized parts being processed on the WL2–WL3 branch, and custom design being done at the CD1, CD2 and CD3 Levels. Although our embodiment permits data to enter into any of these Levels, the Data Manager controls the Entry Levels. In this example ASIC data may enter CD1, CD2, WL1 or WL2.

The highest Working Level is VL2, and above that is the current Release Level known as AR3. Above that are frozen Release Levels AR2 and AR1. AR1 is the original release of the ASIC design, and AR3 will contain the most recent. To the left of Release Level AR1 is Sideways Release Level ARP1. Additionally, Release Level AR2 has Sideways Release Levels ARP2 and ARP3. As stated above, when data enters any of the Release Levels except AR3, it is "trapped" and can't move to another Level. However, it can be located with the Library Search Engine.

Since there are 7 entry points (CD1, CD2, WL1, WL2, ARP1, ARP2, and ARP3), there are 7 independent search paths. The user may initiate a search for data at any point in any of these 7 paths. A search initiated at a Working Level or regular Release Level will move towards the "tree trunk" and up to the oldest Release Level (AR1). The search path for CD2 would be:

CD2→CD3→VL1→VL2→AR3→AR2→AR1 (terminator)

Searches beginning at a Sideways Release Level will migrate towards the "tree trunk" then turn upward towards the oldest Release Level. A search beginning at ARP3 would look like:

ARP3→ARP2→AR2→AR1 (terminator)

Turning our attention to inverted tree structure 120, this represents the Firmware tree. In addition to the Default Working Levels, this tree has Working Levels FD1 (which is an Entry Level) and FD2. It also shows Release Levels FR2 and FR1 (which is frozen). FR1 has one Sideways Release Level known as FRP1.

Further unique structures can exist for each LFT in the Library, or an LFT can use the Default Structure. In addition, any structure may be replicated to form multiple Versions. In this way a single Library is equipped to handle a multitude of data management tasks. The only restriction on the present embodiment is that any given Level in the tree may migrate to one and only one higher Level. For example, CD3 may not point to both VL1 and VL2.

The entire structure of every Library in the DMS is stored in tables within the Control Repository. These tables show information about each Level denoting attributes such as Entry Level, Promotable Level and the physical location of the repository. In order to improve performance and availability, our preferred embodiment permits this structural information to exist in an external file for quick reference by users running applications in their Private Libraries. An example of a structure file is shown in FIG. 20.

The structure file in FIG. 20 is divided into 6 sections. Each section contains the following four tokens:

The first token contains three pieces of information delimited by a / in our preferred embodiment. The / can be used to parse the first token as follows:
1. The LFT where XXX denotes ALL LFTs in the Library.
2. The Version where XX denotes ALL Versions in the Library.
3. The Source Level where 00 is a special keyword denoting any user's Private Library.

The second token is the Target Level

The third token is a Put/Promote flag which decodes as follows:
NN Source Level not Puttable/No Promotion Path from Source to Target
NY Source Level not Puttable/Promotion Path from Source to Target
YN Source Level Puttable/No Promotion Path from Source to Target
YY Source Level Puttable/Promotion Path from Source to Target The name of the physical repository of the Target Level. This can be multiple tokens depending on the computer platform.

Making use of parts of an existing Cadence TDM system

Now having discussed PFVL as part of an AFS version, we note that among existing systems, Cadence does not have such an AFS version, but does provide DM software which can run on a Sun Microsystems Workstation. We have concluded that the current Cadence system is insufficient for our complex needs. However, Cadence has an effective underlying command line interface for the TDM function which drives all TDM functions. This command line interface can be modified so as to incorporate it into our methodology with an AFS environment.

Basically, our Data Management System needs to employ what we call the PFVL Paradigm.

Remember to optimize data storage we use a PFVL paradigm to identify all data in the DMS by Package, File Type, (Data Type), Version and Level. Packages are arbitrary divisions of data whereby all the data has some common association. The PFVL acronym was derived from IBM internal jargon, but the same principles can be applied using Cadence parlance as;

Library—Variance—Quality Level—View—Cell—Version if our PFVL structure and principles are adopted, as they should be. The PFVL structure and process provides that every piece of data in the Data Management System (DMS), regardless of origin or importance, is tracked by PFVL. In other words which our PFVL structure and principles are adopted in a Cadence system every piece of the design, whether it's a schematic, piece of VHDL, a layout, or documentation which is associated to a Library—Variance—Quality Level—View—Cell—Version has all of the data associated so that the system ensures every piece of data has the PFVL (here 6 attributes) associated with it.

Furthermore, our DM principles state that all data and control information is tracked in an architecturally centralized location consisting of a Data and Control Repository. An "architecturally centralized location" does not require that all the data must be kept in a single Unix directory, nor that all the control information must reside in a single metadata file. Nor does it imply the whole system must be governed by a single database. What is says is that the user must perceive the system in a manner by which all data appears to be tracked uniformly. So, an example might be that I have a design for an MPEG decoder. The physical design is done in Cadence so the actual layout data physically resides in a "Cadence style directory structure". However, we have FrameMaker documentation which explains and diagrams the physical design, but as FrameMaker documentation is done outside of Cadence, it is not stored originally as Cadence data. Physically this is kept in a completely different Unix directory, maybe completely isolated by system and location from any "Cadence data". Using our system, however, wherever the documenation is located, the DMS still tracks both data objects by Library—Variance—Quality Level—View—Cell—Version which enables the user to do things like find/view all the data associated with the MPEG even if multiple pieces of data are in physically disparate locations. The reason this works is that the system ensures every piece of data has these 6 attributes associated with it. The control repository can also be distributed as long as each component follows the structure and process of the architecture. For example, the Cadence data to most quickly integrate our structure and process of our architecture into a Cadence system, one would use a routine for tracking the data by TDM using TDM's control files to act as the Control Repository for the physical design of the MPEG decoder. Likewise, all FrameMaker documentation might be tracked by a Lotus Notes Database so that it can be made available to both designers and external folks simultaneously. As long as the TDM Control Files and the Lotus Notes Database adhere to the PFVL architecture, the user is hidden from the inner workings. All he knows is that he runs some front-end script or GUI menu where he can ask to find all the MPEG decoder information under a given cell name at a particular Quality Level of a particular Variance in a certain Library. The DMS looks through the various physical Control Repositories, finds the layout and FrameMaker views, finds their exact Version numbers and locates them in the proper physical data repository.

Our PFVL structure and process architecture should be used in combinatioS, with many other useful Data Management features which we have developed and explained. We feel the following features should tie universally implemented in combination with our PFVL structure:

Using the PFVL architecture to set up a single logical Data Management system for design data (Cadence and non-Cadence). Various parts of the design are tracked in separate shared libraries. Each library would consist of N Quality Levels and M Variances (N and M are determined by each Data Manager based on the type of information stored in that library).

A dynamic Bill of Materials Tracker would exist to allow PD, Timing and Simulation Coordinators (Integrators) to easily identify all the desired pieces of a design at a particular Library, Level and Variance to be built into a "model". Once integrated into the model, the BOM Tracker would monitor the actual versions of the data objects and alert the Integrator if any versions become obsolete. The BOM Tracker can also be used to perform promotions of cohesive units of data between levels.

Automated Library Processing whereby tools, checks, and automated tasks can be launched either during movement of data between levels or while data is stable within a level. Results would be associated to the exact data objects used in the process (via the PFVL architecture) and retained in the Control Repository. These results can serve as promotion criteria to ensure data is promoted only when it has achieved the desired level of quality. The Data Manager would be able to "program" his library to run any available Library Processes either in a particular sequence or in parallel.

External Data Control whereby results obtained from tools run outside of the DMS can be securely incorporated into the DMS with the same data integrity as an Automated Library Process initiated from within the DMS.

A Locking mechanism which not only performs simple Check-Out, Check-in to assert ownership, but allows ownership by PFVL. So, two different designers could check out different versions of the MPEG decoder at different Quality Levels. An example might be that the primary designer has the decoder checked out at the lowest library level, but the PD Integrator finds a minor electrical problem at the highest level which is causing a DRC check to fail. He simply has to insert a buffer so he goes ahead and checks out that level of the design, makes the change and checks it back in. He can continue with the DRC run while he informs the primary designer of the required change for the lower levels. This locking mechanism would also permit surrogate ownership of the same piece or design, such that two people would work on the same piece together. The system automatically ensures only one has it checked out at a time, but allows the other to "take ownership" if he needs to. Automatic notification and complete history tracking reduce the risk of miscommunication among the partners. In addition the locking mechanism would also support other types of locks such as Move and Overlay whereby coherent sets of data could be temporarily frozen into a Quality Level to prevent accidental movement or obsolescence while a lengthy model build is underway.

Problem Fix Management and Engineering Change Tracking would provide various utilities to ensure that fixes to problems are contained within the proper EC. In addition certain information about the fix would be tracked in the Control Repository to enable various types of escape analysis, status reporting, etc. Mechanisms would exist to prevent or minimize the risk of the same piece of design being associated with multiple ECs or a piece of design being attached to the wrong EC.

There are many other features of our preferred embodiments which we could employ, but we need to implement these concepts and we have working algorithms which we have provided in these applications which are suitable for use with TDM and some of TDM's existing features, like policies, can be employed as part of a foundation for our system. However all our algorithms expect the Control and Data Repositories to follow the PFVL architecture. Hence implementation needs to ensure use of things like hierarchial projects to properly emulate Quality Levels. We also need to ensure that Variances can be supported with the current TDM architecture. In order to use the systems together, at some point a conversion needs to provide the following mapping:

| | Library | - | Variance | - | Quality Level | - | View | - | CellName | - | Version | (Cadence) |
|---|---|---|---|---|---|---|---|---|---|---|---|---|
| to | /\ | | /\ | | /\ | | /\ | | /\ | | /\ | |
| | \/ | | \/ | | \/ | | \/ | | \/ | | \/ | |
| | Package | - | Version | - | Quality Level | - | Type | - | FileName | - | Iteration | (IBM DMS) |

In other words we need to be able to use the TDM API to make queries about data using the above mapping, between PFVL attributes, regardless of name or origin, as the data may originate in IBM DMS, Cadence, ViewLogic (see below) or elsewhere.

Both private and public libraries need to be provided. With respect to private libraries Cadence employs Working Areas (a limited kind of Private Library) in which a user can define one or more private libraries, each of which can reside in any physical AFS location desired by the user. All authorities are are done through AFS, so the user controls who can access or update their private areas. There is a GUI which makes it easy for a user to set up a Working Area and create private libraries. TDM includes a special Integration Area (a limited kind of Public Library) which is designed specifically for people performing coordination or verification tasks. These areas are similar to the regular working areas in terms of how they are defined, but these have additional functionality which is further discussed with regard to our Library Manager. Private libraries are a function of our own library management system. With regard to public libraries, Cadence's TDM uses a Project Management tool to assist the Data Manager in various DM tasks such as defining and maintaining public libraries. The DM may set up an unlimited number of Release Areas, but the system is limited and only permits one Integration Area per public library. Furthermore, the DM also has no control over the initial physical location of the data (in the Integration Area or Release Areas), and the system automatically imposes a single directory tree structure for the public library. We note that within AIX is a function called "permissions", and when TDM could be run in an AIX environment, when data must be relocated to another physical repository, there is a TDM command to perform the function. In such an environment, since all authorizations would be done via an AIX permission, the DM would have complete control over file access, write authority, and data removal.

There are several significant problems with this TDM system area of public and private libraries. The current TDM system fails to differentiate between a Working Area, an Engineering Area, a Level Area and a Release Area. In complex development projects, these are different and each of these area must be differentiated by any concurrent engineering staff. TDM makes it impossible for the DM to define any type of library structure with multiples levels and/or versions. One could try to change the use of a Release Area to mimic an engineering level, but the required amount of daily iteration combined with the required degree of parallelism makes this impractical in a commercial environment. Integration Areas may be considered as having adequate characteristics to serve as a model for engineering levels, and data can be continually promoted into the Integration Area until such time that the Integrator feels it should be released. However, TDM is restricted to a single Integration Area per public library. This may be compared to our own public library methodology which permits multiple Integration Areas per public library. Without this function, along with others which we may note, which needs to be implemented in the system as we have described it, TDM would not satisfy necessary requirements of a complex system.

A complex system requires the ability to define data types and perform nongraphical DM tasks. We note TDM offers a powerful selection of data management commands which enable a Data Manager to do virtually an entire job from outside of the Cadence TDM system. TDM's command line API interface allows, for instance, any existing BOM application to run entirely in a system command line environment. This allows for integration with nongraphical tools of third parties. This also provides the basis for data managers to write unlimited utilities (via C programs, shell scripts, perl scripts, etc.) to automate or enhance their productivity. But we note that Data Types must be selected from a list of master cell views administered on a project wide basis. It is not evident that users can create a unique new Data Type themselves, even though they can create new data and select from existing Data Types (cell views). Apparently, also, non-Cadence data can't be tracked by an existing Library Browser. Library processing, particularly private library task launching is an aspect of our own development. In this regard, Cadence offers the concept of Policies to permit task launching against any data object in the DMS. With proper arguments, we believe that any executable code could be run from a policy. This would permit a user to call a system function, third party tool, shell script, perl script, C program, etc. from within a policy. For conversion of an existing piece of code to a policy, an appropriate API code would be required.

TDM has commands which can be invoked from a command line, within a script, program, or policy. This flexibility in the policy architecture of the tools when coupled with the set of TDM data management commands, does present the opportunity to combine our own developments with this aspect of TDM. While TDM invokes a policy from a TDM session, it is possible to launch a policy from an AIX window. To incorporate our developments, there would need to be tight integration of policy launching from a Library Browser like that we have in our library management function discussed below (although we note that Cadence provides a library browser without our functionality).

We note that policies can be chained together such that a policy sequence can be run. However, the sequence in TDM is not determined by the Data Manager or user, but rather by sorting the policies in alphabetical order by name, then using that as the order of execution. Policies can be configured to launch during other DM operations, such as Check Out or Check In, or they can run stand-alone.

Public library task launching is required. In this regard, TDM provides that all policy functions are available to a Working Area (b, Private Library) and also available to data in an Integration Area or Release Area (Public Library). The existence of a fully functional command line interface in TDM allows the Data Manager or Integrators to perform a variety of tasks, without invoking a separate Cadance tool call Framework.

Cadence also has a separate tool product PCS which allows one to graphically diagram a process flow. The user simply clicks on the various process boxes, and the tool then executes underlying policies. This provides a nice graphical interface to assist designers who prefer working with GUIs.

Basic design tasks and library promotion is handled by our development's library management system and Library Browser. In this regard, TDM uses a Working Area -to→Integration Area -to→Release Area paradigm as their basic design control flow. By mapping between their model and our model of designer library -to→working library levels -to→release levels, there is a close correspondence. The Cadence submission facility corresponds to a promotion utility for moving data from a Working Area to the Integration Area, and from the Integration Area to the Release Area. The TDM front end allows one to perform Check Out, Check In, Promotion, Switching work areas, and viewing Integration areas. However, the user interface for the Working area is inadequate, and does not serve as a Library Browser replacement.

The latest 4.4 Version of TDM is not capable of checking data out of public libraries, checking in, promoting to integration and release areas, displaying and browsing data in integration and release areas and easily switching between multiple working areas. In the Cadence framework, all designer functions need to be executed from the library browser, and the subset of data management commands used on a daily basis should be supplied, as this is an absolute requirement for our complex design systems environment.

The Cadence system does not, as does our development, supply multiple "integration areas" and our complex design systems environment does require multiple working library levels. Apparently, standard opinion is that one could use a shared integration area in order to keep a complex part, e.g. an E-Unit in the same library. What has not been appreciated with an Element and System Sim sharing the same integration area, is that there is invariably a phase shift in build frequency. This makes the assumption of this prior work impractical, for they should not and do not always co-exist. Thus there is a need for our multiple integration areas and these need to be properly addressed to successfully implement a complex design control system.

Furthermore, our library management system, as we discuss, provides for extracting data from a public library. In our methodology both the integrators/coordinators/model builders and the designers need simple access methods to data in release areas.

The prior art has treated releases as a static configuration. Thus, the Cadence TDM concept of a Release is a complete set of pointers to each component of an entire design, something akin to a Bill of materials, a static configuration. Release Areas always contain pointers to every piece of design. This makes model builds in the single Integration Area very straight forward since the integrator need only point to a Release as a starting point, then incrementally add in designer's updates and fixes. To do this the integrator must use a separate tool suite, which is awkward. But, as we have discovered, the designer(s) needs to access released data. The absence of such function would be catastrophic in a complex system design environment. With the current Cadence product, the designer is forced to use the TDM front-end to perform basic data management functions such as switching/viewing work areas, checking data in, checking data out, promoting data, and accessing integration and release areas (public libraries). In fact, in the Cadence system, it is easy for a user to accidentally point to and edit a design's control data, instead of the design itself. The risk of designer error thus is unacceptable.

This is solved by our development by providing a way to sort data by cell name, or cell view, with a tree structure display, categories, etc. A user has, and should have, no access to control and meta data. Use of a prior art system which could require a designer to ping-pong between an unsatisfactory library browser and a rudimentary front-end is risky and unacceptable.

Nevertheless, in fairness, we would say that we could run typical design DM tasks non-graphically with the set of TDM commands coupled with a command line interface to permit any of the basic design functions (Check out, check in, promote, view work areas, view release areas) with the capabilities of an operating system like AIX. From an AIX command line, using script, or any type of executable program, this part of DM can be performed in such an environment.

Our system provides a way for sharing/transferring data ownership. In this system, file locking mechanisms are present. Cadence's TDM offers two methods for locking files during checkouts. The first is an exclusive lock (the default) where check out of any version of a design component renders all other versions of the same component unavailable for editing. There is a problem with this solution, in that it not only prevents a second designer from updating someone's components, it also prevents the original owner from working on two versions of the component simultaneously. For example, if a bug is found in the Element and System sim models, and they contain two different versions of a component, the designer must check out, fix, and check in each version sequentially.

Cadence also has a method using non-exclusive locks, whereby two different users may check out different versions of a design simultaneously. Again there is a problem with this solution. Since the system won't allow the same user to hold two non-exclusive locks on the same piece of data, in the aforementioned example of an Element and System sim design bug, sequential fixes are still required (unless the original designer gets a second user to fix one version of the design while he fixed the other, sometimes a problem when the original designer is in the USA and the second designer is in Japan or Germany, France, England, Canada or one or more of many other countries, to indicate a real possibility). Furthermore, there is a possibility that a second user can grab and modify a different version of the design without the original owner ever knowing about it. The result is a system which has no utility for transferring ownership, as we have provided, making it difficult to operate on different versions of the design in parallel as required for concurrent engineering. Furthermore, depending on the type of locking employed, with TDM it may not be possible for another designer to act as a surrogate for the original designer in an emergency situation (i.e. Where the original designer has the file checked out and has to unexpectedly take a leave of absence). The TDM system does not permit the DM to override or reset a designer's check out locks.

Our system, we will note here, has a locking mechanism which enables transfer of ownership permanently or temporarily, and allows for an override or rest of the check out locks, and provides notification to the original designer or administrator in the event of check out.

A system requirement in this kind of system is a Bill of Materials (BOM) mechanism which should have a satisfactory way to create BOMs, as we have provided. The Cadence Checkpoint Manger provides a nice mechanism to create Checkpoints (BQMs). Checkpoints are manageable data objects, which means that they can be checked in, checked out, promoted and tasks can be run against their members, the Cadence system permits Checkpoints to contain other Checkpoints as members, thus allowing hierarchical creation. All Checkpoint information is stored in an ASC file, which, coupled by the TDM command line API interface, permits the TDM to interact with third party tools.

Our preferred embodiment, it will be noted permits locking a Bill of Materials. In this regard, we note the TDM makes it possible to save all versions of a design component and use pointers to denote which version is associated to the Integration Area or a Release Area. However, it appears possible to delete a version, and no mechanism exists for the Coordinator to "lock down" the versions of his model to prevent this. No mechanism appears to exist to prevent newer versions from entering the Level at which the Coordinator is working, therefore he can't always be assured of working with the most recent data. However, with knowledge of the way we provide for locking a Bill of Materials, one could modify the Cadence TDM paradigm to accommodate lock down. A coordinator would first build some type of model, and create a Checkpoint to track the contents of the mode,. After the model is working properly, it could on a later day be declared a success. During the time the Coordinator first ensures none of the member; of the model disappear (are deleted or overlayed) and ensures that they can't be accidentally promoted to another level. Secondly, the Coordinator would be enabled to know if, on the later day, if any of the members of the model have become back-level. This may be achieved by a Cadence "policy" solution, where a policy code is written to set a "freeze" flag against each member of a checkpoint. This would be satisfactory.

One of the features present in Cadence's Checkpoint Manager is that the BOM can be static (which means the contents are a snapshot version numbers) or dynamic (which means the contents change to always include the most recent version of a component). Adding or deleting members of an existing BOM is relatively easy. We also update members of a BOM in accordance with our preferred embodiment.

It will be noted that we have addressed the issue of gathering BOM status or real-time BOM invalidation, something not possible with such tools as provided by Cadence. Furthermore, we can use the BOM as a handle to promote the updates into an Integration or Release area from the Working Area. In addition, we provide "real-time" notification if members are deleted or modified. This capitalized on the ease in updating and deleting members in the BOM.

It will be noted that we provide utilities for examining BOM operations. In the Cadence system, the owner can delete the Checkpoint without affecting the data objects, but there is no convenient method for viewing the status of a BOM or its members.

We have provided a convenient set of utilities for use an examining BOM operations. We provide a method for viewing the status of a BOM or its members. With our provisions, in a TDM system, not only could an owner delete the Checkpoint without affecting the data object, but task launching could be built in for BOM members. To launch tasks in a cadence system, a Policy could be written to loop though the members of the BOM and either launch tasks against them or determine their current version is most recent. Our method for BOM movement through a library is a substantial advance. Cadence's TDM has no BOM promotion mechanism.

We have described how we provide for BOM movement through a Library. Our ideas could be implemented in a Cadence like system, when our ideas for multiple integration levels are incorporated, by using the underlying Cadence Checkpoint mechanism to move BOMs through the Library levels.

We have provided for program fix management, another substantial advance. TDM has no built-in fix management function.

Cadence policies can be used to achieve our problem fix management functions. The mechanisms which we use to implement the tasks should be used.

Our release manager enables making design changes for subsequent releases. The TDM model of moving Integration -to→Release area supports initial releases and sequential ECs well. Subsequent releases are constructed using any current release as a base and the sole Integrator has complete control over the Integration -to→Release Area path. The Data Manager can define any number of release areas, control access, and has complete freedom of nomenclature.

Cadence's TDM lacks any inherent concept of multiple level structures within a given project. Although Integration Areas can serve as a single level, it does not permit the establishment of seperate engineering and release levels with the ability to physically segregate the data accordingly. Also, in this connection, we note that the Data Manager can't define any physical location of released data, and TDM automatically assigns new Release Areas to a directory hanging off of a top-level directory for the entire Library. Data can be displaced by a relocate function. Everything for project management is sequential. With the Cadence system, multiple versions cannot satisfy the parallel developments required for concurrent engineering.

As we would note, our release manager allows the creation of multiple "Integration Areas" making it possible to run multiple ECs or Design versions in parallel. We can define the physical location of released data. This is important in large volume design components which require extensive ECs.

With our release manager, ECing a released component is handled. This task resolves around a designer accessing a released piece of design, modifying it, and then releasing it under a new EC. With TDM a designer via the user interface can open a Release Area and check out a piece of data into any Working Area. This allows a designer some flexibility in setting up multiple Working Areas or private libraries for different ECs. However, the users are subjected to the failings of the TDM user interface. Most frequent DM problems occur when a designer mistakenly sends a component into the wrong EC stream. While with TDM, where only one EC is processed at a time, one could minimize this problem by having a single Integration area for a Public Library, but this requires the Integrator to ensure that he selects the appropriate target Release Area and handle the Integration Area -to→Release Area promotion himself. Mixing components into the wrong EC stream is possible and risky.

With regard to ECing a released component, multiple Integration Areas could be provided and coupled to manage data from multiple ECs. It is possible to iterate and verify parts with Multiple Integration areas. However, one still has to properly implement the DMS to avoid having a part from different ECs mixing together, so our Design Control System if building models needs to be implemented.

In our Design Control System we allow building models from released data, This tasks requires Integrators to be able to easily access all components relating to a Release, and perform tasks such as netlisting a release. TDM has a single Integration area, and the Release is a pointer to a complete set of design components, but there is no library browser support since some model build task may require launching tools from within the framework. TDM has no support for multiple Integration areas, making it impossible to perform multiple model builds in parallel. We discuss how to fix design problems in multiple releases within our system. It is not possible with TDM to make simultaneous fixes. A user is unable to Check out multiple versions of the same piece of design, even though the Release area structure does permit a Data Manager to establish area for "patches" to Released data (i.e. design patches for the test floor.

With the Design Control System it is possible to conduct an ISO approved verification audit, Cadence has no way of conducting an ISO approved verification audit as a task, so adoption of our our process management function and our release manager methods needs to be employed.

An ISO approved verification audit requires a ISO Quality Record. This task requires a DMS capable of storing results from tasks along with the proper pedigree information for the files used to run the tasks. It can then be enhanced to produce output in a comparable format to the ISO Quality Record In this connection we use our process management function and our release manager.

Making use of parts of an existing ViewLogic system

As we will discuss various changes which need to be adopted for existing software in order to make use of part of that software in our new environment, we note that View-Logic provides software tools for Unix type workstations, such as the preferred AIX version which is capable of running in an AFS environment. Again, we believe that the current ViewLogic software, which is now insufficient for our complex needs, needs to be changed.

ViewLogic's View Data is based on ASC files which can be edited and viewed and easily maintained. Nevertheless, our PFVL structure and principles need to be adopted, whether aspects are called Package—Version—Quality Level—Type—FileName—Iteration (IBM DMS) or Library—Variance—Quality Level—View—Cell—Version or some other name, version, level, type, filename, iteration structure if our PFVL structure and principles are adopted, as they should be. The PFVL structure and process provides that every piece of data in the Data Management System (DMS), regardless of origin or importance, is tracked by PFVL. In other words which our PFVL structure and principles are adopted in a Cadence system every piece of the design, whether it's a schematic, piece of VHDL, a layout, or documentation which is associated to a Package—Version—Quality Level—Type—FileName—Iteration (IBM DMS) or Library—Variance—Quality Level—View—Cell—Version or some other name, version, level, type, filename, iteration structure has all of the data associated so that the system ensures every piece of data has these 6 attributes associated with it.

Here we would recommend ViewLogic adopt our DMS including (a) our DM principles state that all data and control information is tracked in an architecturally centralized location consisting of a Data and Control Repository;

(b) using the PFVL architecture to set up a single logical Data Management system for design data (ViewLogic and non-ViewLogic);

(c) providing a dynamic Bill of Materials Tracker to allow PD, Timing and Simulation Coordinators (Integrators) to easily identify all the desired pieces of a design at a particular Library, Level and Variance to be built into a "model", etc.;

(d) providing Automated Library Processing whereby tools, checks, automated tasks can be launched either during movement of data between levels or while data is stable within a level and where results would be associated to the exact data objects used in the process (via the PFVL architecture) and retained in the Control Repository;

(e) providing External Data Control whereby results obtained from tools run outside of the DMS can be securely incorporated into the DMS with the same data integrity as an Automated Library Process initiated from within the DMS;

(f) providing a Locking mechanism which not only performs simple Check-Out, Check-in to assert ownership, but allows ownership by PFVL, so, two different designers could check out different versions of the piece of a design element at different Quality Levels; and (g) providing Problem Fix Management and Engineering Change Tracking which would provide various utilities to ensure that fixes to problems are contained within the proper EC.

Now, when one reviews the ViewLogic product, we can with our own perspective, interpret the ViewLogic Working Areas as able to serve as a limited kind of Private Libraries. Users must first be assigned to the "Team" by the Data Manager. Once they exist on a Team, they may create as many Working Areas as they desire, and they can locate them anywhere in the directory structure of an AFS system. AIX permissions serve as the only means of authorization, so the user has complete control over who has access to their data. The Working Area is always driven by the existence or absence of the physical files. This means data can always be created or deleted from outside of ViewLogic's ViewData, and the Working area is guaranteed to provide an accurate image.

Unfortunately, while it is easy for a user to create multiple Working Areas, the ViewData DMS has an awkward user interface for managing multiple areas. For example, the user can't display all the files in multiple areas at the same time. They must switch between Working Areas via a Set Environment function, which does not provide adequate visual cues to assist the user in knowing where they are currently pointing to. This makes it difficult to use and adjust to.

The ViewLogic's ViewData uses a Team paragigm to perform shared data management. This is somewhat analogous to a Public Library. Each Team may have any number of Release Areas, and members of a Team. Each member may have unlimited Working Areas. The DM can create Release Areas, specify the physical location of the data, and rename or delete the Release Area at any time. While ViewData can be flexible in creating Release Areas, the architecture does not differentiate between levels. A DM can't define the type of structure required for concurrent engineering with multiple levels. Promoting data between Release Areas is not adequately addressed. Furthermore, the architecture requires the user to only permit the user to look at data in one Working Area and one Release Area at a time. There is no way to look at data in all Release Areas simultaneously. All data is stored in a Vault during a Check-In operation. Since data can be checked in while residing in a Working Area, or during a desired promote to a Release Area, the Library View imposes the restriction that a user must use the Set Environment function to point to a Working Area and one Release Area. The view refreshes to show a union of all the data in those two repositories. If the user then wants to see data in a different Release Are, they must again use the Set Environment. Since there is no way for the user to look at all Release Areas simultaneously, even the simplest DM maintenance and debug tasks (which are easy in our system) in ViewData are a virtual nightmare. Furthermore, the concept of unionizing data between a Working Area and a single Release Area causes problems which is solved by our system.

ViewData could be modified through the use of an RCS version Segregation to create "virtual" levels and Versions according to our teaching. This would be very similar to how we use static configurations today as virtual Levels.

ViewLogic's Data Management functions can be performed from within their GUI or by updating ASC files which hold all the Library Configuration information. The ViewData DMS allows one to work with data imported from outside the ViewLogic environment. We have copied a Cadence symbol from one of our designs into a ViewLogic subdirectory serving as a Working Area. By simply refreshing the Library View, our Cadence symbol appeared as a new data object with a visual cue indicating it is in an unmanaged state. Thus we have shown that the existing ViewData tools allow the end users to have the power to define new data types by simply creating them or copying them into their Working Areas. This can be done via the GUI and by selecting the Data Type from a list of Data Types defined by the Data Manager for the Team.

With regard to our private library task launching part of our preferred embodiment, we note that we could use ViewLogic scripting language known as ViewScript to provide for any command line activity to be launched from the Libary Viewer. A built-in API permits tasks to be chained together, and ViewScripts can be written to test the results of one task before proceeding with the next task. All task launching is controlled by a single ASC file which may reside in a centralized location for a project, or each user may have their own. Within this file, the user may use the API to launch a task such as MTI Compile a stand-alone view script which may be simple or compiles, and imbed actual ViewScript code to do more complex things such as chaining tasks together with dependency. Once the file is saved, the new task appears in a task menu within the Library Viewer. It is simple enough that users of ordinary programming skill can launch bottom line commands in accordance with our modification.

With regard to our public library task launching we would note that all the task functions available to a private library should also be available to a public library. However, our experience is that ViewLogic does not provide any such function, although, theoretically they must know how to enable this function. However, ViewLogic has no distinct command line interface, and therefore the graphical View-Data product must be invoked momentarily even if the intent of the user is to launch a task which can be run non-graphically, such as a CLSI compile.

With regard to our Design Control System's basic design tasks and library promotion ViewLogic's View Data is not suitable for concurrent engineering in which: designers only perform a limited amount of verification before sending data to a public or shared library;

designers frequently need to work with back-level data;

people performing verification frequently require shared access to all parts of a design;

designers may have to work on multiple versions of the design in parallel;

designers may "own" many design components;

designers may share pieces of the same design (i.1. A logic designer writes VHDL, and a circuit designer creates layout), and designers may belong to multiple "Teams". Within View-Data's design environment a user tends to work on an isolated piece of design, belonging to a single Team. In this paradigm the user tends to reside in the same Work Area and iterates within their private library until the design is stable enough to be "released" into the public library. This paradigm assumes an orderly sequential design flow where the user is only interested in working within the latest version of design, and rarely needs to access back-level data. The designer is assumed able to perform all the necessary task with little need for data sharing. Within this limited structure, the ViewData system provides the necessary tools to edit, update, verify and release the design.

However, when faced with a concurrent engineering approach, many of the needed characteristics simply don't exist in the ViewData product. For example, once a designer performs a Set Environment to point to the proper Working Area, its possible to browse and edit any data residing in that Working Area; however, if a designer needs to work with data in a different Working Area, he must switch the environment. This makes it impossible to see all of a designer's data simultaneously.

The ViewData system requires the designer to Check Out a piece of data in order to edit it. This is the correct implementation, however, the system further employs the restriction that data must be checked out (owned) by the designer to simply browse the data. This is true whether the design is an isolated text file (like VHDL), or has hierarchical dependencies (schematics). Basically the user must check out all components of a schematic in order to properly browse the schematic. This makes it difficult and impossible to share pieces of design or employ scenarios where multiple people anywhere need to debug a problem.

ViewData's library browser uses a pair of icons to represent the state of a data object. The icons clearly indicate whether the current version of an object is managed or unmanaged, and whether it's up to date or obsolete. The system has built in safeguards to prevent a back level piece of data from accidentally being promoted. However, in our concurrent engineering approach, we solve the need to promote back-level data at required times, so the lack of this capability in ViewData's design is a detriment of this prior attempt.

ViewLogic's Work Area approach imposes constraints on design which are unacceptable from a concurrent engineering point of view. Data is automatically sorted by class (Data TYPE) as opposed to design component names. There is no way to re-sort the data. As a preferred concurrent engineering approach useable under our design control system can and should be based on working with all types of a given component, use of a ViewLogic system to implement this approach would become cumbersome for designers owning many pieces. The visual clues provided by the ViewLogic system for indicating which Work Area a user is currently pointing to are insufficient. If a user has multiple Work Areas, it's too easy to begin working in the wrong area and not realize it. Furthermore, the Set Environment can switch back to a default setting without the user knowing a switch occurred. This creates numerous problems if the user is in the midst of editing a check out piece of data, and then checks it into a wrong Work Area by accident. An when the designer is unaware, a concurrent user cannot be aware, and so could later check out the piece of data placed in a wrong Work Area by accident, and further compound the problem.

Our concept of promoting data from a Private to a Public Libary in the ViewLogic environment has similar problems. For example, the user must be pointing to a proper Work Area/Release Area union (using the Set Environment function) BEFORE initiating a "promote". The act of promoting a file in ViewData is called a Check In and Release, which consists of simply clicking on a menu pick. Since there is no user interaction, failure to set the proper Work Area/Release Are union results in a promote where data is either taken from the wrong source, deposited in the wrong repository, or both. The user may never know this occurred. There is no means to perform an automated hierarchical promote where the user points to a top level schematic, and the DM system automatically traverses the design to gather all the instantiated components.

Another major issue making ViewData an unacceptable substitute to our Design Control System is the absence of a method for promoting data between Library Levels (Release Areas). The ViewLogic DM system does not support this concept in a suitable manner for integrated design control. In ViewData, promotion of all data from Level A to Level B requires a user to check out all the data into a Working Area, switch environment to a new Level, and perform the Check In and Release function. In addition to being cumbersome this is not possible under certain situations. Since check out implies acquiring ownership, this means the Data Manager must be able to get ownership of all the data at Level A. If a designer in a concurrent engineering environment is in the middle of an update, this is not possible with ViewData.

ViewLogic needs to have the ability to sort the Library Viewer by design component, something now absent in the ViewLogic system, yet one which we have provided.

We provide for extracting data from a Public Library; however, the ViewLogic DMS has no adequate substitute function. In the best case, with ViewLogic, the user must perform a Set Environment function and establish a proper Work Area/Release Area union before any data can be extracted from a Public Library. Thus a user needs to have knowledge of which Work Area was used as a source of promotion into the Release Area, something not assumable in an integrated concurrent engineering environment. As a single data object promotes though multiple Release Areas, it gets more difficult to understand the association. The Library View can display all existing versions of an object, but nothing in the system indicates which version is currently residing in which Release Area. Furthermore, the only type of sorting is by Data Type, so all levels of a schematic are mixed together. In short, the only means a user has of extracting data from a Level, is to perform the Set Environment, Click on Check Out and hope for the best. In many instances, this may work properly, but when data exists in multiple Levels, this means possible severe data integrity risks.

Our integrated design control system for concurrent engineering allows a user to work with back level data (e.g. for fast-pathing sim fixes). When one understands this and can compare it with the ViewLogic system, it will be appreciated that that system has major limitations. For example, if a Version 1.5 is checked into a Level 1, and a Version 1.6 is checked into Level 2, any attempt to then work with Version 1.5 results in difficulty. The system default is to encourage a user to work with 1.6 because it assumes the user is mistakenly grabbing an obsolete version.

Any improvement of the ViewLogic system in connection with extracting data from a Public Library would need to addresss permanent storage. ViewData has no method to delete unwanted versions from permanent storage. Thus, in the event a user makes a mistake and promotes data to a wrong Level, there is virtually no way to clean it up properly. Also, as the project matures, and numerous versions materialize, the Data Managers request some way to delete the old unwanted data to reclaim space and clean up libraries. This is a problem with ViewData that needs to be addressed to adopt our preferred process.

We provide for sharing/transferring of data ownership. Within the ViewLogic system the only means for formal transfer of ownership is the act of one user checking a file in, followed by a second user checking it out. This system thus is not adequate for concurrent engineering because it relies on personal communication and coordination. Furthermore, suppose, as happens, two users have different versions of the same design component checked out for edit simultaneously. Because one was not aware of the other, until it comes time for one user to promote his modification into a Public Library, a problem will arise. However, even when the user has promoted his modification into a Public Library, that user does know that someone has another version check out, but is unable to find out which other version and who has it locked out. This is not a trivial problem, because in a concurrent engineering environment different users constantly need to update the same piece of design at differnt levels without any knowledge of another's actions. The result is a loss of data integrity.

We provide a built-in utility to transfer ownership, notify one user tha another requests ownership, and provide a facility to monitor who has various versions of a design checked out at any point of time. Our solution provides a foreman mechanism allowing multiple versions of a data object to be updated simultaneously, with multiple ownerships and notification being handled as appropriate for the task.

We note that running ViewLogic DM functions or tasks can be performed nongraphically in a way accommodating our own design control system, making changes to follow our preferred embodiments possible.

Regarding a comparison of the viewLogic system, with the manner we employ for creating a bill of materials. ViewLogic DMS offers the concept of a Collection and a Checkpoint. The difference is that a Checkpoint is a static snapshot of a coherent aggregate of data objects identified by their exact version numbers, analogous to our Bill of Materials. A ViewLogic Collection is a grouping of data objects where each oject in the group is always the latest version. The purpose of a Collection is to act as a "handle" by which the user can perform tasks on the entire group with a single invocation. This concept is similar to our File Groups.

The ViewLogic primary utility for creating and modifying either type of aggregate is the Collection Editor. This tool is easy to use, and enables one to easily create Collections and Checkpoints as well as add and delete members. This includes creating hierarchical Collections and Checkpoints. Despite this advanced function in the ViewLogic system, it poses problems in trying to achieve BOM tracking in an environment like ours. The ViewLogic system requires the user to check out or "own" all members they wish to include in the Collection or Checkpoint. Consider the ease where an Element Simulator wants to build a BOM containing all members in a sim model. The Checkpoint would appear, upon a first impression, to be a solution, however, the Element Simulator must first check out all the versions of data in the model. This immediately leads to:

(1) the need for the Element Simulator to have enough AFS space in his Working Area to hold the snapshot of data, something not easily addressed; and (2) the problem of data integrity previously mentioned because of the lack of any way for multiple versions to be updated simultaneously, as the designer is most likely needing to work with back-level versions of data.

Given this severe limitation, the possible power of Collections and Checkpoints, is inadequate for a concurrent engineering approach like that of our integrated design control system.

The Viewlogic BOM handling needs to have an ability to expand a Checkpoint in a Library Viewer and utilize the icons as a visual cue to represent the BOM status. These would be modifications that could be employed within VIEWLOGIC to make this area satisfactory.

We provide the ability to examine BOM operations/utilities. ViewLogic, in this regard, allows management of Collections and Checkpoints data objects in their own right, as they are afforded the same treatment as regular data objects. For example, Collections and Checkpoints each can be Checked Out, Checked in, Promoted (with some difficulty), and Deleted, and ViewScripts can be written to run tasks against their members. Thus functions can be performed against THE BOM without adversely affecting the data objects being tracked by the BOM. The iconized representation of the BOM members in the Library View allows the user to obtain the current status.

However, BOM movement through the library, like that we provide, is severely limited in the ViewLogic system, so our methods should be adopted. We do acknowledge that it is possible to promote a Collection, but with difficulty. After repeated tries, we have learned that if one accepts the restriction that a user must "own" all members of a Checkpoint, then one is able to promote an entire BOM from a Private Library into a Public Library. However, since the problems we discussed with respect to Level-to-Level promotion of regular data objects, which also pertain to BOMS, exist, there is no ability to move large BOMs easily from a Private Libary into a Public Library. This is a real shortcoming of the ViewLogic system and a compelling reason we believe of adopting our total system.

While design tasks can be performed non-graphically in the ViewLogic system, it is not possible to perform BOM tasks non-graphically. While ViewScripts can be written to perform many functions involving Collections and Checkpoints, they require ViewLogic ViewData to be running in a graphical environment. There are a number of disadvantages to such a system, illustrating the need for our system's ability to perform BOM tasks nongraphically. For example, if a timing model can be created using a non-graphical timing tool, it should be able to interact with a BOM tracker non-graphically. We provide for a command line environment, and it is important for a BOM tracker, as we provide (see the Section 4.6 discussion), to coexist in the same environment as the tool it is intended to work with. This is not possible with the ViewLogic system.

There is a need for the problem fix management as we provide. ViewLogic DM has no built in fix management functions.

Some fix management functions with the ability of ViewLogic to execute specially written ViewScripts could be achieved. There was a proposal to address these concerns.

It must be easy in an integrated design control system to make design changes for subsequent releases. When one tries to track an equivalent of our functions onto the ViewLogic system design difficulties arise and the effort becomes difficult, even though at the highest level it is possible to make design changes for subsequent releases. We have achieved this result with unnecessary difficultly because we determined that because there is no type of Working or Engineering Level and one is forced to use the Release Levels for design iteration in the ViewLogic system. This requires one to perform Level-to-level promotions, which have the problems previously mentioned. One then designates a specific one of the Release Areas as a Release Level.

In order to make a design change, that data must be referenced. To do this one could create an overall system level Library and create a schematic instantiating components from the other Teams. Upon librarying that schematic, is is still difficult to work with the combined set of data. Because of the Working Area I Release Area Union paradigm forced by the system, a designer is unable to see all of the data, comprising the overall schematic, simultaneously. Instead, the designer must repeatedly use the Set Environment function to cycle through the various Working Area/Release Area combinations. Also, no data can be browsed in the public areas. All data has also to be checked out into the designer's Working Area, just to look at it. Finally, working with multiple Teams is cumbersome, even though the Data Manager has complete control over establishing the Release Areas, including their physical locations, and no Library Search mechanism is necessary, since the release area which has been designated as a Release Level consists of a complete set of pointers to the components used in the overall design. While making it possible to achieve the base result, this system is unnecessarily difficult and not conducive to concurrent engineering in an integrated design control system.

One of the aspects of desirable concurrent engineering would be the ability of the system to EC a released component, particularly when there is the ability to release control if multiple ECs are being processed in parallel without risking that data can be intermixed between the ECs. The problem with the paradigm used by ViewLogic is that an EC stream is represented by a Working Area/Release Area Union. We have noted that there is a lack of visual cues indicating the current union, and a possible promotion mechanism with no user verification of the source and destination. There is also no means to delete a version if it enters the wrong storage vault, making it impossible overall to minimize the risk of components being released into the wrong stream, something that must be avoided.

With regard to building models from released data, akin to the method we discuss, the ViewLogic system provides that a Release Area contains a full set of pointer to the entire design; however, a model builder must check out all the data into his Working Area. This is inefficient use of AFS space, especially if multiple models are to be built in parallel, since to achieve this task the user must set up multiple Working Areas to use as model build areas.

View Logic allows the Data Manager to establish necessary Release Areas to house "patches" to released data (i.e. design data patches for the test floor); however, the act of creating and releasing such patches often entails a designer working on multiple versions of a design component in parallel. The current ViewLogic system has many problems related to multiple check outs of the same component and working with back-level data. We would refer by way of contrast to the sets we use in fixing design problems in multiple releases.

ISO approved verification audits, which we discuss under Section 6.6, requires a DMS capable of storing results from tasks along with the proper pedigree information for the files used to run the tasks. It can then be enhanced to produce output in a comparable format to an ISO Quality Record. The current ViewLogic system offers no such mechanism, and our process management function and our release manager methods needs to be employed. While we have described our preferred embodiments of our inventions, it will be understood that those skilled in the art, both now and in the future, may make various improvements and enhancements which fall within the scope of the claims which follow. These claims should be construed to maintain the proper protection for the inventions first disclosed.

What is claimed is:

1. A method for computerized design automation comprising, accessing a file and database management system for managing a plurality of projects as a design control system, organizing data repository for each project for data records and a control repository comprising a common access interface and one or more databases, said control repository communicating with users of said design control system for fulfilling requests of a user and the data repositories of said data management control system through a plurality of managers, each manager performing a unique function; and combining selected ones of said managers for supporting an computerized design automation application environment suitable for multiple users of a user community located at workstations anywhere in the world accessible via a network, an intranet, extranet or via the internet; and defining for each project a control repository and one or more data repositories to store, manage and manipulate any data object, whereby said control repository communicates with users and the data repositories in numerous ways to support environments ranging from a small user community to a global enterprise; and tracking all data and control information in an architecturally centralized location consisting of said data repository and said control repository using a single logical PFVL paradigm to identify all data in the DMS by Package, File Type, (Data Type), Version and Level, and wherein packages are arbitrary divisions of data, whereby all the data has some common association to a library.

2. A method for computerized design automation according to claim 1 wherein every piece of the design which is associated to a component data element to be developed in tandem while using the same object name and residing in the same library and at the same level simultaneously.

5. A method for computerized design automation according to claim 4 wherein for each said version, there is a level structure denoting a degree of completeness, stability or quality control enabling said data manager a means to establish a level structure commensurate with the goals and objectives of the user community.

6. A method for computerized design automation according to claim 5 wherein at least some of the data objects are at a level chained to another level to allow data to migrate from one Level to the next, and wherein any or all of these Levels can be designated as Entry Levels allowing data to be entered into this Entry Level from a user's Private Library; and wherein there are also levels categorized as working levels and release levels wherein data in working levels is transitory, and must eventually migrate to a release level, while release levels provide permanent storage vaults for a coherent set of data.

7. A method for computerized design automation according to claim 1 further comprising, providing an architecturally centralized location which does not require that the location be physically in the same location but requires that the user must perceive the system in a manner by which all data appears to be tracked uniformly which enables the user to do things like find/view all the data associated with the design when multiple pieces of data are in physically disparate locations.

8. A method for computerized design automation according to claim 1 further comprising, the steps of mapping in order to use the system together with other systems the system attribute for conversion to provide the following mapping:

| Library | - | Variance | - | Quality Level | - | View | - | CellName | - | Version |
|---------|---|----------|---|---------------|---|------|---|----------|---|---------|
| /\ |  | /\ |  | /\ |  | /\ |  | /\ |  | /\ |
| \/ |  | \/ |  | \/ |  | \/ |  | \/ |  | \/ |
| Package | - | Version | - | Quality Level | - | Type | - | FileName | - | Iteration. |

Library—Variance—Quality Level—View—Cell—Version has all of the data associated so that the system ensures every piece of data has all its PFVL attributes associated with it, permitting every piece of data or attribute of a design element in the Data Management System (DMS), regardless of origin or importance, to be tracked by its PFVL single logical association of every piece of the design.

3. A method for computerized design automation according to claim 1 further comprising, providing that data management model structure capable of tracking a plurality of data objects governed under similar or disparate processes, wherein all objects are classified as part of a library, having one or more types, each type having one or more versions, and each version having one or more levels.

4. A method for computerized design automation according to claim 3 wherein said library is a grouping of objects which all have common characteristics causing them to belong to the same library grouping, and wherein within a library, data is organized by version, wherein versions allow parallel evolution of the same component data element to coexist in the same library enabling multiple versions of a 9. A method for computerized design automation according to claim 1 further comprising, providing that the system provides working areas which serve as a private library for a user assigned to a team by a data manager, and to perform shared data management each team may have any number of Release or Integration Areas, while team members may have unlimited Working Areas and the system data manager can create release or integration areas, specify the physical location of the data, and rename or delete the Release or Integration Area at any time, and create virtual levels to define the type of structure required for concurrent engineering with multiple levels and variances, promote data between virtual levels and into Release Areas, and enable users to look at data in all Release or Integration Areas simultaneously.

10. A method for computerized design automation according to claim 1 further comprising, enabling with said PFVL single logical paradigm attributes of non-system originated data to be tracked and made accessible along with system originated data with a system command.

11. A method for computerized design automation according to claim 1 further comprising, enabling a user call for a system function, third party tool, shell script, perl script, C program, or any other type of application programming interface from within a user system may be invoked from a command line.

12. A method for computerized design automation according to claim 1 further comprising, enabling a locking mechanism which enables transfer of ownership permanently or temporarily of PFVL data, and allows for an override or rest of the check out locks, and provides notification to the original designer or administrator in the event of check out.

13. A method for computerized design automation according to claim 1 further comprising, providing that all data and control information is tracked in an architecturally centralized location consisting of a data and control repository for a project using a single logical PFVL paradigm, and wherein said system provides a dynamic Bill of Materials Tracker to identify all the desired pieces of a design at a particular Library, Level and Variance to be built into a "model".

14. A method for computerized design automation according to claim 1 further comprising, providing that all data and control information is tracked in an architecturally centralized location consisting of a data and control repository for a project using a single logical PFVL paradigm, and wherein said system provides Automated Library Processing whereby tools, checks and automated tasks can be launched either during movement of data between levels or while data is stable within a level and where results would be associated to the exact data objects used in the process and retained in the Control Repository.

15. A method for computerized design automation according to claim 1 further comprising, providing that all data and control information is tracked in an architecturally centralized location consisting of a data and control repository for a project using a single logical PFVL paradigm, and wherein said system provides Problem Fix Management and Engineering Change Tracking which would provide various utilities to ensure that fixes to problems are contained within the proper release or EC.

16. A method for computerized design automation according to claim 1 further comprising, enabling interaction with said Managers of the DMS to perform tasks such as Automated Library Processing, Problem Fix and EC management, BOM Tracking, Authority and Lock checking before, during and after the promotion of data in the DMS.

17. A method for computerized design automation according to claim 1 further comprising, enabling the use of Automated Library Machines in a client server environment for purposes of processing promotion requests, initiating and executing Automated Library Processes, installing newly created data into the DMS, performing any other functions provided by said Managers of the DMS, and permitting execution of non-DMS tasks through the use of an Autoreader virtual queue.

18. A method for computerized design automation according to claim 1 further comprising, enabling accessible multiple working library levels, and means for extracting data from a public library.

19. A method for computerized design automation according to claim 5 all data objects are identified by name and type.

20. A method for computerized design automation according to claim 19 wherein at least some of the identified data objects are identified by a type of data object which depicts the objects as files.

21. A method for computerized design automation according to claim 19 wherein at least some of the identified data objects are identified by a type of data object which depicts the objects as files, while other data objects identified by the same file name exist, such that an entity of said data management system characterized by a single name may have multiple types of data objects, simultaneously residing in multiple Levels, of multiple versions and spanning multiple libraries.

22. A method for computerized design automation according to claim 6 wherein at least some of the data objects when the data is promoted into a release level, that Level is frozen and a new release level is opened such that data always migrates from the highest Working Level into the current, or open, Release Level.

23. A method for computerized design automation according to claim 6 wherein at least some of the data objects when the data is promoted into a release level, that Level is frozen and a new release level is opened such that any working level may be promoted to from another working level, or serve as an entry level for data coming from a Private Library while a current Release Level can be promoted to, but can't be an entry point for outside data and frozen Release Levels are neither entry points nor are they promotable.

24. A method for computerized design automation according to claim 1 further comprising, providing that every piece of data or attribute of a design element in the Data Management System (DMS), regardless of origin or importance, is tracked by its PFVL single logical association of every piece of the design.

25. A method for computerized design automation according to claim 1 wherein a database for the control repository includes a multimedia database.

26. A method for computerized design automation according to claim 1 wherein a database for the data repository includes a multimedia database.

* * * * *